US012669912B2

(12) United States Patent
Chung et al.

(10) Patent No.: US 12,669,912 B2
(45) Date of Patent: Jun. 30, 2026

(54) ELECTRONIC DEVICE FOR DISPLAYING ICON IN THREE-DIMENSIONAL (3D) VIRTUAL SPACE, ITS OPERATION METHOD, AND NON-TRANSITORY COMPUTER-READABLE STORAGE MEDIA

(71) Applicant: Samsung Electronics Co., Ltd., Suwon-si (KR)

(72) Inventors: Jinkyo Chung, Suwon-si (KR); Dongkyun Kang, Suwon-si (KR); Eunhae Park, Suwon-si (KR); Eunsun Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 18/444,234

(22) Filed: Feb. 16, 2024

(65) Prior Publication Data

US 2024/0281110 A1 Aug. 22, 2024

Related U.S. Application Data

(63) Continuation of application No. PCT/KR2024/095320, filed on Feb. 16, 2024.

(30) Foreign Application Priority Data

| Feb. 17, 2023 | (KR) | 10-2023-0021693 |
| Apr. 3, 2023 | (KR) | 10-2023-0043811 |
| May 11, 2023 | (KR) | 10-2023-0061267 |
| Dec. 1, 2023 | (KR) | 10-2023-0172028 |

(51) Int. Cl.
*G06F 3/04817* (2022.01)
*G06F 3/01* (2006.01)
(Continued)

(52) U.S. Cl.
CPC .......... *G06F 3/04815* (2013.01); *G06F 3/013* (2013.01); *G06F 3/017* (2013.01); (Continued)

(58) Field of Classification Search
CPC ...... G06F 3/04883; G06F 3/011; G06F 3/017; G06F 3/04815; G06F 3/013; (Continued)

(56) References Cited

U.S. PATENT DOCUMENTS 10,510,191 B2 12/2019 Powderly et al.
10,514,767 B2 * 12/2019 Ishiwata ............. G06F 3/04812
(Continued)

FOREIGN PATENT DOCUMENTS

CN 113643179 A 11/2021
JP 6611501 B2 11/2019
(Continued)

OTHER PUBLICATIONS

"Information processing apparatus, virtual object operation method, computer program, and storage medium" JP6611501B2, published on Nov. 27, 2019 by Nakama, Motoki.*
(Continued)

*Primary Examiner* — Rinna Yi
(74) *Attorney, Agent, or Firm* — Jefferson IP Law, LLP

(57) ABSTRACT

A wearable electronic device and a method performed thereby are provided. The wearable electronic device includes a display, a memory, a camera, and one or more processors. The memory store one or more computer programs including computer-executable instructions that, when executed by the one or more processors, cause the wearable electronic device to display a user-selectable icon for an execution of an application in a three-dimensional (3D) virtual space, wherein the user-selectable icon includes a first graphical object representing a virtual window and a
(Continued)

second graphical object representing the application, and the second graphical object is selectable through the first graphical, while the user-selectable icon is displayed in the 3D virtual space, detect a movement of a user's finger, and based on detecting the movement of the user's finger to select the second graphical object in a depth direction of the virtual window of the first graphical object, display an execution screen of the application.

18 Claims, 37 Drawing Sheets

(51) Int. Cl.
|  |  |
|---|---|
| *G06F 3/04815* | (2022.01) |
| *G06F 3/04842* | (2022.01) |
| *G06F 3/04845* | (2022.01) |

(52) U.S. Cl.
CPC ...... *G06F 3/04817* (2013.01); *G06F 3/04842* (2013.01); *G06F 3/04845* (2013.01); *G06F 2203/04804* (2013.01)

(58) Field of Classification Search
CPC ............. G06F 3/04817; G06F 3/04842; G06F 3/04845; G06F 2203/04804; G06F 3/0482; G06T 19/006
See application file for complete search history.

(56) References Cited

U.S. PATENT DOCUMENTS

| | | | |
|---|---|---|---|
| 11,567,627 B2 | 1/2023 | Day et al. | |
| 11,983,401 B1 * | 5/2024 | Ku ...................... G06F 3/04883 |

| | | | |
|---|---|---|---|
| 2008/0201649 A1 | 8/2008 | Mattila et al. | |
| 2013/0268875 A1 | 10/2013 | Han et al. | |
| 2017/0052674 A1 * | 2/2017 | Tokutake .............. G06F 3/0484 |
| 2017/0351403 A1 | 12/2017 | Yazdani et al. | |
| 2018/0095635 A1 | 4/2018 | Valdivia et al. | |
| 2018/0101223 A1 | 4/2018 | Ishihara et al. | |
| 2019/0171354 A1 | 6/2019 | Dascola et al. | |
| 2019/0197785 A1 * | 6/2019 | Tate-Gans ............. G06T 19/006 |
| 2020/0242844 A1 | 7/2020 | Bae et al. | |
| 2021/0096726 A1 | 4/2021 | Faulkner et al. | |
| 2022/0121344 A1 | 4/2022 | Pastrana Vicente et al. | |
| 2022/0229534 A1 * | 7/2022 | Terre ................... G06F 3/04815 |
| 2022/0350414 A1 | 11/2022 | Lee et al. | |
| 2023/0297447 A1 * | 9/2023 | Takamizawa ........... G06F 3/016 719/320 |
| 2024/0169603 A1 * | 5/2024 | Moon ..................... G06T 11/00 |

FOREIGN PATENT DOCUMENTS

| | | |
|---|---|---|
| JP | 7209041 B2 | 1/2023 |
| KR | 10-2013-0113978 A | 10/2013 |
| KR | 10-1712350 B1 | 3/2017 |
| KR | 10-2019-0044389 A | 4/2019 |
| KR | 10-2020-0115531 A | 10/2020 |
| KR | 10-2021-0156983 A | 12/2021 |
| KR | 10-2023-0022065 A | 2/2023 |
| WO | 2022/231160 A1 | 11/2022 |

OTHER PUBLICATIONS

International Search Report with English translation and Written Opinion dated May 17, 2024; International Appln. No. PCT/KR2024/095320.
Extended European Search Report dated Jan. 26, 2026, issued in a European Application No. 24757324.9.

* cited by examiner

300

411     410

415
413

410

411     413     415     401     300

Z AXIS

410

410

1301

1303    1311    410

1301

413

1415

1407

1415

1415

START

DISPLAY FIRST GRAPHICAL OBJECT,
SECOND GRAPHICAL OBJECT, AND THIRD GRAPHICAL
OBJECT IN ORDER IN GAZE DIRECTION ~1501

IDENTIFY USER'S GAZE
DIRECTION AND RECEIVE USER INPUT ~1503

EXECUTE AT LEAST ONE FUNCTION OF DESIGNATED
APPLICATION AND/OR CHANGE GRAPHICAL EFFECT ~1505

END

ELECTRONIC DEVICE FOR DISPLAYING ICON IN THREE-DIMENSIONAL (3D) VIRTUAL SPACE, ITS OPERATION METHOD, AND NON-TRANSITORY COMPUTER-READABLE STORAGE MEDIA

CROSS-REFERENCE TO RELATED APPLICATION(S)

This application is a continuation application, claiming priority under § 365(c), of an International application No. PCT/KR2024/095320, filed on Feb. 16, 2024, which is based on and claims the benefit of a Korean patent application number 10-2023-0021693, filed on Feb. 17, 2023, in the Korean Intellectual Property Office, of a Korean patent application number 10-2023-0043811, filed on Apr. 3, 2023, in the Korean Intellectual Property Office, of a Korean patent application number 10-2023-0061267, filed on May 11, 2023, in the Korean Intellectual Property Office, and of a Korean patent application number 10-2023-0172028, filed on Dec. 1, 2023, in the Korean Intellectual Property Office, the disclosure of each of which is incorporated by reference herein in its entirety.

TECHNICAL FIELD

The disclosure relates to an electronic device for displaying an icon for executing an application, an method performed thereby, and one or more non-transitory computer-readable storage media.

BACKGROUND ART

With digital technology advancing, electronic devices come in various types, such as smartphones, tablet personal computers (PCs), or personal digital assistants (PDAs). Electronic devices have been developed to be worn by users so as to enhance portability and user accessibility.

Recently, as technology develops, electronic devices may provide a variety of applications and may simply execute an application by displaying icons representing various applications on the home screen or a designated screen. The growth of technology leads to development of technology (e.g., virtual reality (VR)) that allows the electronic device to implement a specific place or situation in three-dimensional computer graphics and provide a virtual environment for an indirect experience. In the virtual environment, the electronic device may be configured in various forms to be worn on the user's body part, display icons in the virtual space, and execute applications.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

The electronic device of the related art displays an icon in the form of a shortcut icon (e.g., a shortcut) of one application in a two-dimensional (2D) and three-dimensional (3D) environment and may not reflect changes in the state of the application. As technologies for executing applications in a 3D environment virtual space recently develop, enhancement of the structure of the icon for executing the application is required, so that it is configured in a structure capable of receiving various interactive functions, and it is required to provide icons that may apply to both the 2D environment and the 3D environment.

Aspects of the disclosure are to address at least the above-mentioned problems and/or disadvantages and to provide at least the advantages described below. Accordingly, an aspect of the disclosure is to provide an electronic device for displaying an icon for executing an application, an operation method thereof, and a non-transitory storage medium.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a display, memory, a camera, and one or more processors communicatively connected to the display, the memory, and the camera. The memory store one or more computer programs including computer-executable instructions that, when executed by the one or more processors, cause the wearable electronic device to display a user-selectable icon for an execution of an application in a 3D virtual space, wherein the user-selectable icon includes a first graphical object representing a virtual window and a second graphical object representing the application, and the second graphical object is selectable through the first graphical, while the user-selectable icon is displayed in the 3D virtual space, detect a movement of a user's finger, and based on detecting the movement of the user's finger to select the second graphical object in a depth direction of the virtual window of the first graphical object, display an execution screen of the application.

In accordance with another aspect of the disclosure, a method performed by a wearable electronic device is provided. The method includes displaying a user-selectable icon for an execution of an application in a 3D virtual space, wherein the user-selectable icon includes a first graphical object representing a virtual window and a second graphical object representing the application, and the second graphical object is selectable through the first graphical, while the user-selectable icon is displayed in the 3D virtual space, detecting a movement of a user's finger, and based on detecting the movement of the user's finger to select the second graphical object in a depth direction of the virtual window of the first graphical object, displaying an execution screen of the application.

In accordance with still another aspect of the disclosure, one or more non-transitory computer-readable storage media storing one or more computer programs including computer-executable instructions that, when executed by one or more processors of a wearable electronic device, cause the wearable electronic device to perform operations is provided. The operations include displaying a user-selectable icon for an execution of an application in a three-dimensional 3D virtual space, wherein the user-selectable icon includes a first graphical object representing a virtual window and a second graphical object representing the application, and the second graphical object is selectable through the first graphical, while the user-selectable icon is displayed in the 3D virtual space, detecting a movement of a user's finger, and based on detecting the movement of the user's finger to select the second graphical object in a depth direction of the virtual window of the first graphical object, displaying an execution screen of the application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the disclosure are now described with reference to the accompanying drawings. As used herein, the term "user" may denote a human or another device using the electronic device.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-
cessor unit (MPU), a system on chip (SoC), an integrated
circuit (IC), or the like.

Figure 1:
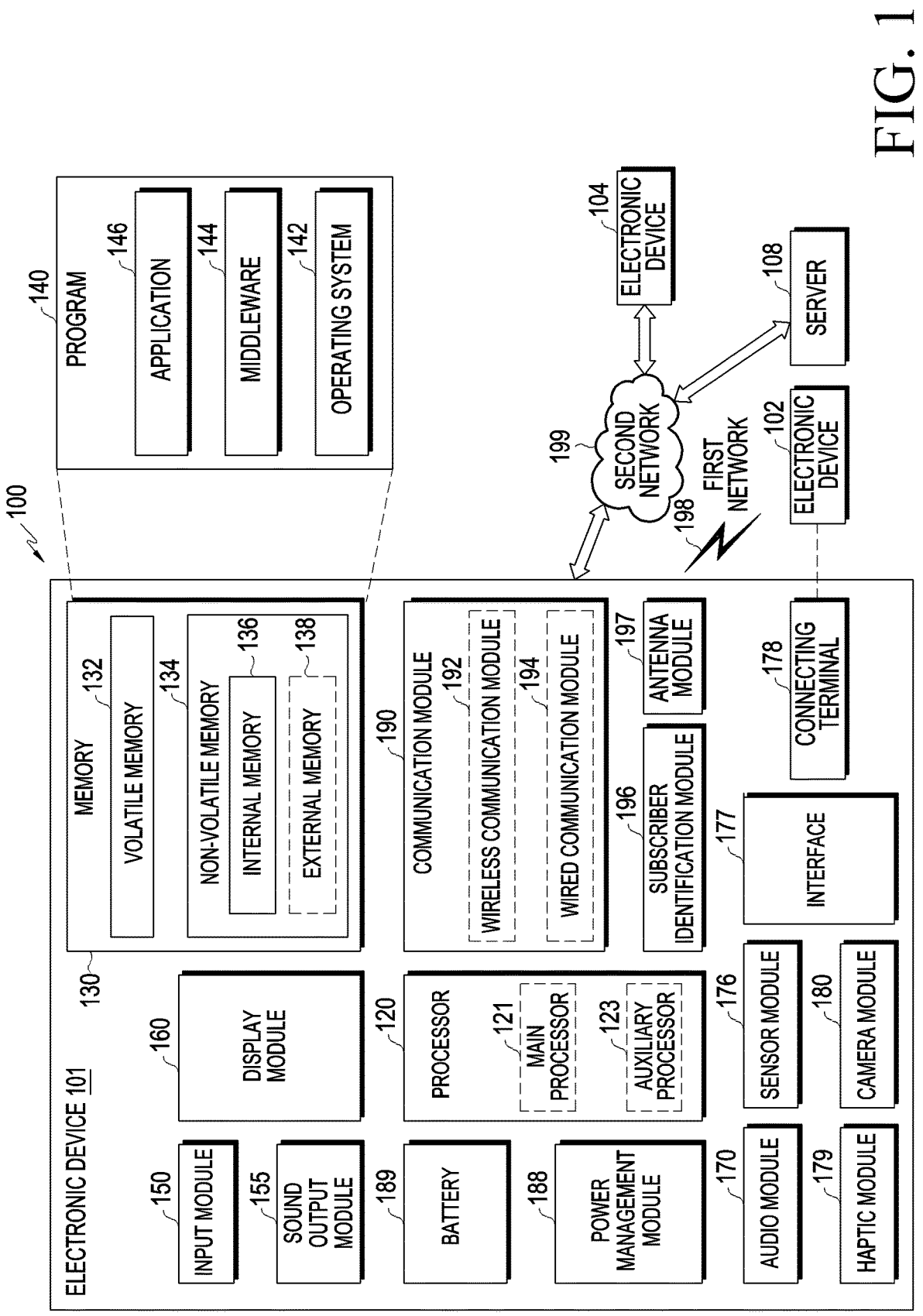
FIG. 1 is a view illustrating an electronic device in a network environment according to various embodiments of the disclosure.

FIG. 1 is a block diagram illustrating an electronic device
101 in a network environment 100 according to various
embodiments of the disclosure.

Referring to FIG. 1, the electronic device 101 in the
network environment 100 may communicate with at least
one of an electronic device 102 via a first network 198 (e.g.,
a short-range wireless communication network), or an elec-
tronic device 104 or a server 108 via a second network 199
(e.g., a long-range wireless communication network).
According to an embodiment, the electronic device 101 may
communicate with the electronic device 104 via the server
108. According to an embodiment, the electronic device 101
may include a processor 120, memory 130, an input module
150, a sound output module 155, a display module 160, an
audio module 170, a sensor module 176, an interface 177, a
connecting terminal According to an embodiment, the dis-
play module 160 may include a first display module 351
corresponding to the user's left eye and/or a second display
module 353 corresponding to the user's right eye, a haptic
module 179, a camera module 180, a power management
module 188, a battery 189, a communication module 190, a
subscriber identification module (SIM) 196, or an antenna
module 197. In an embodiment, at least one (e.g., the
connecting terminal 178) of the components may be omitted
from the electronic device 101, or one or more other
components may be added in the electronic device 101.
According to an embodiment, some (e.g., the sensor module
176, the camera module 180, or the antenna module 197) of
the components may be integrated into a single component
(e.g., the display module 160).

The processor 120 may execute, for example, software
(e.g., a program 140) to control at least one other component
(e.g., a hardware or software component) of the electronic
device 101 coupled with the processor 120, and may per-
form various data processing or computation. According to
an embodiment, as at least part of the data processing or
computation, the processor 120 may store a command or
data received from another component (e.g., the sensor
module 176 or the communication module 190) in volatile
memory 132, process the command or the data stored in the
volatile memory 132, and store resulting data in non-volatile
memory 134. According to an embodiment, the processor
120 may include a main processor 121 (e.g., a central
processing unit (CPU) or an application processor (AP)), or
an auxiliary processor 123 (e.g., a graphics processing unit
(GPU), a neural processing unit (NPU), an image signal
processor (ISP), a sensor hub processor, or a communication
processor (CP)) that is operable independently from, or in
conjunction with, the main processor 121. For example,
when the electronic device 101 includes the main processor
121 and the auxiliary processor 123, the auxiliary processor
123 may be configured to use lower power than the main
processor 121 or to be specified for a designated function.
The auxiliary processor 123 may be implemented as sepa-
rate from, or as part of the main processor 121.

The auxiliary processor 123 may control at least some of
functions or states related to at least one component (e.g., the
display module 160, the sensor module 176, or the commu-
nication module 190) among the components of the elec-
tronic device 101, instead of the main processor 121 while
the main processor 121 is in an inactive (e.g., sleep) state, or
together with the main processor 121 while the main pro-
cessor 121 is in an active state (e.g., executing an applica-
tion). According to an embodiment, the auxiliary processor

123 (e.g., an image signal processor or a communication
processor) may be implemented as part of another compo-
nent (e.g., the camera module 180 or the communication
module 190) functionally related to the auxiliary processor
123. According to an embodiment, the auxiliary processor
123 (e.g., the neural processing unit) may include a hard-
ware structure specified for artificial intelligence model
processing. The artificial intelligence model may be gener-
ated via machine learning. Such learning may be performed,
e.g., by the electronic device 101 where the artificial intel-
ligence is performed or via a separate server (e.g., the server
108). Learning algorithms may include, but are not limited
to, e.g., supervised learning, unsupervised learning, semi-
supervised learning, or reinforcement learning. The artificial
intelligence model may include a plurality of artificial neural
network layers. The artificial neural network may be a deep
neural network (DNN), a convolutional neural network
(CNN), a recurrent neural network (RNN), a restricted
Boltzmann machine (RBM), a deep belief network (DBN),
a bidirectional recurrent deep neural network (BRDNN),
deep Q-network or a combination of two or more thereof but
is not limited thereto. The artificial intelligence model may,
additionally or alternatively, include a software structure
other than the hardware structure.

The memory 130 may store various data used by at least
one component (e.g., the processor 120 or the sensor module
176) of the electronic device 101. The various data may
include, for example, software (e.g., the program 140) and
input data or output data for a command related thereto. The
memory 130 may include the volatile memory 132 or the
non-volatile memory 134.

The program 140 may be stored in the memory 130 as
software, and may include, for example, an operating system
(OS) 142, middleware 144, or an application 146.

The input module 150 may receive a command or data to
be used by other component (e.g., the processor 120) of the
electronic device 101, from the outside (e.g., a user) of the
electronic device 101. The input module 150 may include,
for example, a microphone, a mouse, a keyboard, keys (e.g.,
buttons), or a digital pen (e.g., a stylus pen).

The sound output module 155 may output sound signals
to the outside of the electronic device 101. The sound output
module 155 may include, for example, a speaker or a
receiver. The speaker may be used for general purposes,
such as playing multimedia or playing record. The receiver
may be used for receiving incoming calls. According to an
embodiment, the receiver may be implemented as separate
from, or as part of the speaker.

The display module 160 may visually provide informa-
tion to the outside (e.g., a user) of the electronic device 101.
The display 160 may include, for example, a display, a
hologram device, or a projector and control circuitry to
control a corresponding one of the display, hologram device,
and projector. According to an embodiment, the display 160
may include a touch sensor configured to detect a touch, or
a pressure sensor configured to measure the intensity of a
force generated by the touch.

The audio module 170 may convert a sound into an
electrical signal and vice versa. According to an embodi-
ment, the audio module 170 may obtain the sound via the
input module 150, or output the sound via the sound output
module 155 or a headphone of an external electronic device
(e.g., an electronic device 102) directly (e.g., wiredly) or
wirelessly coupled with the electronic device 101.

The sensor module 176 may detect an operational state
(e.g., power or temperature) of the electronic device 101 or
an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
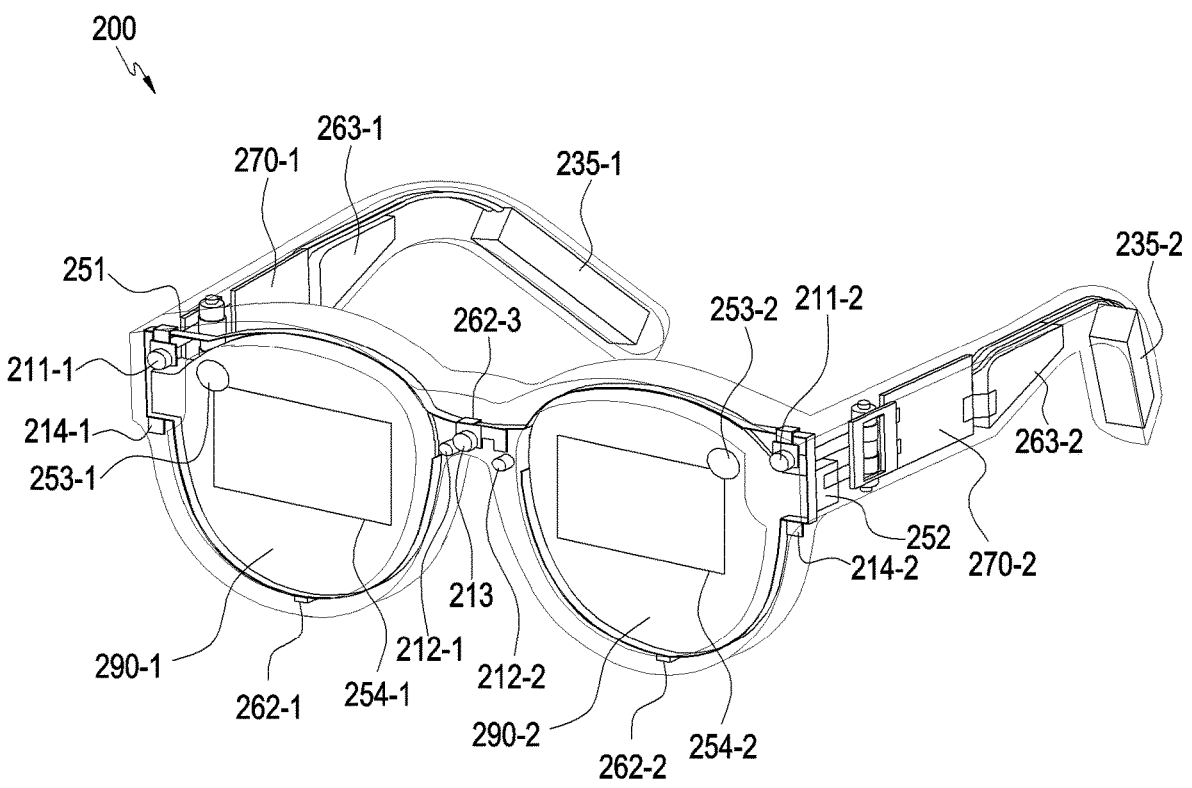
FIG. 2 is a perspective view illustrating a structure of an electronic device according to an embodiment of the disclosure.

FIG. 2 is a perspective view illustrating a structure of an electronic device according to an embodiment of the disclosure.

Referring to FIGS. 1 and 2, an electronic device 200 according to an embodiment may be the electronic device 101 of FIG. 1, an electronic device 102 or 104 communicating with the electronic device 101 of FIG. 1, or a device capable of providing a service related to virtual reality technology providing a virtual environment similar to the electronic device 101 of FIG. 1. The virtual reality (VR) technology which is a technology for providing a virtual environment may develop into augmented reality (AR), mixed reality (MR), and/or extended reality (XR) which encompasses AR and MR. According to an embodiment, virtual reality (VR) technology may be described as a concept encompassing augmented reality (AR), mixed reality (MR), and/or extended reality (XR).

Referring to FIG. 2, the electronic device 200 may be a device (e.g., a head-mounted display (HMD) or glasses-type AR glasses device) configured to be worn on the user's body. For example, the electronic device 200 may be configured to couple with an external electronic device, e.g., a mobile device to be able to use the components (e.g., the display module, camera module, sound output module, or other components) of the external electronic device. Without limited thereto, the electronic device 200 may be implemented in other various forms wearable on the user's body.

According to an embodiment, the electronic device 200 may control the display module 160 to configure a virtual reality space (e.g., augmented reality space) that displays an augmented reality image corresponding to the actual environment captured in the ambient environment where the user is located or a virtually provided image (e.g., 2D or 3D image) and display at least one virtual object corresponding to a thing for user interaction and/or at least one virtual object corresponding to the user in the virtual reality space.

According to an embodiment, the electronic device 200 may include a processor 120, a memory 130, a display module 160, a sensor module 176, a camera module 180, a charging module (e.g., the battery 189 of FIG. 1), and a communication module 190 as shown in FIG. 1. The electronic device 200 may further include a sound output module 155, an input module 150, or other components as shown in FIG. 1. In addition, the electronic device 200 may further include other components necessary to provide an augmented reality function (e.g., a service or scheme).

According to an embodiment, the processor 120 may be electrically connected to other components to control the other components. The processor 120 may perform various data processing or computations according to the execution of various functions (e.g., operations, services, or programs) provided by the electronic device 200. The processor 120 may perform various types of data processing and computations for displaying, in a virtual reality space, at least one virtual object related to real things included in an image captured in an actual space and/or a virtual object (e.g., an avatar) corresponding to the user. The processor 120 may perform various types of data processing or computations for representing a user interaction or motion of the virtual object displayed in the virtual reality space.

Referring back to FIG. 2, the electronic device 200 according to an embodiment is described. As described above, the electronic device 200 is not limited to the glasses-type (e.g., AR glasses) augmented reality device, and it may be implemented as various devices capable of providing immersive content (e.g., XR technology-based content) to the user's eyes (e.g., AR head mounted-type display type, 2D/3D head-mounted display device, or VR head-mounted display device).

According to an embodiment, the camera module (e.g., the camera module 180 of FIG. 1) of the electronic device 200 may capture a still image and/or a video. According to an embodiment, the camera module may be disposed in the lens frame and be disposed around the first display 251 and the second display 252. According to an embodiment, the camera module may include one or more first cameras 211-1 and 211-2, one or more second cameras 212-1 and 212-2, and one or more third cameras 213. According to an embodiment, an image obtained through the one or more first cameras 211-1 and 211-2 may be used for detection of the user's hand gesture, tracking the user's head, and/or spatial recognition. The one or more first cameras 211-1 and 211-2 may be a global shutter (GS) camera or a rolling shutter (RS) camera. The one or more first cameras 211-1 and 211-2 may perform a simultaneous localization and mapping (SLAM) operation through depth capture. The one or more first cameras 211-1 and 211-2 may perform spatial recognition and/or movement recognition for 3 depth of field (DoF) and/or 6DoF. According to an embodiment, the first cameras

211-1 and 211-2 may periodically or aperiodically transmit information related to the trajectory of the user's eye or gaze (e.g., trajectory information) to the processor (e.g., the processor 120 of FIG. 1).

According to an embodiment, the electronic device 200 may use another camera (e.g., the third camera 213) for hand detection and tracking and recognition of the user's gesture. According to an embodiment, at least one of the first cameras 211-1 and 211-2 to the third camera module 213 may be replaced with a sensor module (e.g., a LiDAR sensor). For example, the sensor module may include at least one of a vertical cavity surface emitting laser (VCSEL), an infrared sensor, and/or a photodiode.

According to an embodiment, an image obtained through the one or more second cameras 212-1 and 212-2 may be used to detect and track the user's pupil. The one or more second cameras 212-1 and 212-2 may be GS cameras. The one or more second cameras 212-1 and 212-2 may correspond to the left eye and the right eye, respectively. The one or more second cameras 212-1 and 212-2 may have substantially the same performance. The one or more third cameras 213 may be relatively high-resolution cameras. The one or more third cameras 213 may perform an auto-focusing (AF) function and an optical image stabilization (OIS) function. The one or more third cameras 213 may be a global shutter (GS) camera or a rolling shutter (RS) camera. The one or more third cameras 213 may be color cameras.

According to an embodiment, the electronic device 200 may include one or more light emitting devices 214-1 and 214-2. The light emitting elements 214-1 and 214-2 are different from a light source, which is described below, for irradiating light to a screen output area of the display. According to an embodiment, the light emitting devices 214-1 and 214-2 may irradiate light to facilitate pupil detection in detecting and tracking the user's pupils through the one or more second cameras 212-1 and 212-2. According to an embodiment, each of the light emitting devices 214-1 and 214-2 may include an LED. According to an embodiment, the light emitting devices 214-1 and 214-2 may irradiate light in an infrared band. According to various embodiments, the light emitting devices 214-1 and 214-2 may be attached around the frame of the electronic device 200. According to an embodiment, the light emitting devices 214-1 and 214-2 may be positioned around the one or more first cameras 211-1 and 211-2 and may assist in gesture detection, head tracking, and spatial recognition by the one or more first cameras 211-1 and 211-2 when the electronic device 200 is used in a dark environment. According to an embodiment, the light emitting devices 214-1 and 214-2 may be positioned around the one or more third cameras 213 and may assist in obtaining images by the one or more third cameras 213 when the electronic device 200 is used in a dark environment.

According to an embodiment, the electronic device 200 may include batteries 235-1 and 235-2 (e.g., the battery 189 of FIG. 1). The batteries 235-1 and 235-2 may store power for operating the remaining components of the electronic device 200.

According to an embodiment, the display module (e.g., the display module 160 of FIG. 1) of the electronic device 200 may include the first display 251, the second display 252, one or more input optical members 253-1 and 253-2, one or more transparent members 290-1 and 290-2, and one or more screen display portions 254-1 and 254-2, which are described above in connection with FIG. 1. According to an embodiment, the first display 251 and the second display

252, as an optical output module, may include, e.g., a liquid crystal display (LCD), a digital mirror device (DMD), a liquid crystal on silicon (LCoS), or an organic light emitting diode (OLED), or a micro light emitting diode (micro LED). According to an embodiment, when the first display 251 and the second display 252 are formed of one of a liquid crystal display device, a digital mirror display device, or a silicon liquid crystal display device, the electronic device 200 may include a light source for irradiating light to a screen output area of the display. According to an embodiment, when the first display 251 and the second display 252 may generate light on their own, e.g., when formed of either organic light emitting diodes or micro LEDs, the electronic device 200 may provide a virtual image (e.g., an image of a virtual reality space) of good quality to the user even when a separate light source is not included.

According to an embodiment, the one or more transparent members 290-1 and 290-2 included in the electronic device 200 may be disposed to face the user's eyes when the user wears the electronic device 200. The one or more transparent members 290-1 and 290-2 may include at least one of a glass plate, a plastic plate, and a polymer. The user may view the outside world through the one or more transparent members 290-1 and 290-2 when the user wears the electronic device 200.

According to an embodiment, the one or more input optical members 253-1 and 253-2 included in the electronic device 200 may guide the light generated by the first display 251 and the second display 252 to the user's eyes. An image may be formed on the one or more screen display portions 254-1 and 254-2 over the one or more transparent members 290-1 and 290-2 by the light generated by the first display 251 and the second display 252, and the user may see the image formed on the one or more screen display portions 254-1 and 254-2.

According to an embodiment, the electronic device 200 may include one or more optical waveguides (not shown). The optical waveguide may transfer the light generated by the first display 251 and the second display 252 to the user's eyes. The electronic device 200 may include one optical waveguide corresponding to each of the left eye and the right eye. According to an embodiment, the optical waveguide may include at least one of glass, plastic, or polymer. The optical waveguide may include a nano-pattern formed inside or on one outer surface, e.g., a polygonal or curved grating structure. The optical waveguide may include a free-form type prism, and in this case, the optical waveguide may provide incident light to the user through a reflective mirror. According to an embodiment, the optical waveguide may include at least one of at least one diffractive element (e.g., a diffractive optical element (DOE) or a holographic optical element (HOE)) or a reflective element (e.g., a reflective mirror) and guide the display light emitted from the light source to the user's eyes using at least one diffractive element or reflective element included in the optical waveguide. According to an embodiment, the diffractive element may include input/output optical elements. According to an embodiment, the reflective element may include a member causing total reflection.

According to an embodiment, the electronic device 200 may include one or more sound input devices 262-1, 262-2, and 262-3 and one or more sound output devices 263-1 and 263-2.

According to an embodiment, the electronic device 200 may include a first PCB 270-1 and a second PCB 270-2. The first PCB 270-1 and the second PCB 270-2 may transfer electrical signals to components included in the electronic device 200, such as the first cameras 211-1 and 211-2, the second cameras 212-1 and 212-2, and the third camera 213 included in the camera module 180, the displays 251 and 252, the audio module (e.g., the audio module 170 of FIG. 1), and the sensor module (e.g., the sensor module 176 of FIG. 1). According to an embodiment, the first PCB 270-1 and the second PCB 270-2 may be flexible printed circuit boards (FPCBs). According to an embodiment, the first PCB 270-1 and the second PCB 270-2 each may include a first substrate, a second substrate, and an interposer disposed between the first substrate and the second substrate.

Figure 3A:
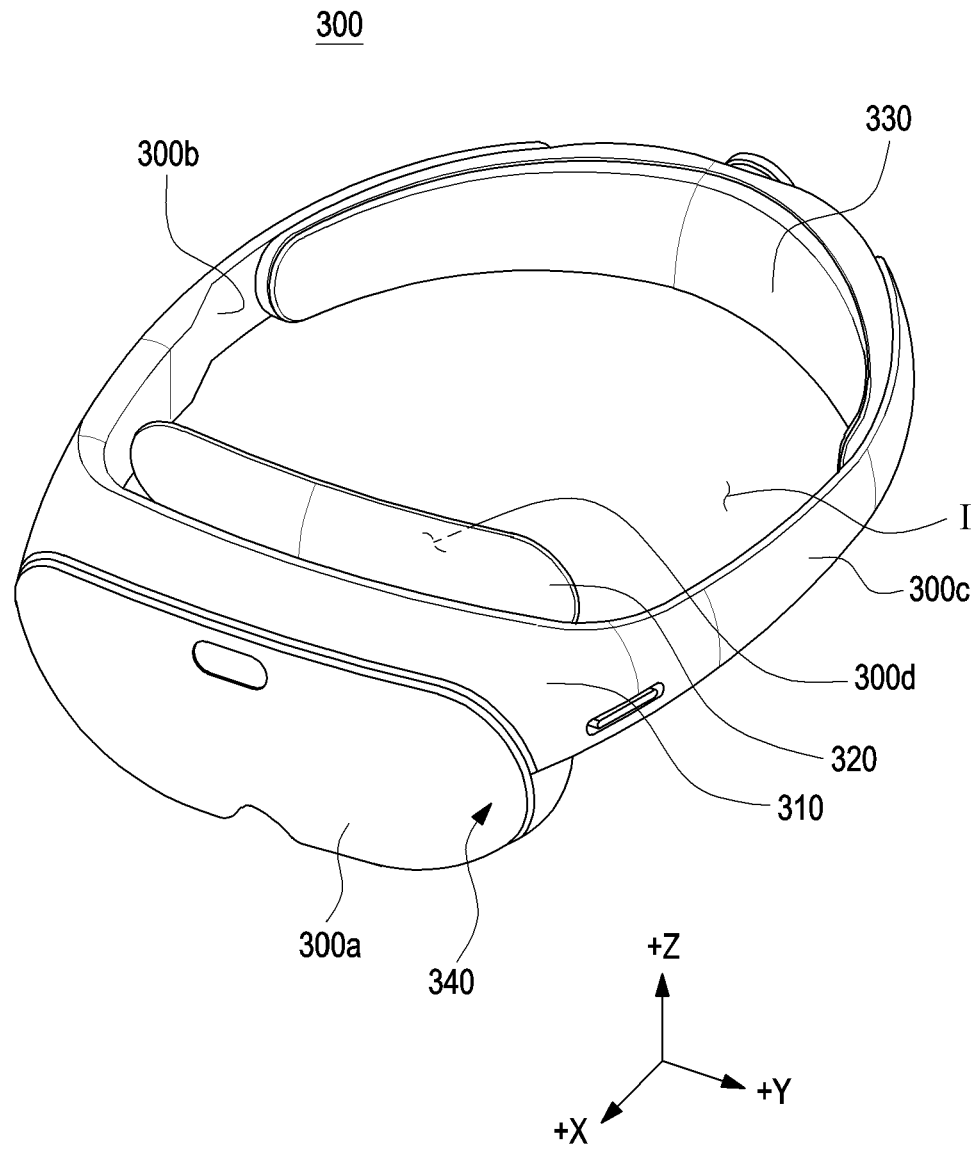
FIG. 3A is a perspective view illustrating a structure of an electronic device according to an embodiment of the disclosure.

FIG. 3A is a perspective view illustrating a structure of an electronic device according to an embodiment of the disclosure.

Referring to FIG. 3A, an electronic device 300 (e.g., the electronic device 101 of FIG. 1 or the electronic device 200 of FIG. 2) according to an embodiment may be a wearable electronic device, such as a head-mounted device (HMD), that is worn on the user's head to provide an image (e.g., virtual reality space image) ahead of the user's eyes. The configuration of the electronic device 300 of FIG. 3A may be identical in whole or part to the configuration of the electronic device 200 of FIG. 2.

According to an embodiment, the electronic device 300 may include a housing 310, 320, and 330 that may form the exterior and provide a space where components of the electronic device 300 may be disposed.

According to an embodiment, the electronic device 300 may include a first housing 310 that may surround at least a portion of the user's head. According to an embodiment, the first housing 310 may include a first surface 300a facing the outside (e.g., +X direction) of the electronic device 300.

According to an embodiment, the first housing 310 may surround at least a portion of the inner space I. For example, the first housing 310 may include a second surface 300b facing the inner space I of the electronic device 300 and a third surface 300c opposite to the second surface 300b. According to an embodiment, the first housing 310 may be coupled with the third housing 330 and may be formed in a closed loop shape surrounding the inner space I.

According to an embodiment, the first housing 310 may surround at least some of the components of the electronic device 300. For example, a light output module, a circuit board, and a speaker module may be disposed within the first housing 310.

According to an embodiment, the electronic device 300 may include one display member 340 corresponding to the left eye and the right eye. The display member 340 may be disposed in the first housing 310. The configuration of the display member 340 of FIG. 3A may be identical in whole or part to the configuration of the screen display portions 254-1 and 254-2 of FIG. 2.

According to an embodiment, the electronic device 300 may include a second housing 320 that may be seated on the user's face. According to an embodiment, the second housing 320 may include a fourth surface 300d that may at least partially face the user's face. According to an embodiment, the fourth surface 300d may be a surface in a direction (e.g., −X direction) toward the internal space I of the electronic device 300. According to an embodiment, the second housing 320 may be coupled with the first housing 310.

According to an embodiment, the electronic device 300 may include a third housing 330 that may be seated on the back of the user's head. According to an embodiment, the third housing 330 may be coupled with the first housing 310. According to an embodiment, the third housing 330 may surround at least some of the components of the electronic device 300. For example, a battery (e.g., the batteries 235-1 and 235-2 of FIG. 2) may be disposed in the third housing 330.

To enhance the user's overall use experience, use environment, and usability of the head-mounted wearable electronic device 300, the sensations that the user feels and experiences in virtual reality (VR), augmented reality (AR), and mixed reality (MR) spaces may be needed to as similar as possible to sensations in the real world.

Figure 3B:
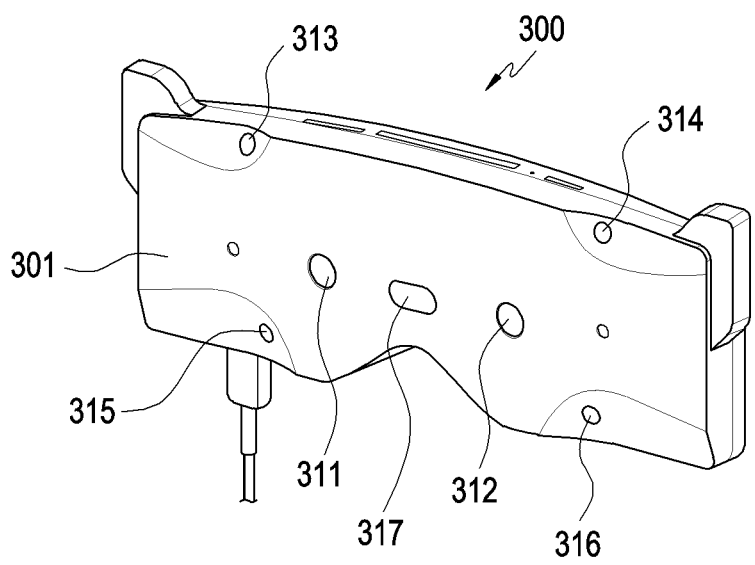
FIGS. 3B and 3C are perspective views illustrating a structure of an electronic device according to an embodiment of the disclosure.
Figure 3C:
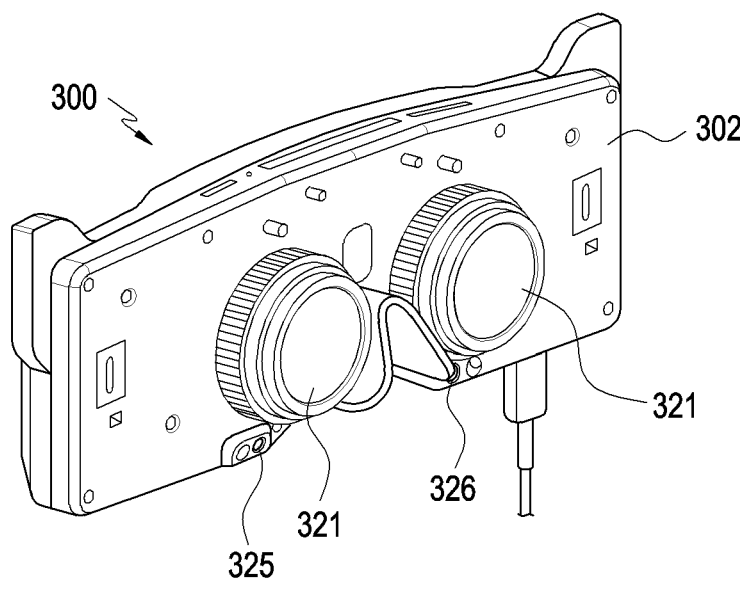
Figure 4A:
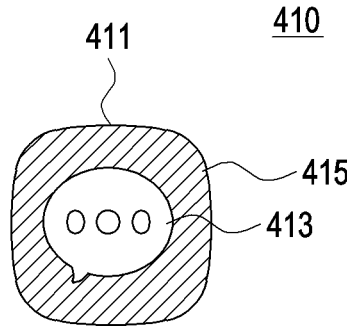
FIGS. 4A and 4B are views illustrating example icons to be displayed on an electronic device according to an embodiment of the disclosure.
Figure 4B:
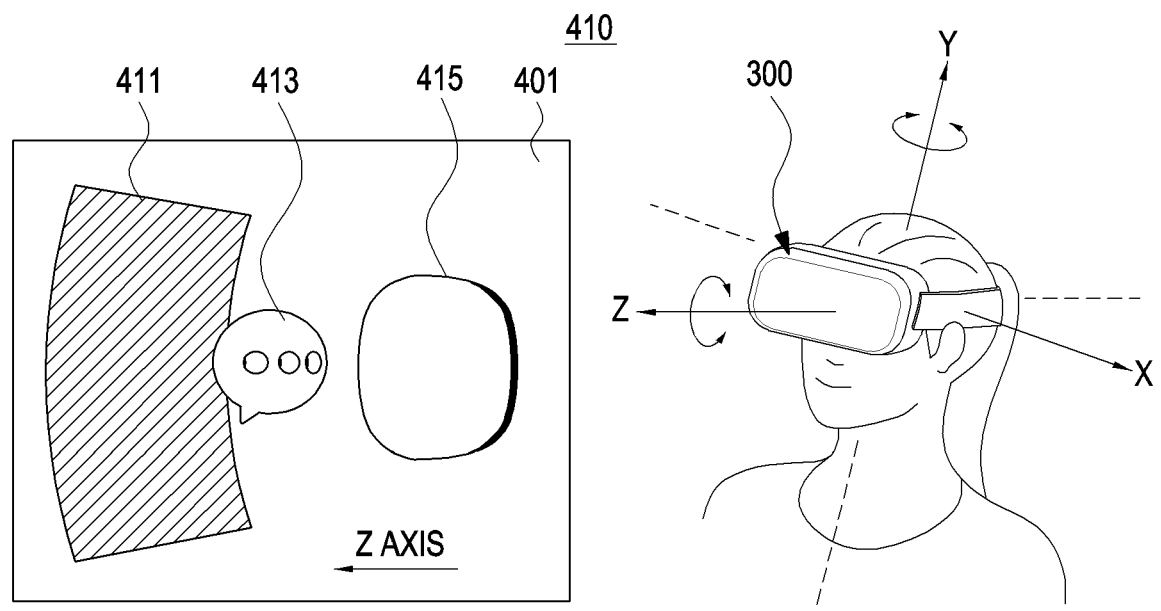

FIGS. 3B and 3C are perspective views illustrating a structure of an electronic device according to an embodiment of the disclosure.

Referring to FIGS. 3B and 3C, in an embodiment, camera modules 311, 312, 313, 314, 315, and 316 and/or a depth sensor 317 for obtaining information related to the ambient environment of the electronic device 300 (e.g., a wearable device) may be disposed on the first surface 301 of the housing.

In an embodiment, the camera modules 311 and 312 may obtain images related to the ambient environment of the electronic device 300.

In an embodiment, the camera modules 313, 314, 315, and 316 may obtain images while the electronic device 300 is worn by the user. The camera modules 313, 314, 315, and 316 may be used for hand detection, tracking, and recognition of the user gesture (e.g., hand motion). The camera modules 313, 314, 315, and 316 may be used for 3DoF or 6DoF head tracking, location (space or environment) recognition, and/or movement recognition. In an embodiment, the camera modules 311 and 312 may be used for hand detection and tracking and recognition of the user's gesture.

In an embodiment, the depth sensor 317 may be configured to transmit a signal and receive a signal reflected from an object and be used for identifying the distance to the object, such as time of flight (TOF). Alternatively or additionally to the depth sensor 317, the camera modules 313, 314, 315, and 316 may identify the distance to the object.

According to an embodiment, camera modules 325 and 326 for face recognition and/or a display module 321 (and/or lens) may be disposed on the second surface 302 of the housing of the electronic device 300. The display module 321 (and/or lens) of FIG. 3C may be, or may be a part of, the display member 340 of FIG. 3A.

In an embodiment, the face recognition camera modules 325 and 326 adjacent to the display may be used for recognizing the user's face or may recognize and/or track both eyes of the user.

In an embodiment, the display module 321 (and/or lens) may be disposed on the second surface 320 of the electronic device 300. In an embodiment, the electronic device 300 may not include the camera modules 315 and 316 among the plurality of camera modules 313, 314, 315, and 316. In an embodiment, the electronic device 300 may not include the camera modules 315 and 316 among the plurality of camera modules 313, 314, 315, and 316. Although not shown in FIGS. 3B and 3C, the electronic device 300 may further include at least one of the components shown in FIG. 2.

As described above, according to an embodiment, the electronic device 300 may have a form factor to be worn on the user's head. The electronic device 300 may further include a strap and/or a wearing member to be fixed on the user's body part. The electronic device 300 may provide the user experience based on augmented reality, virtual reality, and/or mixed reality while worn on the user's head.

Hereinafter, the disclosure may provide an electronic device and method for displaying an icon (e.g., a user selectable icon) for executing an application, which includes a plurality of graphical objects and may change at least one of the graphical objects based on a change in the state of the application in a 2D environment as well as a 3D environment (e.g., virtual space). Hereinafter, the electronic device described in the disclosure may be a wearable electronic device that may be worn on the user's head, such as, e.g., an AR glass, an HMD device, and/or a VST device, as described in connection with FIGS. 2 and 3A to 3C. The electronic device may also be referred to as a wearable electronic device.

Objects of the disclosure are not limited to the foregoing, and other unmentioned objects would be apparent to one of ordinary skill in the art from the following description.

FIGS. 4A, 4B, 5A, and 5B are views illustrating example icons to be displayed on an electronic device according to an embodiment of the disclosure.

Referring to FIGS. 1, 4A, 4B, 5A and 5B, the processor 120 of the electronic device 200 (e.g., the electronic device 101 of FIG. 1, the electronic device 200 of FIG. 2, the electronic device 300 of FIGS. 3A, 3B and 3C) according to an embodiment may control the display module 160 to display an icon 410 (e.g., a user selectable icon) for executing at least one application on a 3D space 401. Here, the display module 160 may display (e.g., provide) an image (e.g., the icon 410 or an execution screen related to a specified application) in the 3D virtual space 401 (e.g., space of augmented reality, virtual reality, mixed reality, and/or extended reality) through a plurality of displays (e.g., the first display 251 and second display 252 of FIG. 2, the display member 340 of FIG. 3A, the display module 321 of FIG. 3C). The icon 410 may include a plurality of graphical objects (e.g., a plurality of 3D graphical objects) configured in each of a plurality of layers having a depth (e.g., a predetermined distance in the depth direction (z direction), and may be configured as a tile of a minimum size as an image representing an application. The icon 410 may be configured to execute the application when a user input (e.g., tap) is received. The icon 410 may be displayed to have a sense of space in a virtual space of a 3D environment in a changeable form, and may be displayed not only in a 3D environment but also in a 2D environment. The icon 410 is a three-dimensional (3D) icon for a specified application, and may be displayed in the 3D virtual space through a display as a three-dimensional (3D) graphical object generated based on at least in part of a group of graphical objects. The graphical objects may include a first graphical object (e.g., world) 411 representing a background area including the content of at least one application and fixed and displayed in the 3D virtual space, a second graphical object (e.g., picto or symbol image) 413 representing at least one application (e.g., a specified application) or one or more contents of at least one application, and a third graphical object (e.g., virtual window) 415 representing a frame area (e.g., outline) directly exposed to the user and configured as a transparent window through which the first graphical object and the second graphical object are shown to the user in the 3D virtual space 401. The plurality of graphical objects may be displayed in the 3D virtual space 401 while the camera modules (e.g., the camera module 180 of FIG. 1, the first cameras 211-1 and 211-2 of FIG. 2, the third camera 213, the camera module 313, 314, 315, and 316 of FIG. 3B) of the electronic device 200 are spaced apart from each other at a predetermined distance (e.g., with a gap) in the depth direction (e.g., z direction) toward the third graphical object. The first graphical object 411, the second graphical object 413, and the third graphical object 415 may be arranged in a specified arrangement order along the depth direction and displayed in the 3D virtual space, and the arrangement order, shape, size, or display position may be changed based on the state of the application. The icon 410 may be configured to be flexibly expandable or shrinkable. For example, a form (title) of flexibly expanding the icon 410 may include a quick swipe that is exposed to the task of the application when swiping the icon, as a form (tile) in which the user may use the function of the application quickly with fewer motions, an application notification that exposes the notification of the application when swiping the icon in a state in which an application notification badge is floating as a form (tile) in which may identify the notification of the application quickly with fewer motions, and/or an application widget (e.g., small screen) that is expanded to expose the application-related function when the user expands the icon area by a specific gesture input (e.g., two fingers) as a form (tile) capable of performing an immediate action or detailed information related to the application.

According to an embodiment, when a user input (e.g., tap) is received, the at least one processor 120 may execute the application and may control the display module 160 (e.g., the first display 251 and the second display 252 of FIG. 1, the display member 340 of FIG. 3A, the display module 321 of FIG. 3C) to display the execution screen of the application. According to an embodiment, the at least one processor 120 may obtain state information related to a state change of at least one application or a state change of content included in the application by a user interaction or at least one sensor (e.g., the sensor module 176 of FIG. 1). The at least one processor 120 may change at least one graphical object among the plurality of graphical objects 411, 413, and 415 to indicate a state change of the at least one application, based on the state information about the at least one application, and may control the display module 160 to display the changed icon 410 reflecting the changed at least one graphical object in the 3D virtual space 401.

Figure 5A:
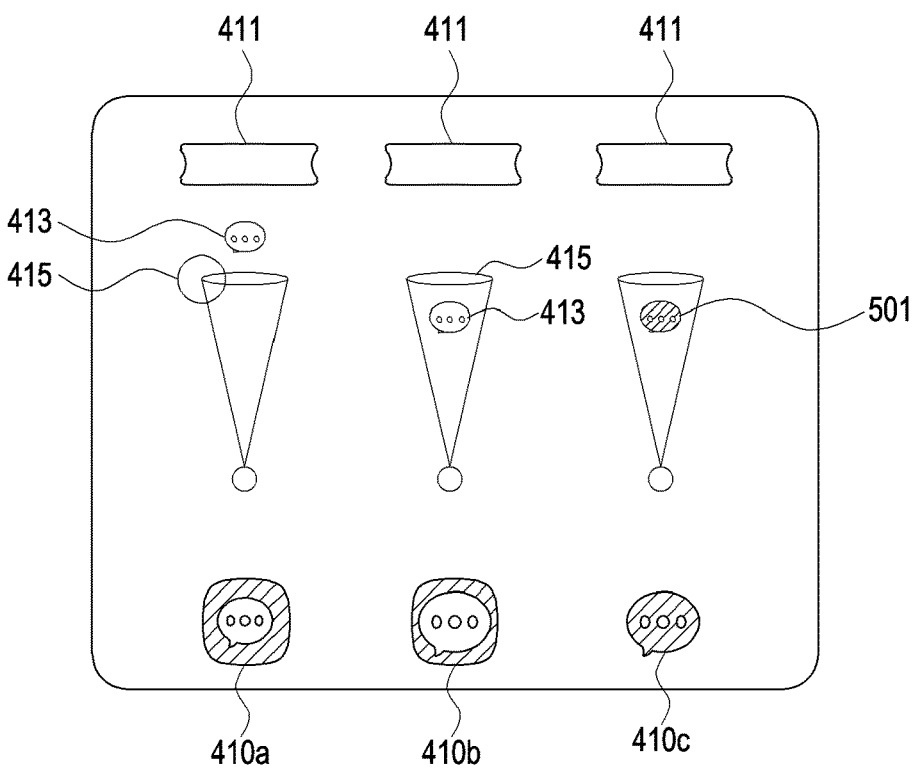
FIGS. 5A and 5B are views illustrating an example icon to be displayed on an electronic device according to an embodiment of the disclosure.
Figure 5B:
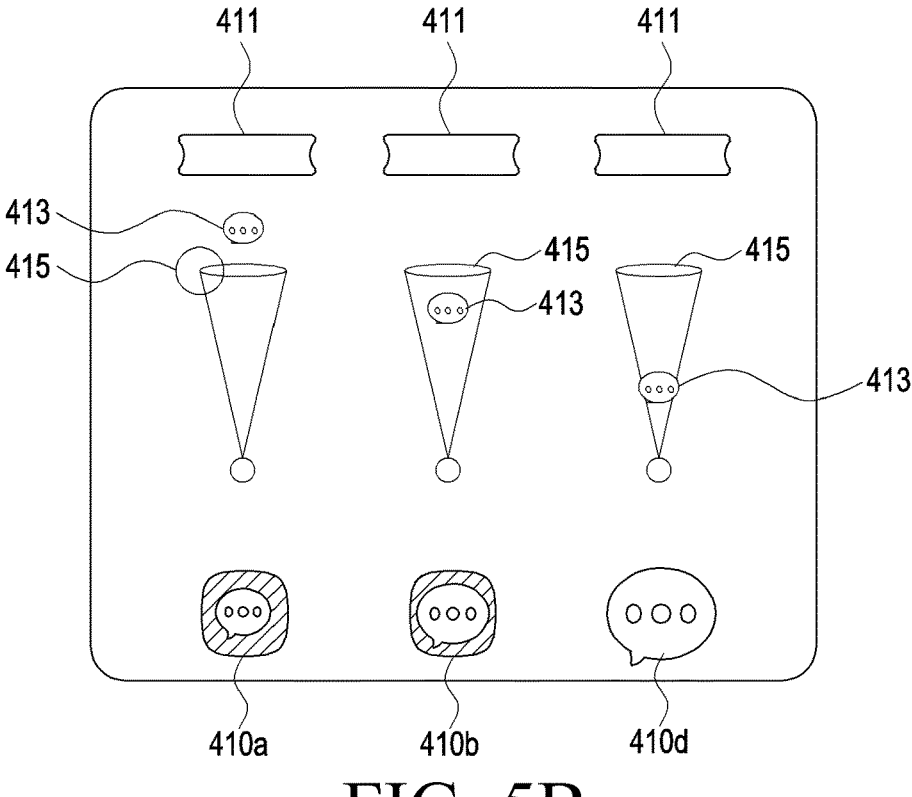

According to an embodiment, the at least one processor 120 may change the layer order (e.g., arrangement order with respect to the depth direction (z direction)) of the plurality of graphical objects 411, 413, and 415 based on the state information about the at least one application. According to an embodiment, as illustrated in FIG. 5, the at least one processor 120 may display an icon 410a configured as a layer in the order of the first graphical object 411, the second graphical object 413, and the third graphical object 415 in the direction toward the user. When the at least one processor 120 identifies the state change of the application corresponding to the user interaction, the at least one processor 120 may display an icon 410b in which the second graphical object 413 configured in the layer between the first graphical object 411 and the third graphical object 415 is changed in order (e.g., transition state) to a higher layer of the first graphical object 411. When the at least one processor 120 identifies a change in the state of the application in response to the user interaction, based on the change in the state of the application, the processor 120 sets a layer between the first graphical object 411 and the third graphical object 415. An icon 410b obtained by changing the order of the second graphical object 413 to a higher layer of the first graphical object 411 (e.g., transition state) may be displayed. The at least one processor 120 may display an icon 410c changed into a form of a content object 501 in which some (e.g., the second graphical object 413 among the plurality of graphical objects) are maintained to have continuity/consistency to expose the content included in at least one application (e.g., display in the virtual space). The changed icon 410c is a metaphor icon form (e.g., an icon form including the content object 501 into which the second graphical object 413 has been changed) of the application when the content object 501 included in the application is exposed and may remain in a portion of the execution screen of the application or a partial area of the expanded content while some (e.g., the second graphical object 413) of the plurality of graphical objects are maintained. For example, the content object 501 may be an object changed by applying a visual effect (e.g., a graphic effect) to the second graphical object 413. When the execution screen of the content is displayed, the content object 501 may be displayed in an area overlapping or adjacent to the execution screen, and the visual effect may be applied in response to a change in the state of the content. According to an embodiment, the processor 120 may not display the third graphical object 415 (e.g., virtual window) if a changed icon 410*c* is displayed as the second graphical object 413 is changed into the content object 501 as shown in FIG. 5A, and may maintain (e.g., display or provide) the changed icon 410*c* (e.g., changed second graphical object) to be adjacent to or overlap the execution screen. According to an embodiment, as shown in FIG. 5B, the processor 120 may control the display module to enlarge and display the graphical object 415, like the icon 410*d*, if the graphical object 413 moves closer to the camera module than the icon 410*b*. In such a case, as the graphical object 413 is shown to the user's eyes to be larger than the third graphical object 415 (e.g., virtual window), like the icon 410*d*, the third graphical object 415 may not be shown to the user.

Figure 6A:
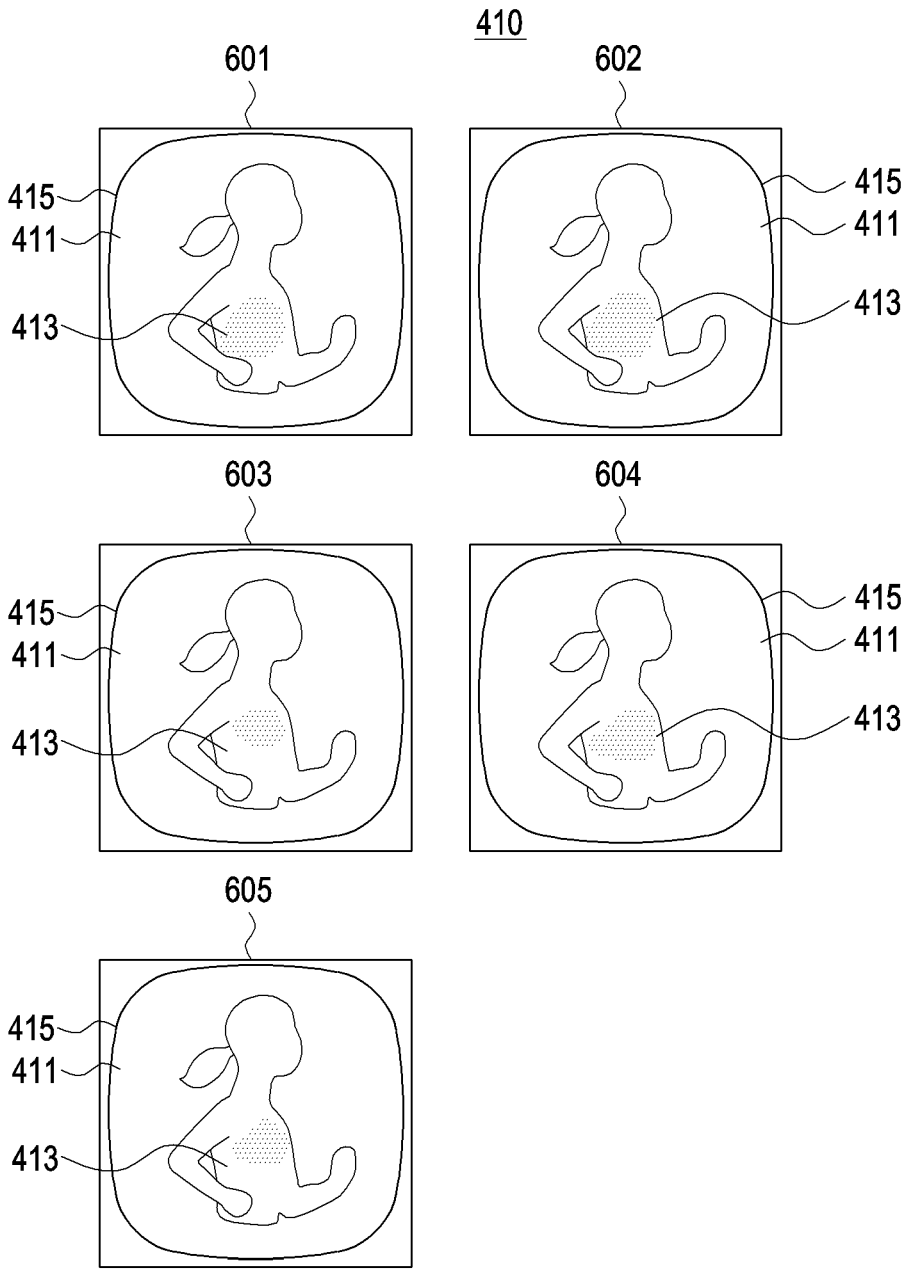
FIGS. 6A and 6B are views illustrating example icons to be displayed on an electronic device according to an embodiment of the disclosure.
Figure 6B:
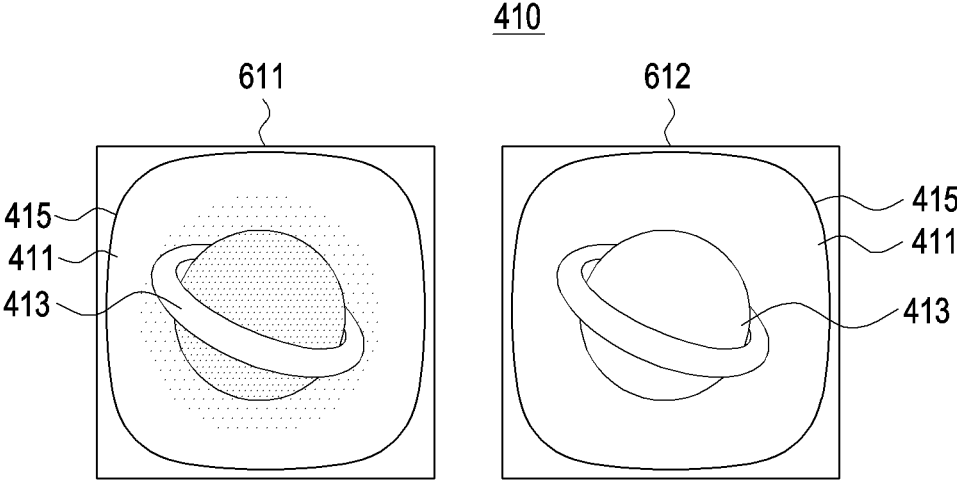

FIGS. 6A and 6B are views illustrating example icons to be displayed on an electronic device according to an embodiment of the disclosure.

Referring to FIGS. 1, 4A, 4B, 6A, and 6B, the at least one processor 120 of the electronic device 200 (e.g., the electronic device 101 of FIG. 1, the electronic device 200 of FIG. 2, the electronic device 300 of FIGS. 3A, 3B and 3C) according to an embodiment may display, in the 3D virtual space 401, an icon 410 in which a visual effect is applied to the second graphical object 413 (e.g., picto or symbol image) and/or the third graphical object 415 or the size of the second graphical object 413 and/or the third graphical object 415 (e.g., virtual window) is changed, based on the state information about the at least one application (e.g., a specified application). According to an embodiment, when a specific application (e.g., a health-related application or a sleep-related application) related to the user's movement is running, the at least one processor 120 may apply a visual effect (e.g., a visual effect representing a heartbeat) to the second graphical object 413, as in a first example 601 of the icon 410. As in a second example 602, a third example 603, a fourth example 604, and a fifth example 605 of the icon 410, the at least one processor 120 may obtain information related to the movement of the user as state information about the application over time, and may apply a visual effect of dynamically changing based on the information related to the movement of the user (e.g., a visual effect of changing the color according to the movement of the heartbeat or the number of heartbeats). For example, as illustrated in FIG. 6A, when the at least one processor 120 identifies that the user normally moves, based on the movement information about the user obtained using at least one sensor, the at least one processor 120 may apply, to the second graphical object 413, a visual effect representing the movement of the heartbeat in a first color (e.g., green) as in the first example 601. For example, the at least one processor 120 may apply, to the second graphical object 413, a visual effect representing the movement of the heartbeat that is gradually dynamically changed from the first color (e.g., green) of the first example 601 to a second color (e.g., red) of the second example 602, when it is identified that the user's movement is changed from his usual movement to a quicker movement based on the obtained user movement information. Thereafter, when identifying that the user's movement is changed from a higher speed to a lower speed based on the obtained user movement information, the at least one processor 120 may apply, to the second graphical object 413, a visual effect that represents the movement of the heartbeat that dynamically changes gradually from the second color (e.g., red) of the second example 602 to a third color (e.g., yellow or orange) of the third example 603 and, according to continuous movement changes, dynamically changes into the first color (e.g., green) of the fourth example 604, Then, when identifying that the movement is continuously changed into a higher speed, the at least one processor 120 may apply, to the second graphical object 413, a visual effect representing the movement of the heartbeat that dynamically changes from the first color (e.g., green) of the fourth example 604 to the second color (e.g., red) of the fifth example 605. For example, as shown in FIG. 6B, the at least one processor 120 may apply, to the second graphical object 413 and/or the third graphical object 415, a visual effect that gradually changes the color or brightness according to changes in content information (e.g., resizing according to the number of received messages) or resize the second graphical object 413 and/or the third graphical object 415 in response to a change in content information as in the examples 611 and 612 of the icon 410 based on the content information (e.g., the number of received messages) about a specific application (e.g., messaging or messenger-related application).

Figure 7:
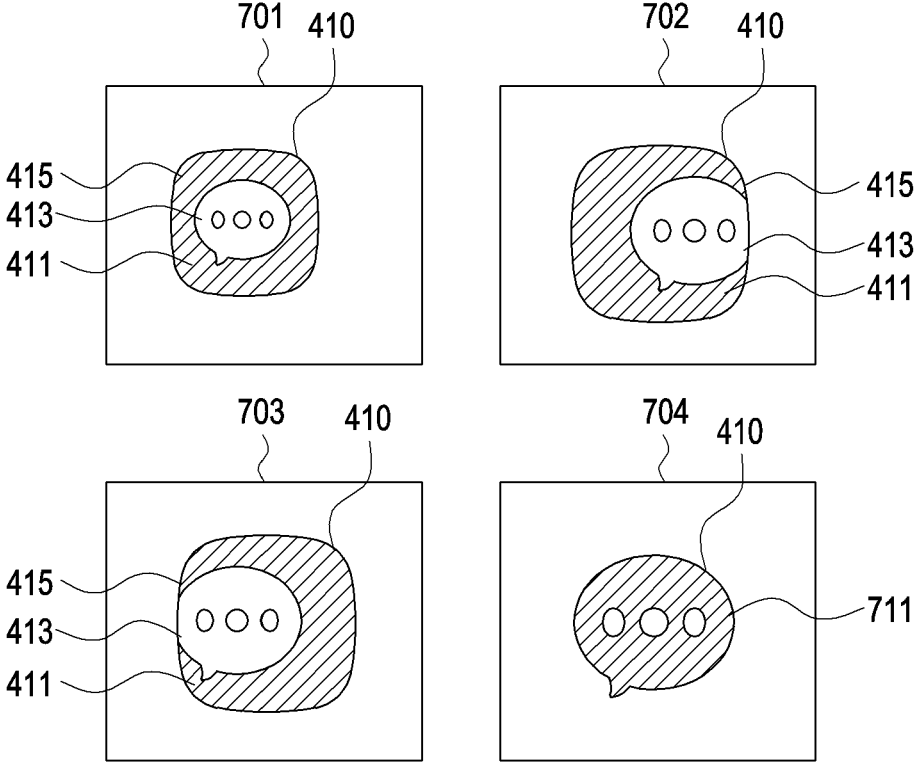
FIG. 7 is a view illustrating an example icon to be displayed on an electronic device according to an embodiment of the disclosure.

FIG. 7 is a view illustrating an example icon to be displayed on an electronic device according to an embodiment of the disclosure.

Referring to FIGS. 1, 2, 3A, 3B, 3C, and 7, as in examples 701, 702, and 703, the at least one processor 120 according to an embodiment may display an icon 410 reflecting a visual effect (e.g., a graphical effect) of dynamically moving the second graphical object 413 left/right or up/down in the area of the third graphical object 415 in response to a user interaction. When the icon 410 is selected by a user input (e.g., tap), the at least one processor 120 may execute the application indicated by the icon 410 and may display a content object 711 in which the color, size, or shape of the second graphical object 413 is changed, as shown in the example 704, in the form of an icon capable of exposing the content of the application.

Figures 8A, 8B:
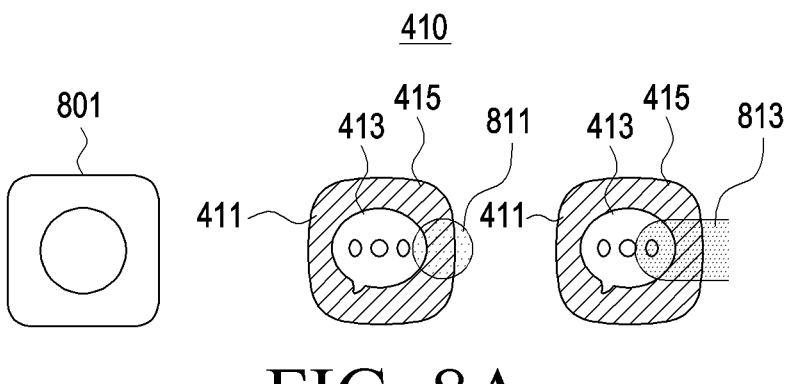
FIGS. 8A and 8B are views illustrating example icons to be displayed on an electronic device according to an embodiment of the disclosure.

FIGS. 8A and 8B are views illustrating example icons to be displayed on an electronic device according to an embodiment of the disclosure.

Referring to FIGS. 1, 2, 3A, 3B, 3C, and 8A, when displaying an icon 410 including a plurality of graphical objects in a 2D environment, the at least one processor 120 according to an embodiment may display, on the display, an icon 410 in which the plurality of graphical objects are configured in the form of one image 801 (e.g., 2D graphical object) in the 2D environment, and may execute an application in response to a user input (e.g., user gesture (tap or swipe)) 811 and 813 (e.g., third user input). The entire image 801 may be an object to which a motion may be applied.

Referring to FIGS. 1, 2, 3A, 3B, 3C, and 8B, when displaying an icon 410 including a plurality of graphical objects in a virtual space (e.g., an XR environment) of a 3D environment, the at least one processor 120 according to an embodiment may display an icon 410 in the form of a 3D image 803 (e.g., 3D graphical object) such that each of the plurality of graphical objects may be dynamically changed in the 3D environment, based on state information about an application. The at least one processor 120 may receive a user input (e.g., tap, swipe, or grabbing) (e.g., first user input) in the area of each of the second graphical object 413 and the first graphical object 411 or the third graphical object 415 among the plurality of graphical objects. According to an embodiment, when an input of grabbing the second graphical object 413 is received, the at least one processor 120 may perform a function of the corresponding application or an operation related to the content of the application. For example, when an input 821 (e.g., first user input) for tapping the second graphical object 413 is received, the at least one processor 120 may act as a shortcut capable of immediately executing the application. For example, when an input 823 (e.g., second user input) for tapping the first graphical object 411 is received, the at least one processor 120 may expand (e.g., apply a graphical effect according to the window resizing) a virtual window of the smallest unit. For example, when an input 825 (e.g., third user input) for swiping or grabbing the second graphical object 413 is received, the at least one processor 120 may immediately execute a predesignated operation (e.g., a function, content, widget, or uniform resource locator (URL) in response to the swiping or grabbing. For example, when an input 827 for swiping the first graphical object 411 is received, the at least one processor 120 may extend the execution screen to the largest and most detailed execution screen of a specified application or immediately execute the execution screen for the last operation during the previous execution, an execution screen for the user's preferred operation, or an execution screen for an operation where a specified event (e.g., notification) occurs.

According to an embodiment, the processor 120 of the electronic device 101 may arrange a first graphical object 411, a second graphical object 413, and a third graphical object 415 in a specified arrangement order in the depth direction (e.g., z direction) and receive a user input (e.g., a first user input or a second user input) for selecting at least one from among the first graphical object 411, the second graphical object 413, or the third graphical object 415 which the user's gaze is at while displaying the first graphical object 411, the second graphical object 413, and the third graphical object 415 in the specified arrangement order in the depth direction. Here, the gaze may be the binocular vision field in which the viewing angles of the left eye and right eye of the user overlap, and the binocular vision field is known to be about 120 degrees. The values mentioned for the viewing angle are exemplary, and it is easily understood by one of ordinary skill in the art that a slight difference is present depending on the shape of the user's face or the relative positions between the left eye and the right eye. According to an embodiment, upon receiving a first user input (e.g., a gesture input), the processor 120 may execute at least one function of a specified application based on the first user input. According to an embodiment, upon receiving a second user input (e.g., a gesture input or a gaze input) different from the first user input, the processor 120 may apply a graphical effect (e.g., size, shape, position, color, or arrangement order) to at least one graphical object among a plurality of graphical objects based on the second user input. According to an embodiment, the processor 120 may execute at least one function of a specified application based on a third user input (e.g., a gesture input or a gaze input), apply (e.g., change, provide, or display) a graphical effect to at least one graphical object among a plurality of graphical objects, and display the graphic effect-applied at least one graphical object (or an icon (e.g., the icon 410 of FIG. 4) including the graphical objects) in the 3D virtual space. Here, the third user input may be an input different from the first user input and the second user input. According to an embodiment, the electronic device may identify the direction of the gaze and, if the gaze is at the first graphical object 411, the second graphical object 413, or the third graphical object 415 during a specified time (e.g., N sec) and the second user input is received, the processor 120 may apply the graphical effect to at least one graphical object.

According to an embodiment, the processor 120 may identify that the user's gaze is at the third graphical object 415 and, if receiving the first user input for selecting the third graphical object 415, display at least one widget (e.g., at least one execution screen) corresponding to at least one function of the specified application in the 3D virtual space (e.g., an XR or AR environment).

According to an embodiment, the processor 120 may identify that the gaze is at the second graphical object 413 and, if receiving the first user input for selecting the second graphical object 413, execute the specified application in the 3D virtual space (e.g., an XR or AR environment).

According to an embodiment, the processor 120 may identify that the gaze is at the first graphical object 411 and, if receiving the sixth user input for selecting the first graphical object 411, change the virtual 3D space where the third graphical object 415 is displayed from a set space 1641 (e.g., AR space (or environment)) to another space (e.g., a VR space (or environment)). Here, the sixth user input may differ from the first to fifth user inputs. The virtual 3D space may be selectively switched from one of a first space generated using the camera module 180, 211-1, 211-2, 213, 313, 314, 315, and 316 or a second space previously stored in the memory 130 to the other. According to an embodiment, the processor 120 may display content provided by the specified application in the changed space (e.g., a VR environment). According to an embodiment, in response to at least one of the first user input or the second user input, the processor 120 may provide an interaction (e.g., a visual effect (or graphic effect) or layout change) to at least partially change at least part of the arrangement order of the first graphical object 411, the second graphical object 413, or the third graphical object 415 which are arranged in the gaze direction and move at least some of the first graphical object 411, the second graphical object 413, or the third graphical object 415 along the gaze direction. For example, the processor 120 may change the arrangement order of the at least one widget (e.g., execution screen) corresponding to the second graphical object 413 which is next to the first graphical object 411 along the depth direction not to be shown to the user by the first graphical object 411 in order according to the direction in which the user's gaze at the second graphical object 413 moves, and may provide an effect of being absorbed (or disappearing) by the third graphical object 415. As another example, if a specified event occurs (e.g., generation of a notification, a widget update, and/or the user's request), the processor 120 may change the arrangement order so that at least some of one or more widgets and a newly executed widget are disposed ahead of the first graphical object 411 in order to be shown to the user, and provide such a graphical effect (e.g., an interaction, a visual effect, or a layout change) as if at least some of the one or more widgets and the newly executed widget penetrate the first graphical object 411.

According to an embodiment, the processor 120 may change the order of the first graphical object 411, the second graphical object 413, and the third graphical object 415 in an arrangement order different from a specified arrangement order along the depth direction (e.g., z direction). The processor 120 according to an embodiment may change the graphic effect (e.g., size, position, shape, color, or transparency) to at least a portion of at least one of the first graphical object 411, the second graphical object 413, or the third graphical object 415 where the second user input is received, based on gaze information (e.g., gaze information and/or eye shape information) when performing the operation of applying the graphic effect. According to an embodiment, the processor 120 may change at least one of the size or color of the first graphical object 411 based on receiving a second user input to the first graphical object 411. According to an embodiment, the processor 120 may change at least one of the size, position, shape, or color of the second graphical object 413 based on receiving a second user input to the second graphical object 413. According to an embodiment, the processor 120 may change at least one of the size or transparency of the third graphical object 415 based on receiving a second user input to the third graphical object 415.

According to an embodiment, when the second graphical object 413 includes objects (e.g., graphical objects) respectively representing a plurality of applications, the processor 120 may execute the plurality of applications based on receiving a first user input to the second graphical object 413 and control the display module 160 to display the respective execution screens of the executed applications in the 3D virtual space. The processor 120 may control the display module 160 to individually display the objects respectively representing the plurality of applications between the first graphical object 411 and the third graphical object 415 while replacing the second graphical object 413 based on receiving a fourth user input. Here, the fourth user input may differ from the first user input to the third user input.

According to an embodiment, the second graphical object 413 may include objects (e.g., graphical objects) respectively representing one or more sub functions provided by a specified application. According to an embodiment, the processor 120 may control the display module 160 to display the objects respectively representing the plurality of sub functions of the specified application instead of, or adjacent to, the second graphical object 413, upon receiving a fifth user input (e.g., a double tap or a swipe in a specific direction) to the second graphical object 413. Here, the fifth user input may differ from the first user input to the fourth user input. According to an embodiment, upon receiving a first user input (e.g., tap) for selecting any one of the objects respectively representing the plurality of sub functions of the specified application, the processor 120 may perform the function corresponding to the selected object.

According to an embodiment, the processor 120 may obtain image information using a camera module (e.g., the camera module 180 of FIG. 1, the camera modules 212-1 and 212-2 of FIG. 2, the camera modules 325 and 326 of FIG. 3C) for facial recognition, identify at least one of the eye movement or eyelid movement using the obtained image information, and obtain (e.g., determine or identify) the user's gaze information based on at least one of the identified eye movement or eyelid movement. Here, the gaze information may include information related to at least one of gaze fixing, gaze moving, or gaze direction. According to an embodiment, the processor 120 may obtain shape information about the user's eye (e.g., size of the eye obtained based on eyelid movement) based on the obtained image information.

According to an embodiment, if the user's gaze is at the third graphical object 415 during a specified time as the second user input, the processor 120 may change the size of the third graphical object 415 based on the size of the user's eye or the position of the user's gaze.

According to an embodiment, if identifying the second graphical object 413 which the user's gaze is at (e.g., designated) during the specified time as the second user input, the processor 120 may change the position of the second graphical object 413 based on the fixing or moving of the user's gaze.

According to an embodiment, if identifying the first graphical object 411 which the user's gaze is at (e.g., designated) during the specified time as the second user input, the processor 120 may apply a graphic effect (e.g., change the brightness, saturation, or transparency of the first graphical object 411) to the first graphical object 411 based on at least one of fixing or moving (e.g., eye direction) of the user's gaze or the eye size.

According to an embodiment, the processor 120 may identify that the user's gaze is at the first icon during a specified time (N sec) as the second user input when a plurality of icons are provided, designate the user's gaze to the first icon, and change the color or size of the first icon.

The electronic device 101 according to an embodiment may implement a software module (e.g., the program 140 of FIG. 1) for displaying a changeable icon including a plurality of graphical objects. The memory 130 of the electronic device 101 may store commands (e.g., instructions) for implementing the software module illustrated in FIG. 1. The at least one processor 120 may execute instructions stored in the memory 130 to implement the software module illustrated in FIG. 1, and may control hardware (e.g., the sensor module 176, the camera module 180, the communication module 190, the display module 160, or other necessary modules of FIG. 1) associated with the function of the software module.

According to an embodiment, the software module of the electronic device 101 may include a kernel (or HAL), a framework (e.g., the middleware 144 of FIG. 1) and an application (e.g., the application 146 of FIG. 1). At least part of the software module may be preloaded on the electronic device 101, 200, or may be downloaded from a server (e.g., the server 108 of FIG. 1).

As such, in an embodiment, the main components of the electronic device have been described through the electronic device 101 of FIG. 1, the electronic device 200 of FIG. 1, and the electronic device 300 of FIGS. 3A, 3B and 3C. In various embodiments, however, all of the components of FIGS. 1, 2, 3A, 3B, and 3C are not essential components, and the electronic device 101, 200 and 300 may be implemented with more or less components than those shown. The positions of the major components of the electronic device 101, 200, and 300 described above in connection with FIGS. 1, 2, 3A, 3B and 3C may be varied according to various embodiments.

According to an embodiment, an electronic device (e.g., the electronic device 101 of FIG. 1, the electronic device 200 of FIG. 2, the electronic device 300 of FIGS. 3A, 3B and 3C) may comprise a display (e.g., the display module 160 of FIG. 1, the first display 251 and second display 252 of FIG. 2, the display member 340 of FIG. 3A, the display module 321 of FIG. 3C), memory (e.g., the memory 130 of FIG. 1), and at least one processor (e.g., the processor 120 of FIG. 1) electrically connected to the display and the memory.

According to an embodiment, the at least one processor of the electronic device may be configured to control the display to display an icon (e.g., the icon 410 of FIGS. 4A and 4B) executing at least one application, the icon including a plurality of graphical objects, change at least one graphical object among the plurality of graphical objects to indicate a state of the at least one application based on state information about the at least one application, and control the display to display a changed icon reflecting the changed at least one graphical object.

According to an embodiment, the plurality of graphical objects may include a first graphical object in a frame area, a second graphical object representing content of the at least one application, and a third graphical object in a background area. The plurality of graphical objects each have a layer depth. According to an embodiment, the icon may be configured to be displayed in a changeable form in a 2D environment and a 3D environment.

According to an embodiment, the at least one processor may be configured to change a layer order of the plurality of graphical objects based on operation state information about the at least one application.

According to an embodiment, the at least one processor may be configured to change a layer order of the second graphical object to a higher layer than the first graphical object in response to a change in a state of the at least one application or a user interaction.

According to an embodiment, the at least one processor may be configured to apply a visual effect to the second graphical object in response to a change in a state of the at least one application or a user input.

According to an embodiment, the at least one processor may be configured to perform functions corresponding to different operations for each of the plurality of graphical objects to which a user input is applied.

According to an embodiment, the at least one processor may be configured to, in response to a first user input, execute the at least one application and control the display to display the icon in which a visual effect is applied to at least one of the plurality of objects and, in response to the user's second user input, perform an operation of an application corresponding to the second user input and control the display to display the icon in which the visual effect is applied to at least one of the plurality of objects in response to a change in a state of an operation of the application.

According to an embodiment, the at least one processor may be further configured to, when exposing content included in the application, change the icon into a contact icon in a form of a content object in which some of the plurality of objects are maintained and display the contact icon in a portion of an execution screen of the application or a partial area of the content, enlarge or shrink the content in response to a user interaction to the contact icon, and change a display position and shape of the contact icon in response to the user interaction and display the contact icon.

According to an embodiment, the at least one processor may be configured to enlarge the second graphical object in response to an increase in a number of contents and shrink the second graphical object in response to a decrease in the number of contents.

According to an embodiment, the at least one processor may be configured to control the display to display an icon in which a visual effect is applied to the second graphical object based on a change in a distance between the first graphical object and the second graphical object, reception of an event affecting the third graphical object, or execution of a plurality of applications.

Figure 9:
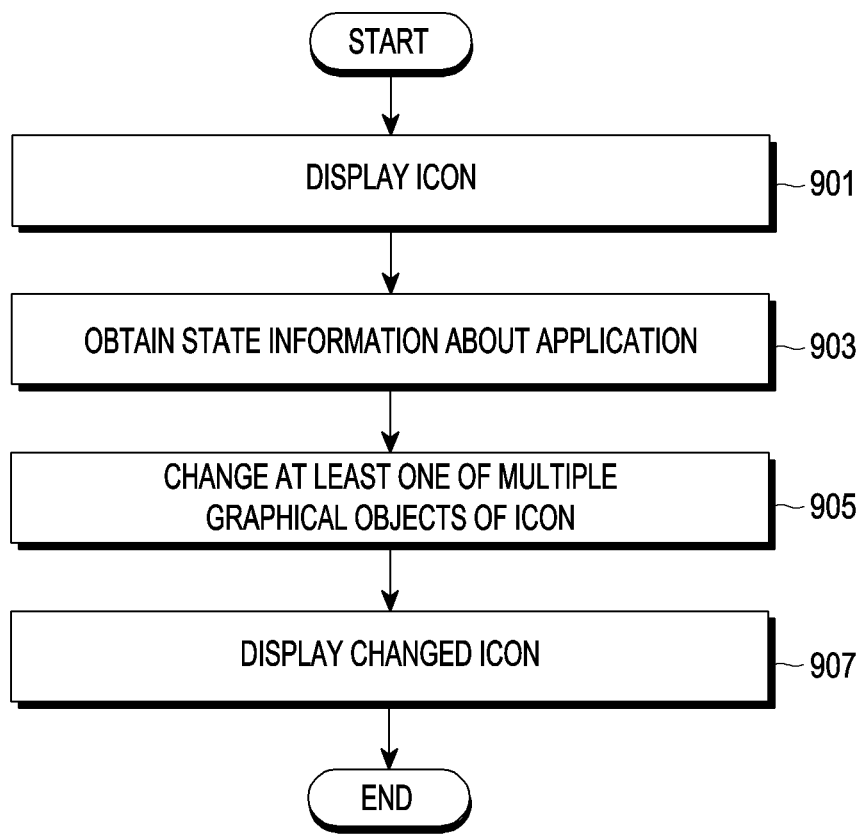
FIG. 9 is a flowchart illustrating an example of an operation method in an electronic device according to an embodiment of the disclosure.

FIG. 9 is a flowchart illustrating an example of an operation method in an electronic device according to an embodiment of the disclosure.

In the following embodiment, the operations may be sequentially performed, but may be performed non-sequentially. For example, the order of the operations may be changed, and at least two operations may be performed in parallel.

According to an embodiment, it may be understood that operations 901 to 907 are performed by a processor (e.g., the processor 120 of FIG. 1) of an electronic device (e.g., the electronic device 101 of FIG. 1, the electronic device 200 of FIG. 2, the electronic device 300 of FIGS. 3A, 3B and 3C).

Referring to FIG. 9, in operation 901, an electronic device (e.g., the electronic device 101 of FIG. 1, the electronic device 200 of FIG. 2, the electronic device 300 of FIGS. 3A, 3B and 3C) according to an embodiment may perform control such that an icon executing at least one application is displayed in a 3D virtual space through a display module (e.g., the display module 160 of FIG. 1, the displays 251 and 252 of FIG. 2, the display member 340 of FIG. 3A, the display module 321 of FIGS. 3B and 3C). The icon (e.g., the icon 410 of FIGS. 4A and 4B) may include a plurality of graphical objects having a depth in the depth direction (e.g., z direction) (e.g., spaced apart or having a predetermined distance or gap), and may be configured as a tile of a minimum size as an image representing a specified application. The icon may be configured to execute the specified application when a user input (e.g., tap) (e.g., first user input) is received. The icon may be displayed to have a sense of space in a virtual space of a 3D environment in a changeable form, and may be displayed not only in a 3D environment but also in a 2D environment. The icon may be displayed on, e.g., a home screen in a 2D environment and a 3D environment. The icon 410 displayed in the 2D environment may denote a 2D graphical object. The icon 410 displayed in the 3D environment may denote a 3D graphical object.

The electronic device may generate a 2D graphical object corresponding to the shape projected onto the plane according to the order in which 3D graphical objects are arranged and display the generated 2D graphical object using the display module 160 in the 2D environment. A third graphical object (e.g., the third graphical object 415 of FIGS. 4A and 4B) of the background area including the content of at least one application, a second graphical object (e.g., the second graphical object 413 of FIGS. 4A and 4B) representing one or more contents of at least one application, and a plurality of graphical objects may include a first graphical object (e.g., the first graphical object 411 of FIGS. 4A and 4B) of the frame area. The plurality of graphical objects may be disposed to be spaced apart from each other (e.g., at a gap) by a predetermined distance in a specified arrangement order along the depth direction (e.g., z direction) for the first graphical object, the second graphical object, and the third graphical object, and at least one of the arrangement order, shape, size, color, transparency, or display position may be changed based on the state of the specified application.

In operation 903, the electronic device according to an embodiment may execute the specified application according to reception of a first user input and obtain state information about the specified application. The electronic device may obtain, as the state information, information indicating whether the application indicated by the icon is executed, a function of the application running, or a change in the operation state of the content included in the application running.

In operation 905, the electronic device according to an embodiment may change at least one graphical object among the plurality of graphical objects of the icon to indicate the state of at least one application, based on the state information about the at least one application. The electronic device may dynamically change the icon by applying (e.g., change, provide, or display) the graphical effect corresponding to the state change of at least one graphical object among the plurality of graphical objects in response to the state change of the application.

In operation 907, the electronic device according to an embodiment may display a changed icon including the changed at least one graphical object in the 3D virtual space by the display module.

FIGS. 10A to 10E are views illustrating an example of displaying an icon in an electronic device according to an embodiment of the disclosure.

Figure 10A:
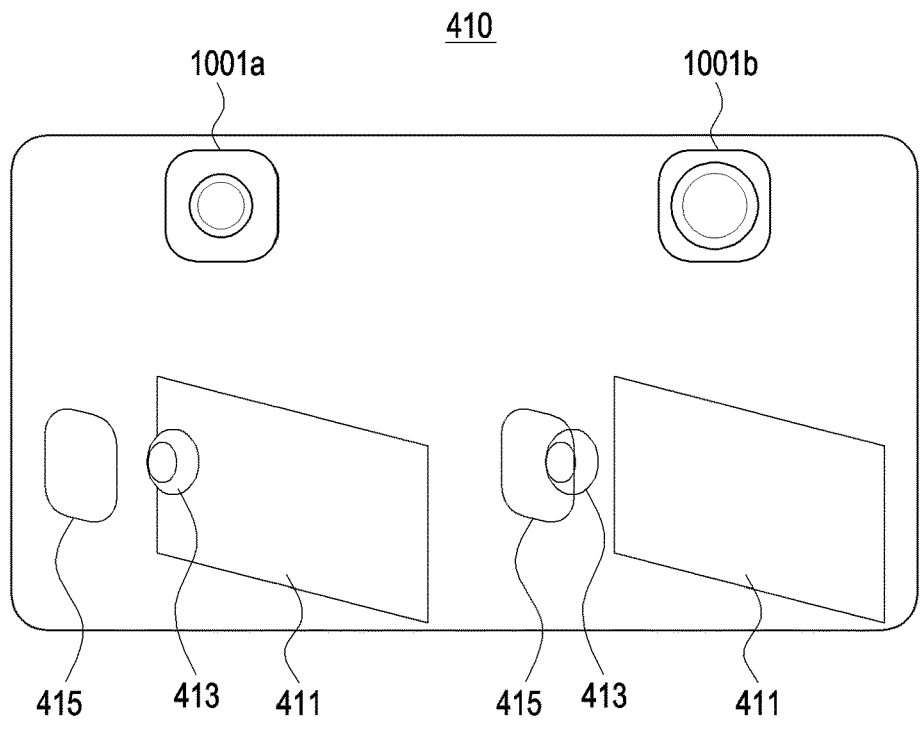
FIGS. 10A, 10B, 10C, 10D, and 10E are views illustrating an example of displaying an icon in an electronic device according to an embodiment of the disclosure.

Referring to FIG. 10A, an electronic device (e.g., the electronic device 101 of FIG. 1, the electronic device 200 of FIG. 2, the electronic device 300 of FIGS. 3A, 3B and 3C) according to an embodiment may identify a change in the distance between the first graphical object 411 and the second graphical object 413, based on state information about a specified application, and may display a change in the state of the icon 410 by changing (e.g., resizing) the second graphical object 413 according to the identified change in the distance. According to an embodiment, when the second graphical object 413 approaches the first graphical object 411, the electronic device may dynamically change the icon 410 by applying a visual effect 1001b (e.g., a graphic effect) of enlarging the second graphical object 413. According to an embodiment, when the second graphical object 413 moves away from the first graphical object 411, the electronic device may dynamically change the icon 410 by applying a visual effect 1001a of reducing the size of the second graphical object 413. For example, when a first user input (e.g., a gesture input) of pressing the second graphical object 413 is received, the specified application indicated by the icon 410 may be executed, and a state change of the icon 410 according to a distance change between the first graphical object 411 and the second graphical object 413 may be displayed based on the execution of the specified application. For example, the state change of the icon 410 according to the change in the distance between the first graphical object 411 and the second graphical object 413 according to the state change (e.g., an increase or decrease in the number of message receptions) of content included in the specified application running may be displayed.

Figure 10B:
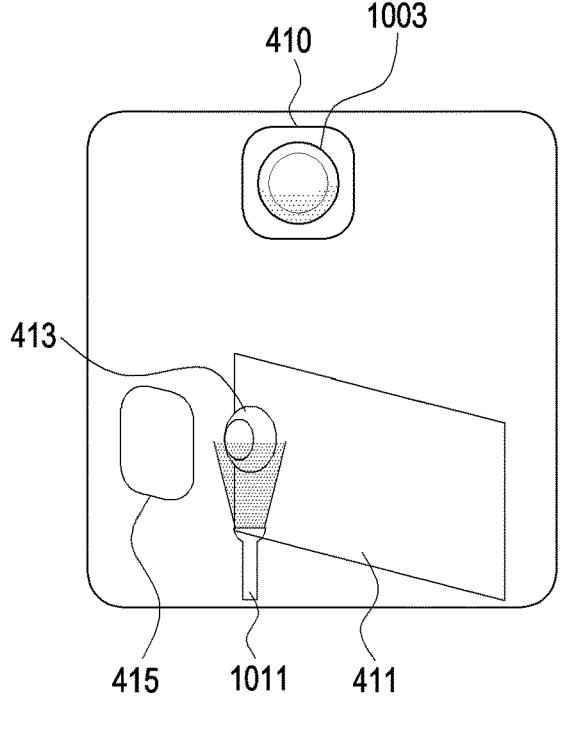
Figure 10C:
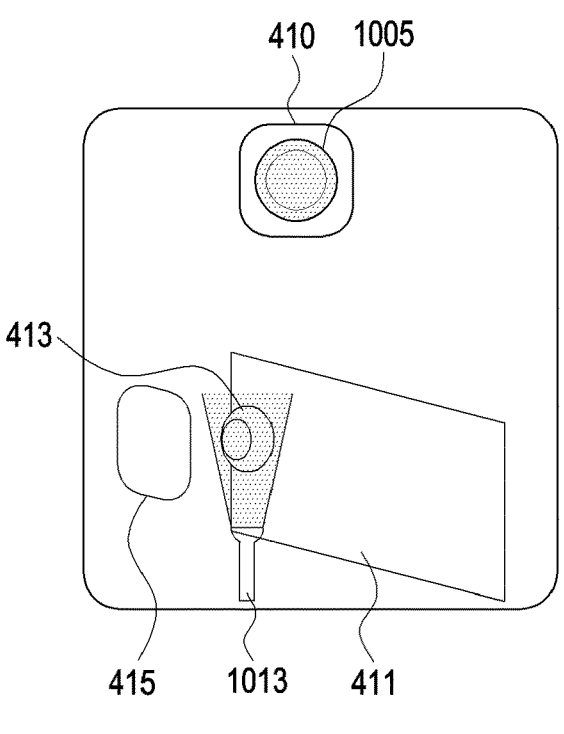

Referring to FIGS. 10B and 10C, when an event 1011 or 1013 (e.g., a change in brightness or lighting of the application) affecting at least one graphical object 411, 413, and 415 occurs, the electronic device according to an embodiment may dynamically change the icon 410 by applying a visual effect (e.g., lighting or outdate) 1003 or 1005 according to the event 1011 to the second graphical object 413, based on the state information of the specified application. For example, the electronic device may display an object 1011 indicating the event when there is an active application currently used, as the event affecting the at least one graphical object 411, 413, and 415, and apply a visual effect 1003 to the at least one graphical object 411, 413, and 415 to display the application or lighting brightly. For example, the electronic device may display an object 1013 indicating the event when there is an inactive application that may not be currently used, an application requiring an update, or an application running in the background, as the event affecting the at least one graphical object 411, 413, and 415, and apply a visual effect 1005 to the at least one graphical object 411, 413, and 415 to display the application or lighting darkly.

Figure 10D:
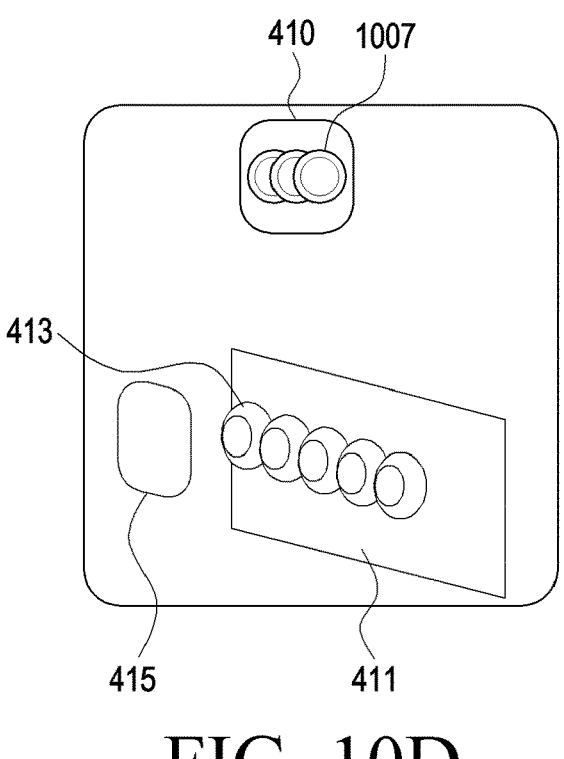

Referring to FIG. 10D, when objects respectively representing a plurality of applications included in the second graphical object are included, based on receiving a first user input, the electronic device according to an embodiment may execute the plurality of applications. The electronic device may display the respective execution screens of the plurality of applications in the 3D virtual space and, when displaying the execution screens, dynamically change the icon 410 by applying a visual effect (e.g., displaying a plurality of second graphical objects) 1007 of representing execution of a plurality of applications to the second graphical object when a plurality of applications are running.

Figure 10E:
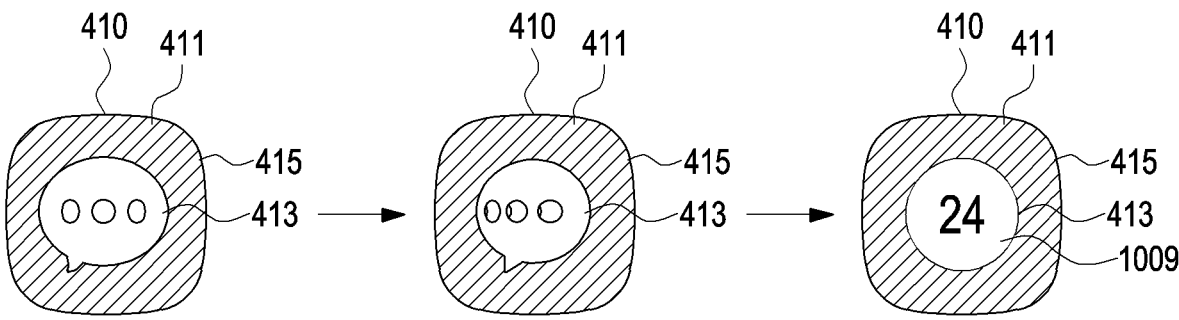

Referring to FIG. 10E, the electronic device according to an embodiment may dynamically change the icon 410 by applying a visual effect (e.g., a numerical representation according to the number of messages and/or rotation of the second graphical object) of representing the state (e.g., the number of messages) of the specified application by rotating the second graphical object 413 in response to the user's gesture input (e.g., swipe) according to a state change of the specified application when executing a specified application (e.g., a messaging or messenger-related application).

FIGS. 11A to 11I are views illustrating an example of an operation method in an electronic device according to an embodiment of the disclosure.

Figure 11A:
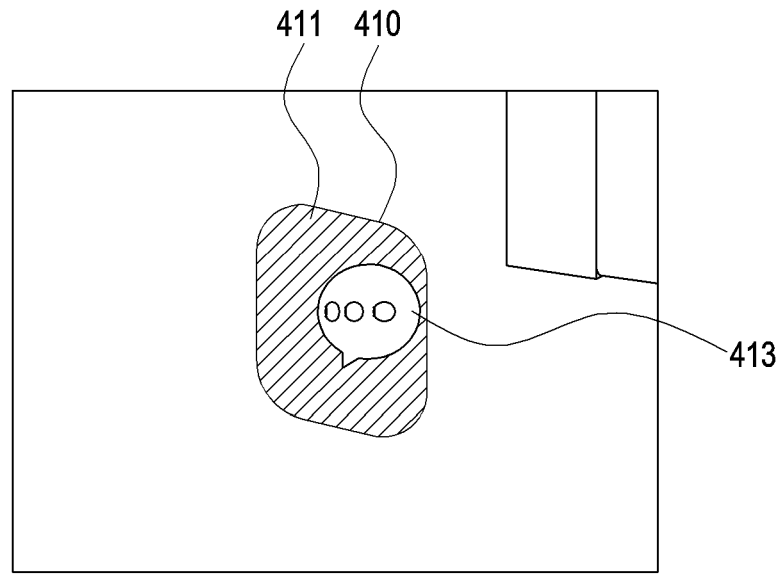
FIGS. 11A, 11B, 11C, 11D, 11E, 11F, 11G, 11H, and 11I are views illustrating an example of an operation method in an electronic device according to an embodiment of the disclosure.
Figure 11B:
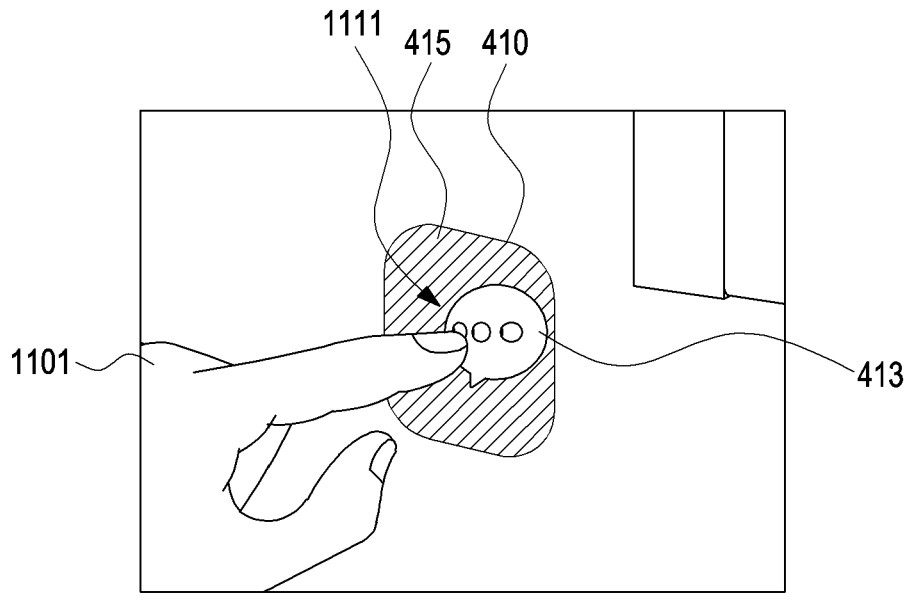
Figure 11C:
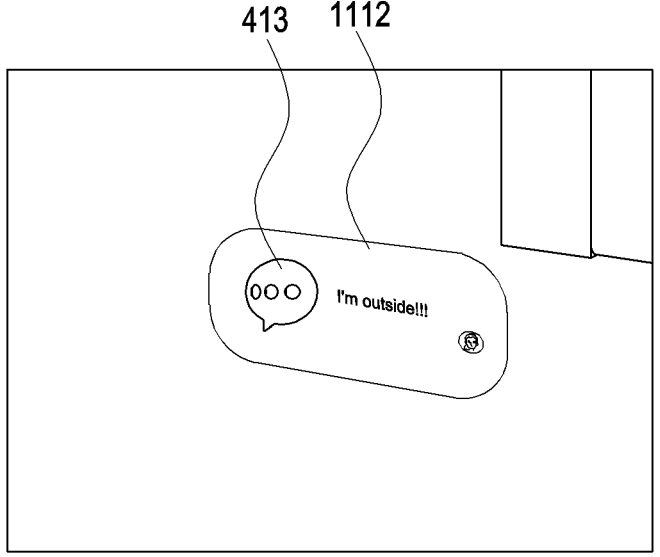

Referring to FIGS. 11A to 11I, an electronic device (e.g., the electronic device 101 of FIG. 1, the electronic device 200 of FIG. 2, the electronic device 300 of FIGS. 3A, 3B and 3C) according to an embodiment may display an icon 410 including a plurality of graphical objects in a virtual space. In response to a first user input (e.g., tap) 1101, the electronic device may execute a specified application (e.g., a message or messenger-related application) indicated by the icon 410, maintain display of the icon 410 while the specified application is executed, and display an icon 410 reflecting a visual effect 1111 (e.g., a graphic effect) in which the second graphical object 413 is pressed. For example, the second graphical object 413 of the icon 410 may be shrunken and shown to the user according to a distance change in which it moves away from the third graphical object 415 (e.g., virtual window) in response to the first user input 1101 as shown in FIG. 11B. The electronic device may display an execution screen 1112 including some information (e.g., a brief message) of the content according to execution of the specified application. Here, the execution screen 1112 may be a screen in which the third graphical object 415 included in the icon 410 is enlarged. The electronic device may maintain or change the shape of the second graphical object 413 in response to the first user input (e.g., tap) 1101. The electronic device may display (e.g., maintain or provide) the shape-maintained or changed second graphical object 413 to be adjacent to or overlap the execution screen 1112 when displaying the execution screen 1112.

Figure 11D:
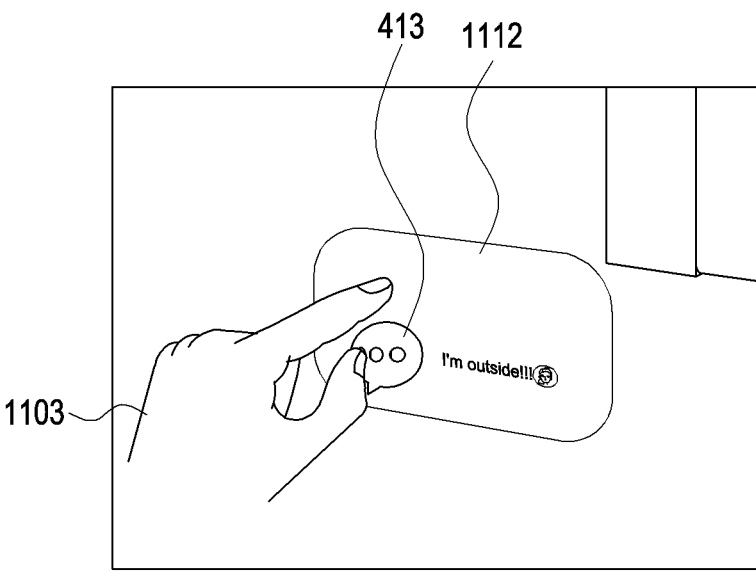
Figure 11E:
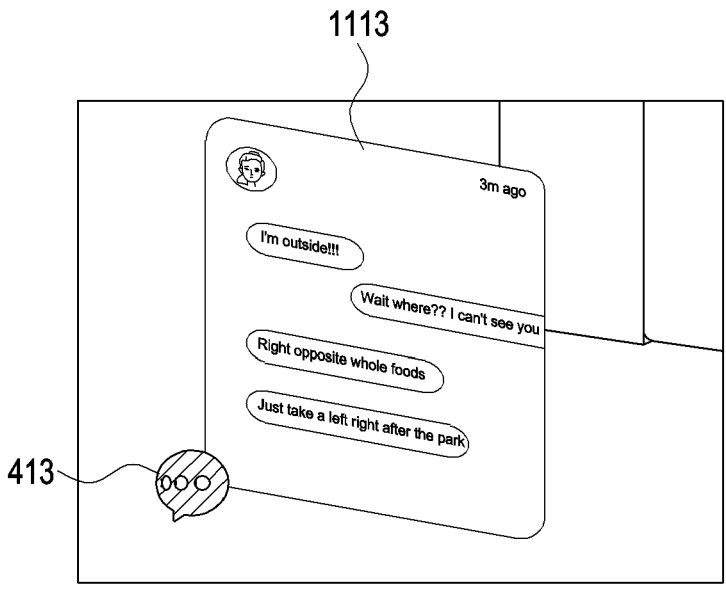
Figure 11F:
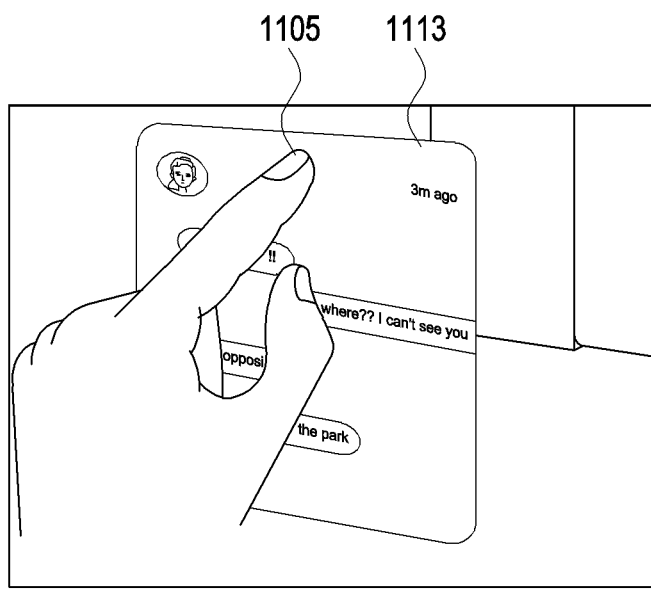
Figure 11G:
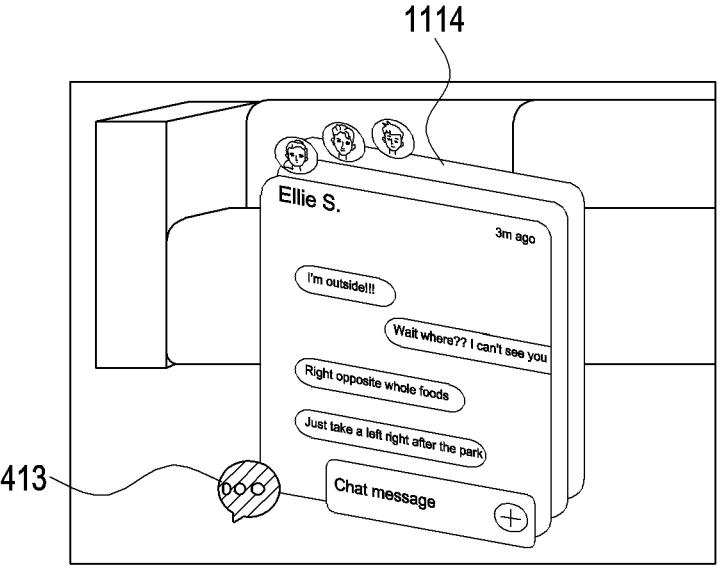
Figure 11H:
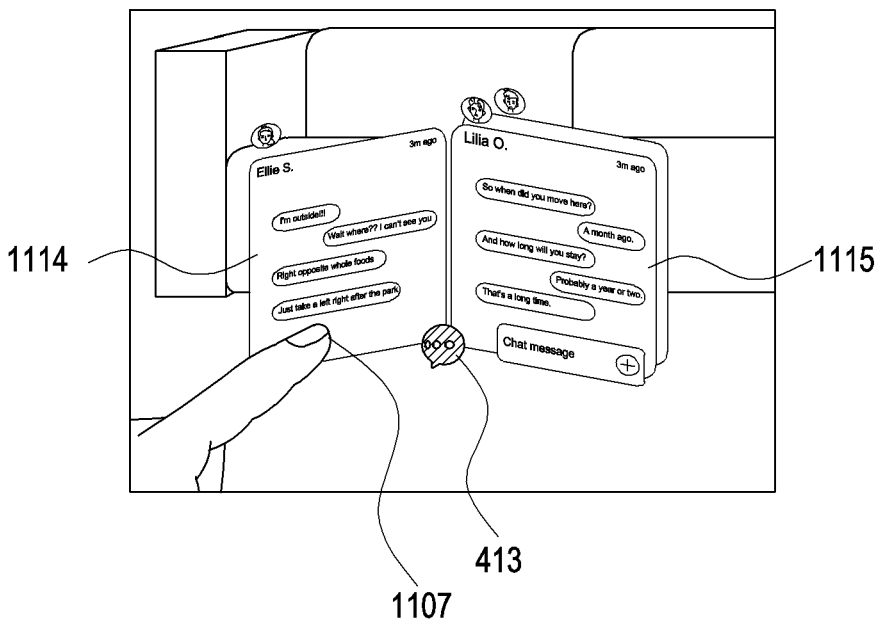
Figure 11I:
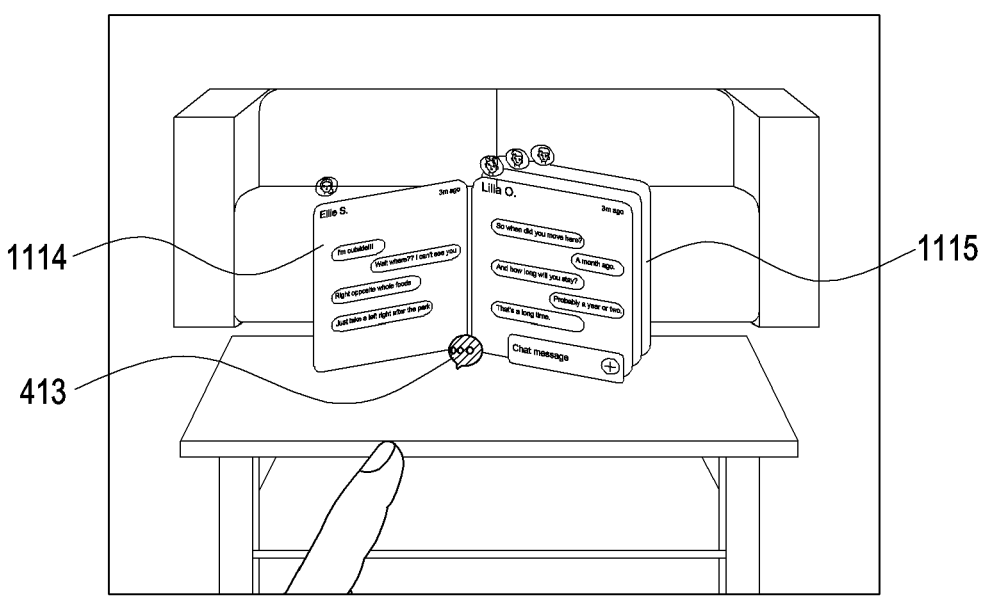

According to an embodiment, as shown in FIGS. 11D and 11E, upon receiving a user input 1103 while the specified application is executed, the electronic device (e.g., the electronic device 101 of FIG. 1, the electronic device 200 of FIG. 2, the electronic device 300 of FIGS. 3A, 3B and 3C) may display an execution screen 1113 including other information (e.g., detailed information about messages) about the content by enlarging the execution screen 1112 in response to a second user input 1103, apply a visual effect (e.g., recoloring) to the second graphical object 413 in response to a content state change, and change the second graphical object 413 into a content object (e.g., a content icon) and display it to maintain the second graphical object 413. The second graphical object 413 may be displayed on an upper layer of the execution screen 1113 in which the layer order has been changed to expand the first graphical object 411. Here, the execution screen 1113 may be a screen in which the first graphical object 411 included in the icon 410 is enlarged. The user input 1103 may be a different type of user input (e.g., pinch-to-zoom, zoom-in, swipe, or drag) from the first user input 1101.

According to an embodiment, as shown in FIGS. 11F to 11I, in response to a user input 1105, the electronic device may enlarge the execution screen 1113 to overlap and display other execution screens 1114 and 1115 including one or more other contents. The electronic device may change (e.g., spread the screens) the states of the execution screens 1114 and 1115 in response to a fourth user input 1107 and may display the changed states.

According to an embodiment, as opposed to expanding the execution screen 1113, the electronic device may shrink the execution screen 1113 by the user's input (e.g., pinch-in or zoom-out) of shrinking the enlarged content and display another execution screen including other functions or other contents as shown in FIGS. 11F to 11I.

FIGS. 12A to 12F are views illustrating an example of an operation method in an electronic device according to an embodiment of the disclosure.

Figure 12A:
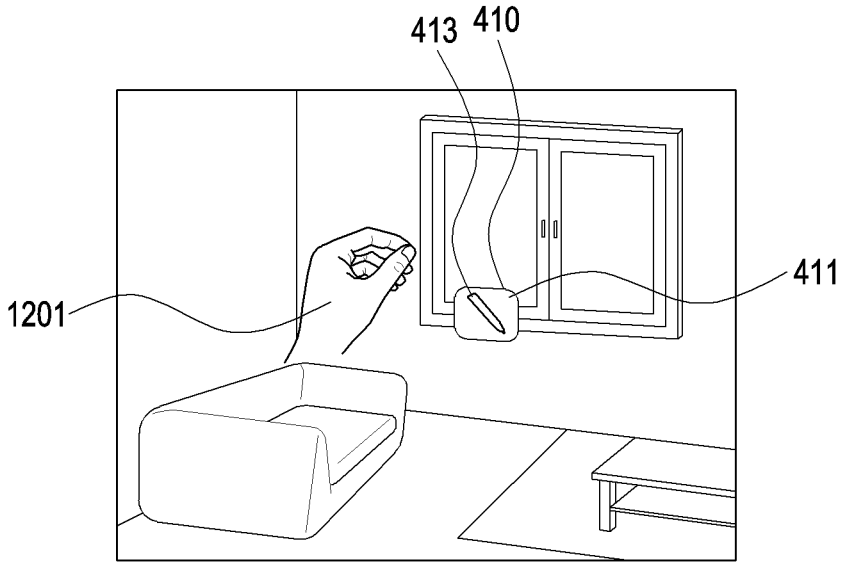
FIGS. 12A, 12B, 12C, 12D, 12E, and 12F are views illustrating an example of an operation method in an electronic device according to an embodiment of the disclosure.
Figure 12B:
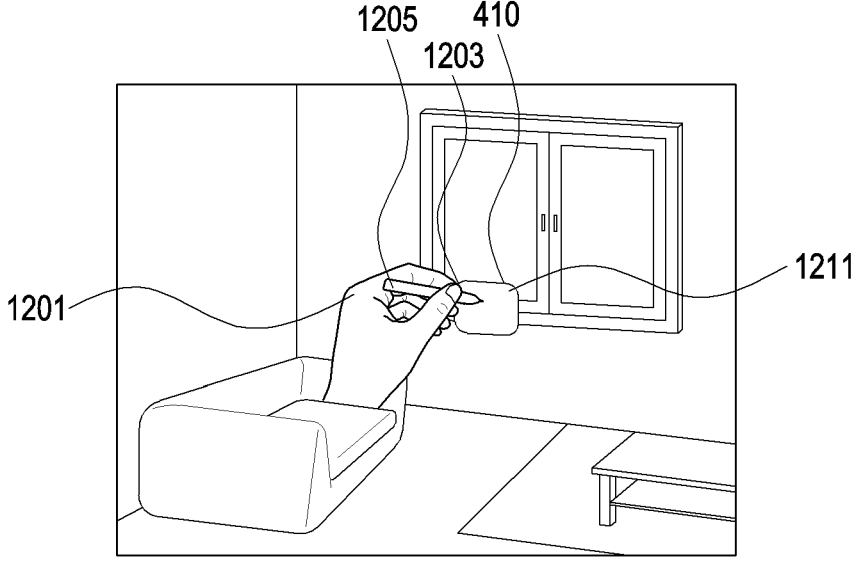

Referring to FIGS. 12A to 12F, an electronic device (e.g., the electronic device 101 of FIG. 1, the electronic device 200 of FIG. 2, the electronic device 300 of FIGS. 3A, 3B and 3C) according to an embodiment may display an icon 410 including a plurality of graphical objects in a virtual space. As shown in FIG. 12A, the electronic device may display an object 1201 corresponding to a movement of the user's hand and display an icon 410 in which a visual effect 1211 indicating a state change of the application is applied to the second graphical object 413. For example, as shown in FIG. 12B, the layer order may be changed so that the second graphical object 413 is shown on an upper layer of the first graphical object 411 in response to a first user input (e.g., grab) 1203.

Figure 12C:
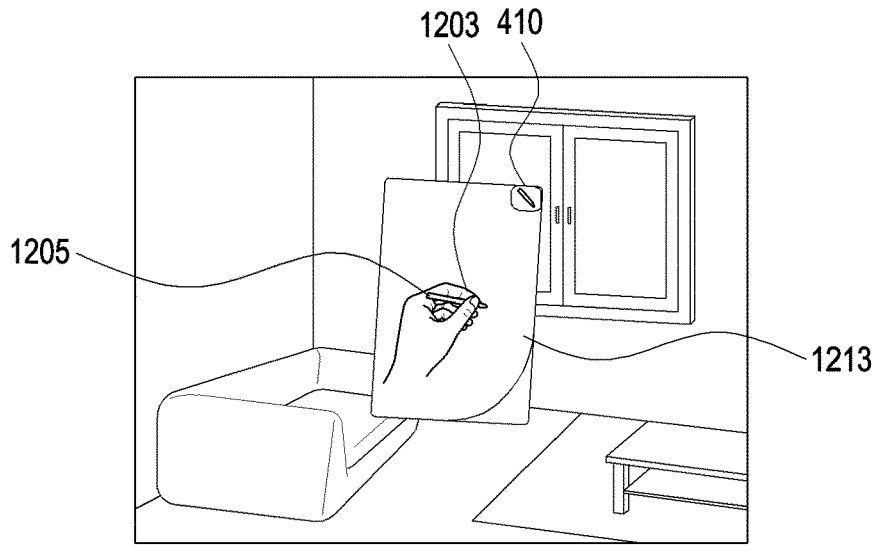
Figure 12D:
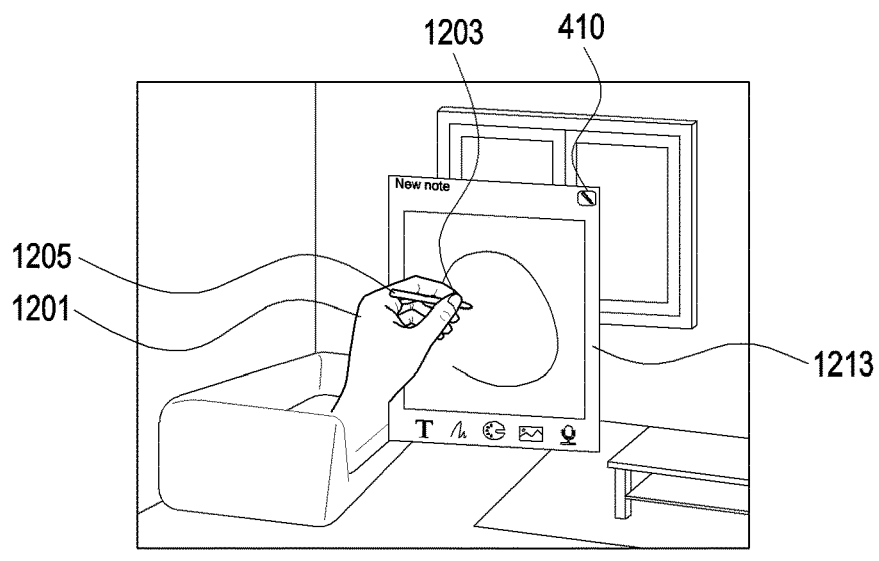

According to an embodiment, as shown in FIGS. 12B to 12D, the electronic device may execute an application (e.g., memo or image edit application) indicated by the icon 410 and display an execution screen 1213 of the application in response to a first user input (e.g., a gesture of grabbing the metaphor of the second graphical object) in a 3D environment (e.g., XR environment). For example, when receiving a user input 1203 according to the user's motion of grabbing the second graphical object 413 included in the icon 410 when the icon 410 is displayed in the virtual space of the 3D environment (e.g., XR environment), the electronic device may display a content icon (e.g., drawing tool or pen) 1205 which is a metaphor icon corresponding to the second graphical object 413 and display an execution screen 1213 including the function or content corresponding to the user input 1203. The electronic device may dynamically display the content icon (e.g., drawing tool or pen) 1205 corresponding to the second graphical object 413 in response to a movement of the object 1201 or a user interaction and execute an input (e.g., drawing) corresponding to the movement of the object 1201 or the user interaction. Here, the content icon 1205 may be an icon in which some (e.g., a second graphical object) among the plurality of graphical objects of the icon 410 are changed into a content object form to be maintained and may be displayed in a partial area of the content or a portion of the execution screen of the application so that some of the plurality of graphical objects have consistency/continuity. The electronic device may change the display position and shape of the changed content icon in response to a movement of the object 1201 or a user interaction and display the same. For example, as shown in FIG. 12B, the electronic device may display the content icon at a position where the content icon is grabbed in the user's hand and, if the content falls off the user's hand, display the content icon 1205 to have continuity or consistency at another position where the object 1201 of the user's hand is displayed, rather than removing the content icon 1205. Here, the execution screen 1213 may be a screen in which the first graphical object 411 included in the icon 410 is enlarged and displayed. The electronic device may maintain, or change by applying a visual effect, the shape of at least one graphical object (e.g., the second graphical object 413) among the plurality of graphical objects included in the icon 410 in response to the first user input (e.g., grab) 1203.

Figure 12E:
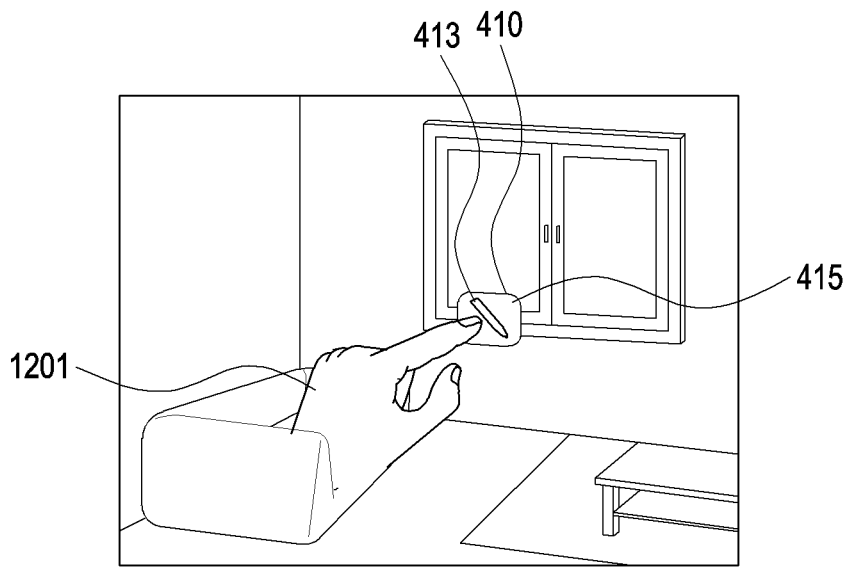
Figure 12F:
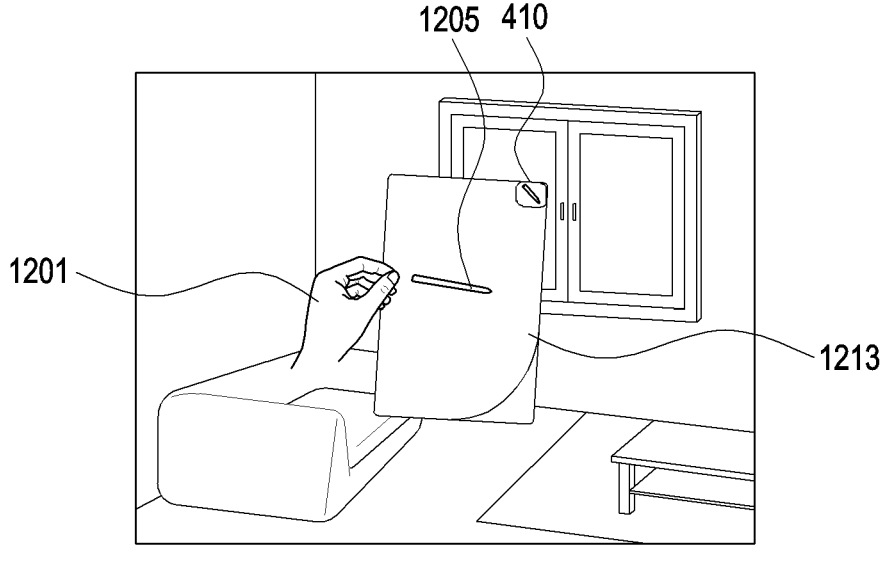
Figure 13A:
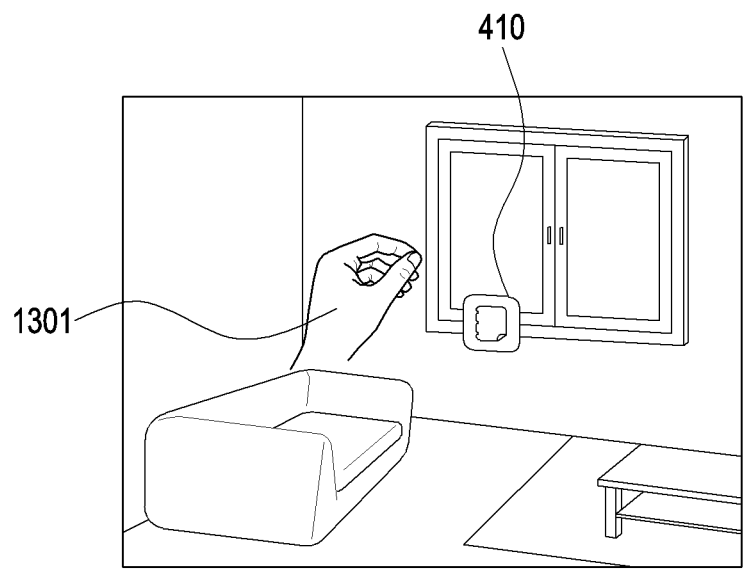
FIGS. 13A, 13B, 13C, 13D, 13E, and 13F are views illustrating an example of an operation method in an electronic device according to an embodiment of the disclosure.
Figure 13B:
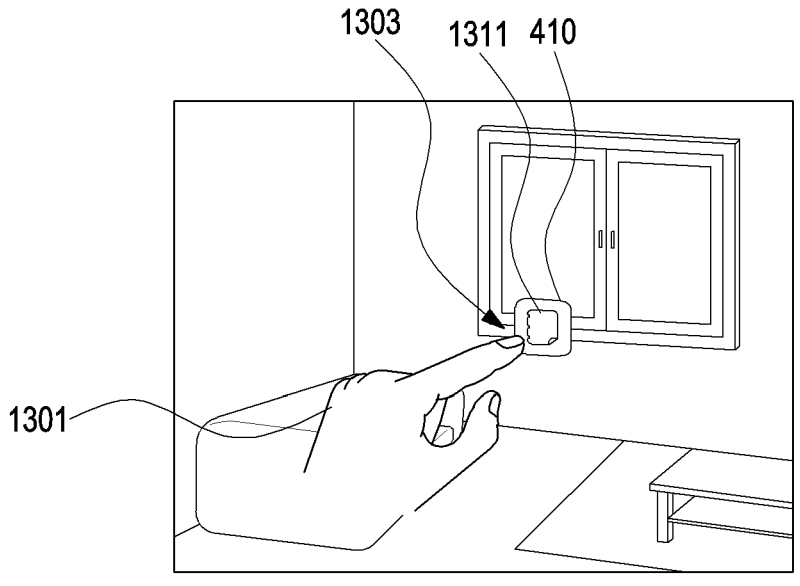
Figure 13C:
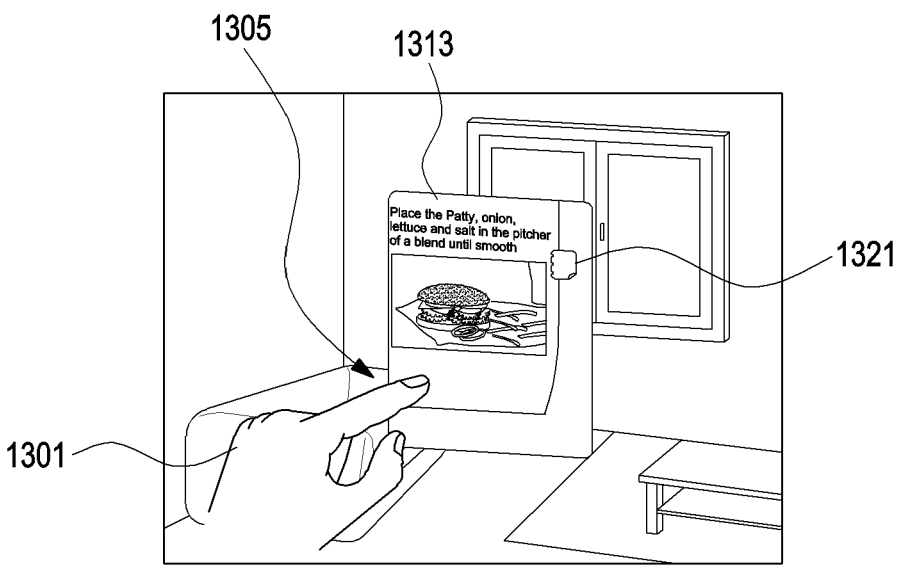
Figure 13D:
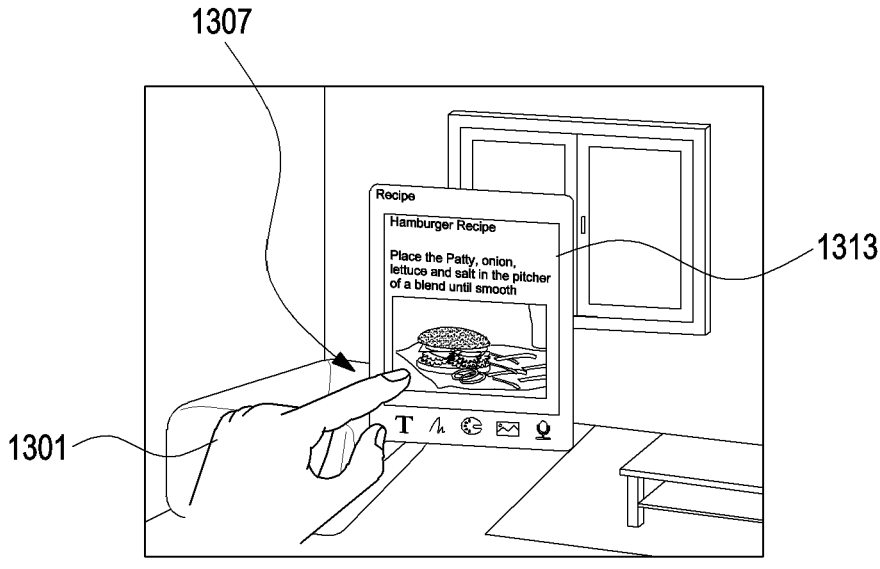
Figure 13E:
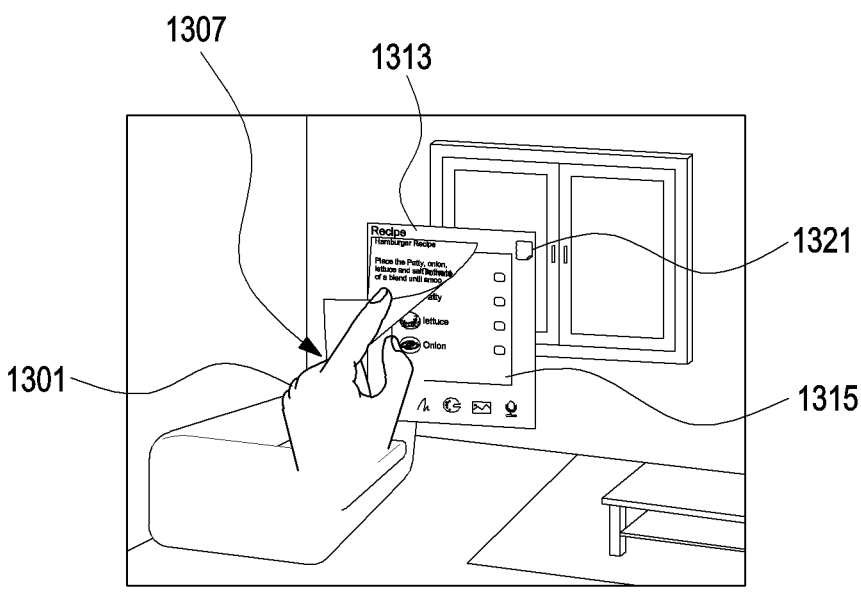
Figure 13F:
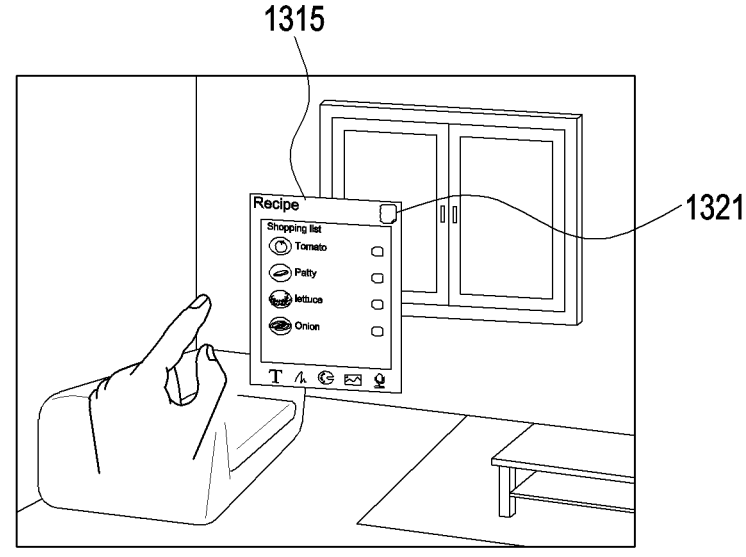

According to an embodiment, as shown in FIG. 12E, upon identifying a user input (e.g., gesture or interaction) of tapping (e.g., touching) the icon 410 with the user's hand while executing an application (e.g., a memo or image edit application), the electronic device may display the object 1201 of the user's hand to be adjacent to or overlap the icon 410, execute the application corresponding to a first execution result (e.g., the icon 410) corresponding to the identified user input of tapping the icon 410 or execute another function (e.g., edit function) of the executed application, and display the execution result (e.g., the execution screen 1213 as shown in FIG. 12C or edit screen). According to an embodiment, the electronic device may identify a user input (e.g., gesture or interaction) of grabbing the content icon 1205 with the user's hand as shown in FIG. 12C, while the user's hand is displayed adjacent to or overlapping the execution screen 1213 away from the metaphor icon, i.e., the content icon (e.g., a drawing tool or pen) 1205. As shown in FIG. 12C, upon identifying a user input (e.g., gesture or interaction) of grabbing the content icon 1205 with the user's hand, the electronic device may execute a second execution result (e.g., execution of drawing as shown in FIG. 12D) corresponding to the identified user input of grabbing the content icon 1205 and display the execution result on the execution screen 1213. As shown in FIGS. 12E and 12F, the electronic device according to an embodiment may provide different application execution results according to identification of different types of user inputs (e.g., gestures or interactions) to the icon 410 of the same application.

FIGS. 13A to 13F are views illustrating an example of an operation method in an electronic device according to an embodiment of the disclosure.

Referring to FIGS. 13A to 13F, an electronic device (e.g., the electronic device 101 of FIG. 1, the electronic device 200 of FIG. 2, the electronic device 300 of FIGS. 3A, 3B and 3C) according to an embodiment may display an icon 410 including a plurality of graphical objects and an object 1301 representing the user's hand in a virtual space. The electronic device may display an icon 410 in which a visual effect 1311 (e.g., a graphic effect) indicating an application state change is applied to a first graphical object (e.g., the first graphical object 411 of FIGS. 4A and 4B), a second graphical object (e.g., the second graphical object 413 of FIGS. 4A and 4B) and/or a third graphical object (e.g., the third graphical object 415 of FIGS. 4A and 4B) in response to a first user input (e.g., tap) 1303. For example, the second graphical object 413 of the icon 410 may be changed in layer order (e.g., arrangement order) to be shown ahead on an upper layer of the first graphical object (e.g., the third graphical object 415 of FIGS. 4A and 4B) in response to the first user input 1303. The electronic device may execute the application (e.g., content edit application) indicated by the icon 410 and display the execution screen 1313 of the application in response to a second user input (e.g., a gesture of pulling the second graphical object) 1305. Here, the execution screen 1313 may be a screen in which the first graphical object included in the icon 410 is enlarged. The electronic device may maintain the shape of the plurality of graphical objects, or change at least some of the plurality of graphical objects by applying a visual effect in response to the first user input (e.g., tap) 1303. According to an embodiment, when an application is executed to expose content (display of execution screen 1313), the electronic device may display a content icon 1321 in which a change has been made so that some (e.g., the second graphical object) of the plurality of graphical objects of the icon 410 are maintained.

According to an embodiment, the electronic device may change the second graphical object into a content object to maintain the second graphical object in an overlapping or adjacent area on the execution screen 1313 and display the content icon 1321. The content icon 1321 may be displayed on an upper layer of the execution screen 1313 where the third graphical object 415 (e.g., virtual window) has been changed. According to an embodiment, the electronic device may move the execution screen 1313 and display an execution screen 1315 including other content in response to a user input 1307.

FIGS. 14A to 14H are views illustrating an example of an operation method in an electronic device according to an embodiment of the disclosure.

Referring to FIGS. 14A to 14H, an electronic device (e.g., the electronic device 101 of FIG. 1, the electronic device 200 of FIG. 2, the electronic device 300 of FIGS. 3A, 3B and 3C) according to an embodiment may display an icon 410 including a plurality of graphical objects in a virtual space. In response to a first user input (e.g., tap) 1401, the electronic device may display a changed icon 410 by applying a visual effect 1411 (e.g., enlarge and display the icon) of enlarging a plurality of graphical objects based on an application state change. The electronic device may execute the application (e.g., document-related application) indicated by the icon 410 and display the execution screen 1413 of the application including content in response to a user input (e.g., a gesture of pulling the second graphical object) 1403. The electronic device may change the second graphical object 413 and display it as a content object in an overlapping or adjacent area on the execution screen 1413. Here, the execution screen 1413 may be a screen in which the first graphical object 411 included in the icon 410 is enlarged.

Figure 14A:
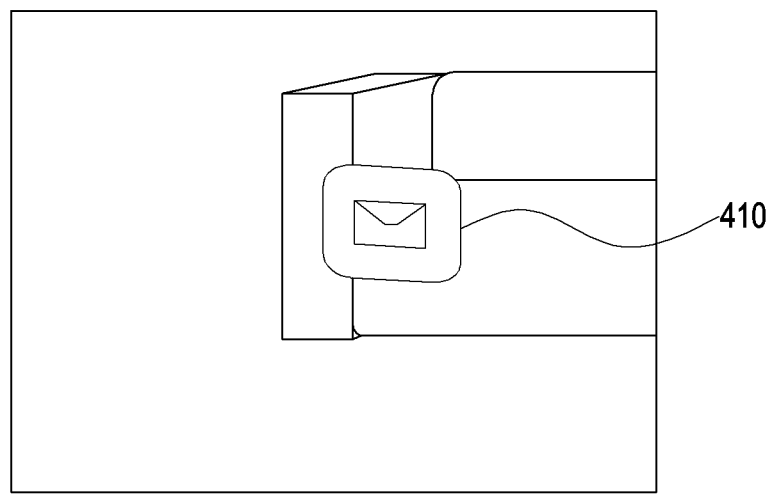
FIGS. 14A, 14B, 14C, 14D, 14E, 14F, 14G, and 14H are views illustrating an example of an operation method in an electronic device according to an embodiment of the disclosure.
Figure 14B:
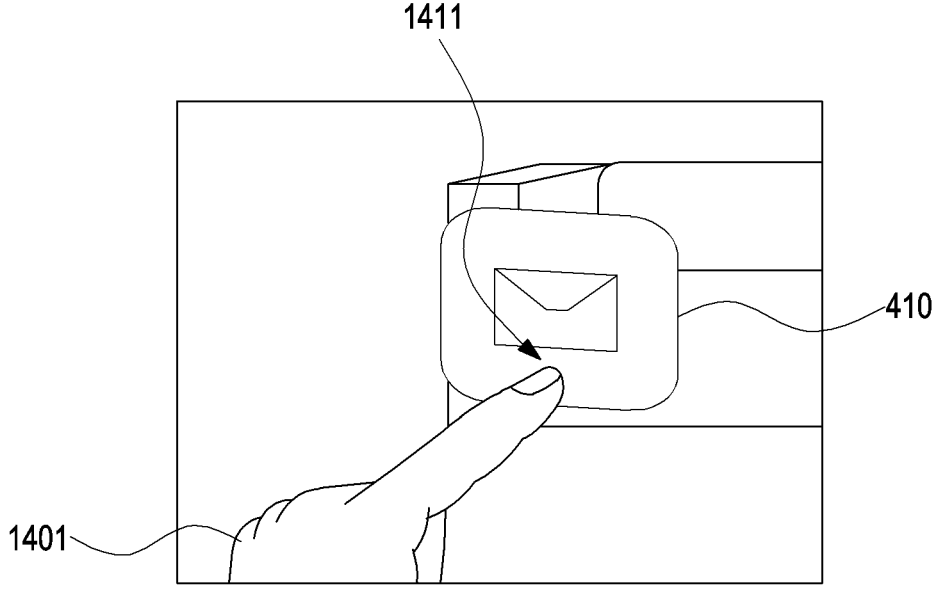
Figure 14C:
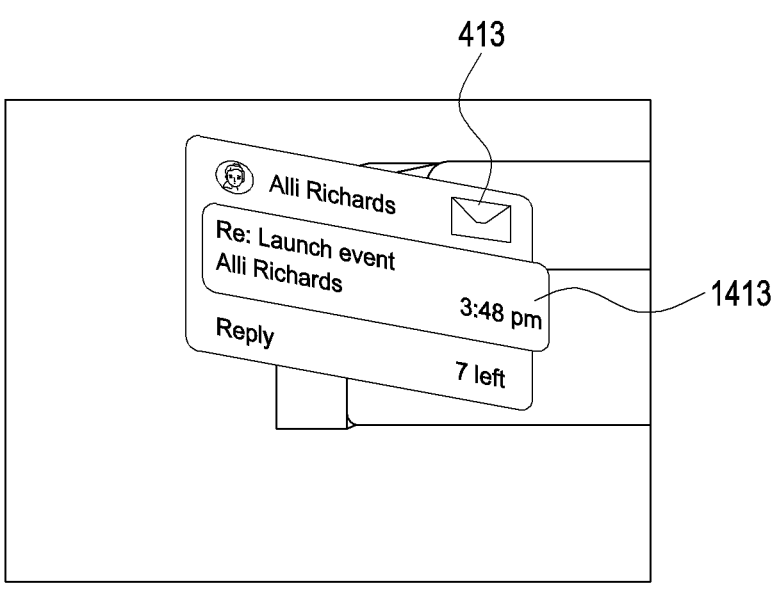
Figure 14D:
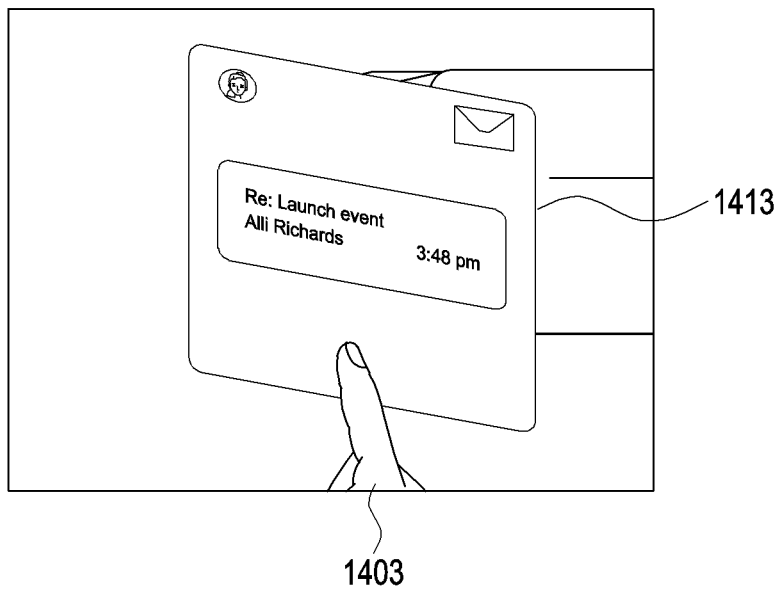
Figure 14E:
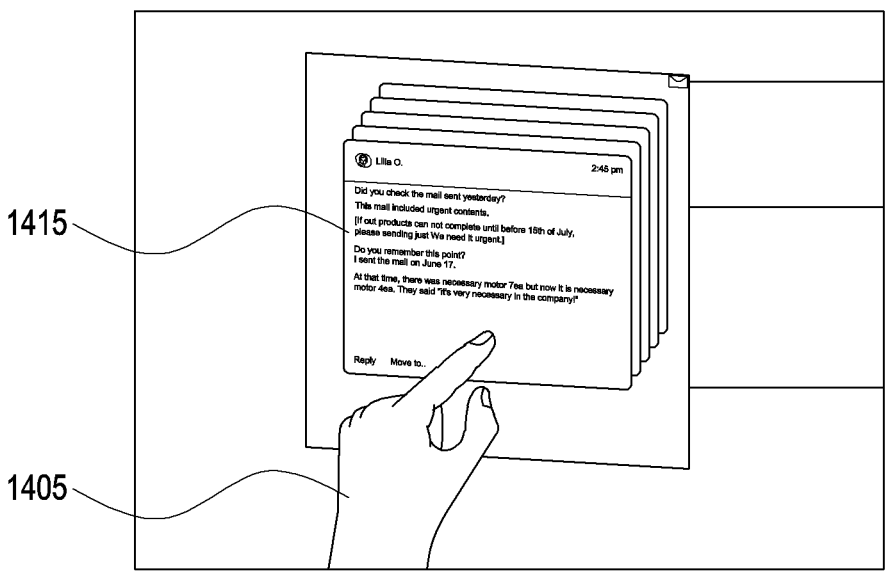
Figure 14F:
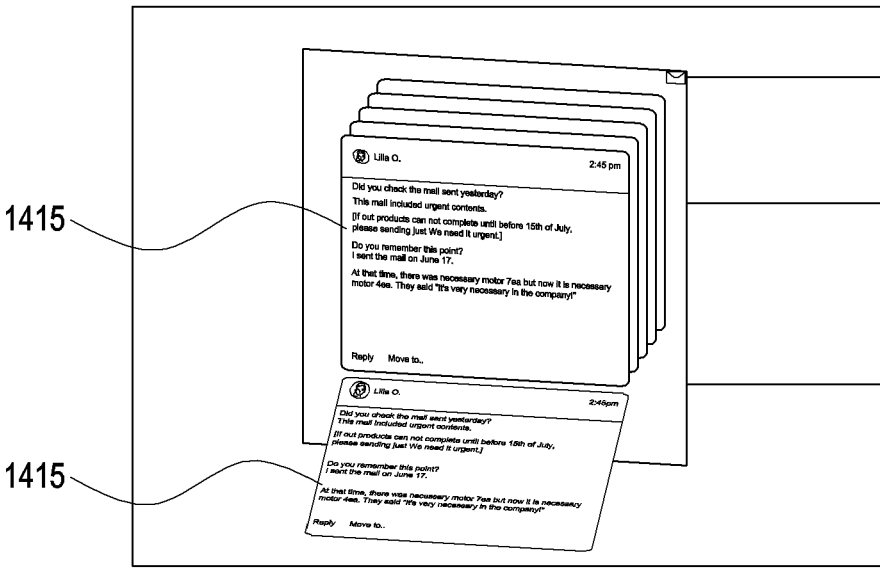
Figure 14G:
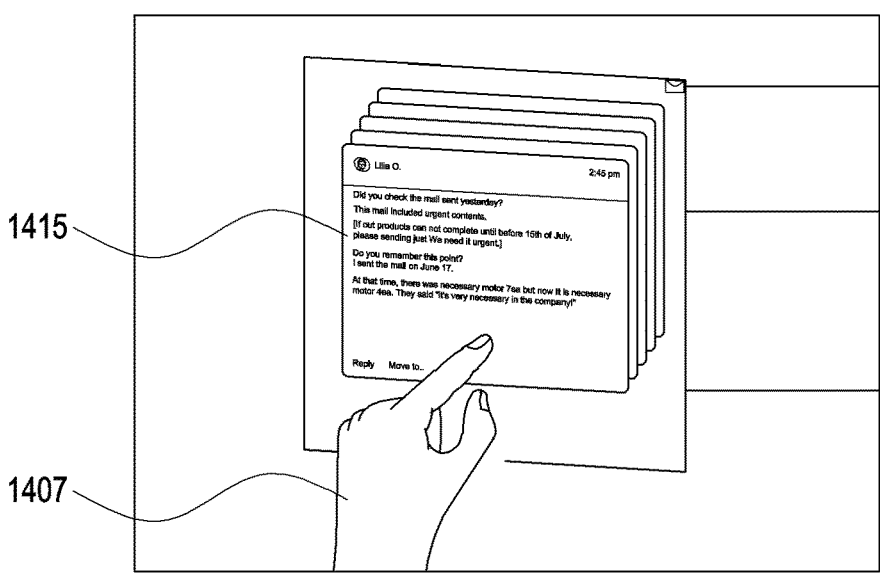
Figure 14H:
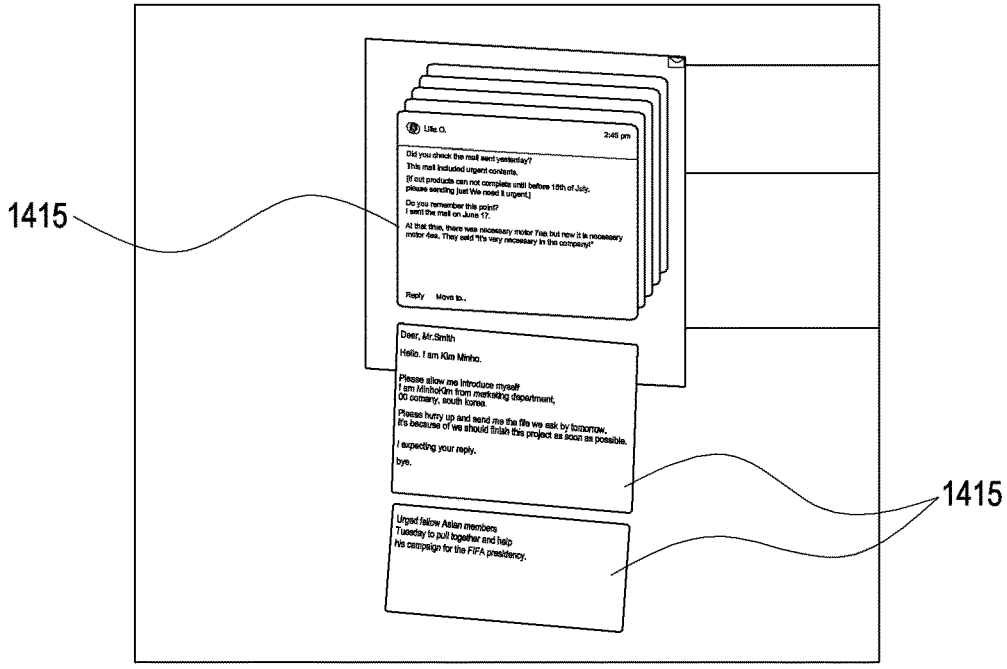

According to an embodiment, as shown in FIGS. 14D and 14E, the electronic device may display an execution screen 1415 for providing detailed information about content in response to a user input 1403. Here, the execution screen 1413 may be a screen in which the first graphical object 411 included in the icon 410 is enlarged. The electronic device may maintain, or change by applying a visual effect, the second graphical object 413 and the third graphical object 415 in response to the user input (e.g., tap) 1403.

According to an embodiment, as shown in FIGS. 14E to 14H, the electronic device may change and display the state of content (e.g., move to the next page or display several pages) on the execution screen 1415 in response to a user input 1405 or 1407.

In the embodiments described above in connection with FIGS. 11A to 14H, the electronic device may display the second graphical object 413 of the icon in an adjacent area of the execution screen when displaying the execution screen (e.g., the execution screens 1112 to 1114 of FIGS. 11E to 11I, the execution screen 1213 of FIGS. 12C to 12F, the execution screen 1313 of FIGS. 13C to 13F, and/or the execution screen 1413 of FIGS. 14C to 14D) in the 3D virtual space based on a movement of the user's finger to select the icon (e.g., a user selectable icon) in the depth direction (e.g., z direction) of the third graphical objects (e.g., virtual window) 415. According to an embodiment, the electronic device may perform different operations when receiving a user input (e.g., first user input) for selecting the execution screen and when receiving a user input (e.g., second user input or third user input) for selecting the second graphical object 413 while the second graphical object 413 is displayed adjacent to the execution screen. According to an embodiment, upon receiving a user input for selecting the second graphical object 413 displayed in the adjacent area while the execution screen is displayed, the electronic device may apply a graphic effect to the second graphical object 413 or execute at least one function (e.g., sub function or a function different from the displayed execution screen) related to the application indicated by the second graphical object 413. According to an embodiment, upon receiving a user input for selecting a portion of the execution screen while the second graphical object 413 is displayed adjacent to the execution screen, the electronic device may execute a function related to the execution screen or switch to another execution screen of the application. According to an embodiment, the electronic device may not display (e.g., remove or let disappear) the third graphical object representing the virtual screen of the icon while displaying the execution screen.

According to an embodiment, a method of an operation in an electronic device (e.g., the electronic device 101 of FIG. 1, the electronic device 200 of FIG. 2, the electronic device 300 of FIGS. 3A, 3B and 3C) may comprise controlling a display (e.g., the display module 160 of FIG. 1, the display 251 and 252 of FIG. 2, the display member 340 of FIG. 3A, the display module 321 of FIG. 3C) of the electronic device to display, in a 3D virtual space, an icon (e.g., the icon 410 of FIGS. 4A and 4B) executing at least one application, the icon including a plurality of graphical objects, obtaining state information about the at least one application, changing at least one object among the plurality of graphical objects to indicate a state of the at least one application based on state information about the at least one application, and controlling the display module to display a changed icon reflecting the changed at least one graphical object.

According to an embodiment, the plurality of graphical objects may include a first graphical object in a frame area, a second graphical object representing content of the at least one application, and a third graphical object in a background area. According to an embodiment, each of the plurality of graphical objects may have a layer depth.

According to an embodiment, changing the at least one object among the plurality of graphical objects may include changing a layer order of the plurality of graphical objects based on operation state information about the at least one application.

According to an embodiment, changing the at least one object among the plurality of graphical objects may include changing a layer order (e.g., arrangement order) of the second graphical object to a higher layer than the first graphical object in response to a change in a state of the at least one application or a user interaction.

According to an embodiment, changing the at least one object among the plurality of graphical objects may include applying a visual effect to the second graphical object in response to a change in a state of the at least one application or a user input.

According to an embodiment, changing the at least one object among the plurality of graphical objects may include enlarging the second graphical object in response to an increase in a number of contents and shrinking the second graphical object in response to a decrease in the number of contents.

According to an embodiment, controlling the display module to display the changed icon reflecting the changed at least one graphical object may include, in response to a first user input, executing the at least one application represented by the icon and displaying the icon in which a visual effect is applied to at least one of the plurality of objects and, in response to the user's second user input, performing an operation of an application corresponding to the second user input and displaying the icon in which the visual effect is applied to at least one of the plurality of objects in response to a change in a state of an operation of the application.

According to an embodiment, controlling the display module to display the changed icon reflecting the changed at least one graphical object may include displaying an icon in which a visual effect is applied to the second graphical object based on a change in a distance between the first graphical object and the second graphical object, reception of an event affecting the third graphical object, or execution of a plurality of applications.

According to an embodiment, the method may further comprise performing functions corresponding to different operations for each of the plurality of graphical objects of the icon to which a user input is applied.

According to an embodiment, the icon may be configured to be displayed in a changeable form in a 2D environment and a 3D environment.

According to an embodiment, the method further may comprise, when exposing content included in the application, changing the icon into a contact icon in a form of a content object in which some of the plurality of objects are maintained and displaying the contact icon in a portion of an execution screen of the application or a partial area of the content; enlarging or shrinking the content in response to a user interaction to the contact icon and changing a display position and shape of the contact icon in response to the user interaction and displaying the contact icon.

According to an embodiment, in a non-transitory storage medium storing a program, the program may include instructions that, when executed by a processor of an electronic device, enable the electronic device to display, on a display of the electronic device, an icon executing at least one application, the icon including a plurality of graphical objects, obtain state information about the at least one application, change at least one object among the plurality of graphical objects to indicate a state of the at least one application based on the state information about the at least one application, and display, using the display module, a changed icon reflecting the changed at least one graphical object.

Figure 15:
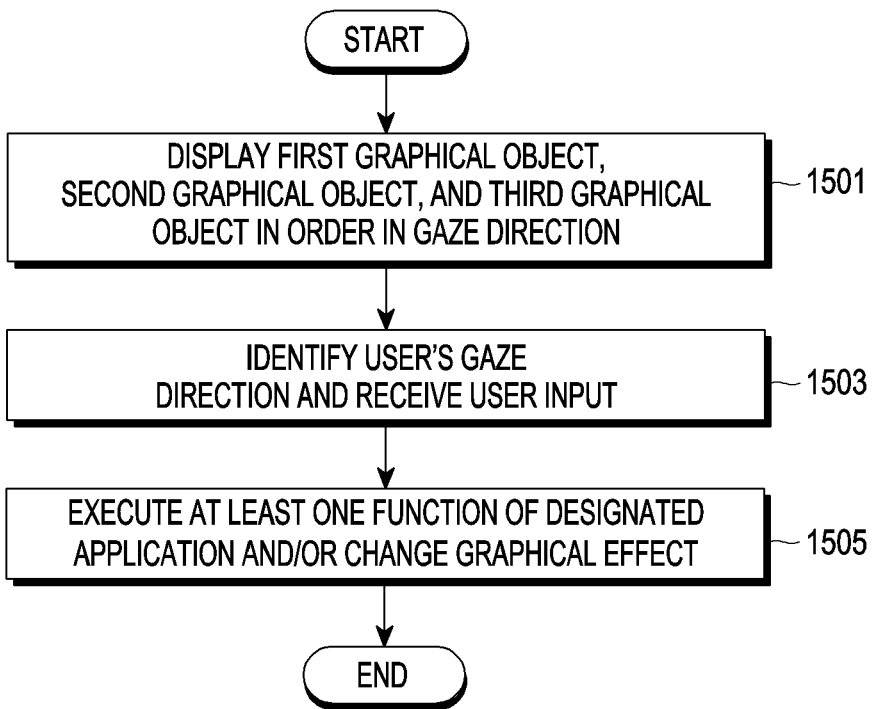
FIG. 15 is a view illustrating an example of an operation method in an electronic device according to an embodiment of the disclosure.

FIG. 15 is a view illustrating an example of an operation method in an electronic device according to an embodiment of the disclosure.

Referring to FIG. 15, an electronic device (e.g., the electronic device 101 of FIG. 1, the electronic device 200 of FIG. 2, the electronic device 300 of FIGS. 3A, 3B and 3C) (hereinafter, referred to as a wearable electronic device)

according to an embodiment may display, through a display module (e.g., the display module 160 of FIG. 1, the display 251 and 252 of FIG. 2, the display member 340 of FIG. 3A, the display module 321 of FIG. 3C), a 3D graphical object corresponding to a specified application in a 3D virtual space in operation 1501. The electronic device according to an embodiment may display, through the display, a first graphical object 411 (e.g., a virtual window object or the first graphical object 411 of FIG. 4), a second graphical object 413 (e.g., a picto object or the second graphical object 413 of FIG. 4), and a third graphical object 415 (e.g., a world object or the third graphical object 415 of FIG. 4) included in an icon in the virtual 3D space with them arranged in a specified arrangement order in a depth direction. According to an embodiment, the first graphical object 411 may indicate the background where the content provided by the specified application is to be displayed and may be fixed and disposed (displayed) in the 3D virtual space and may be configured to be viewed only through the third graphical object 415. The second graphical object 413 may indicate the specified application. The third graphical object 415 may indicate the outline of the icon 410. The electronic device according to an embodiment may display at least a portion of at least one of the second graphical object 413 or the first graphical object 411 which is on the extension line between one point in the 3D virtual space and the inner area of the first graphical object 411 to be viewed through the third graphical object 415. The first graphical object 411, the second graphical object 413, and the third graphical object 415 may be sequentially arranged in a specified arrangement order from far away to closer, and when a second user input is received, an arrangement order of at least some of the first graphical object 411, the second graphical object 413, and the third graphical object 415 may be changed. The second graphical object 413 may be disposed to be spaced apart from the first graphical object 411 by a specified distance (e.g., a gap) in the depth direction (e.g., Z direction) in which the camera module (e.g., the camera module 180 of FIG. 1, the first camera 211-1 and 211-2 of FIG. 2, the third camera 213, the camera module 313, 314, 315, and 316 of FIG. 3B) faces the first graphical object 411 (e.g., one point in the area of the first graphical object). The second graphical object 413 may be disposed by a specified distance between the first graphical object 411 and the third graphical object 415 in the depth direction.

In operation 1503, the electronic device according to an embodiment may identify at least one graphical object at which the user's gaze 1601 is and receive a user input (e.g., the first user input and/or second user input) to at least one graphical object at which the user's gaze 1601 is among the first graphical object 411, the second graphical object 413, or the third graphical object 415 while arranging and displaying the first graphical object 411, the second graphical object 413, and the third graphical object 415 in the specified arrangement order in the depth direction (e.g., Z direction). According to an embodiment, the electronic device may receive the first user input to at least one graphical object among the first graphical object 411, the second graphical object 413, or the third graphical object 415 based on the gaze 1601 to execute at least one function of the specified application. According to an embodiment, the electronic device may receive the second user input to at least one graphical object among the first graphical object 411, the second graphical object 413, or the third graphical object 415 based on the gaze 1601. Here, the second user input may be different from the first user input.

In operation 1505, the electronic device according to an embodiment may apply (e.g., change, provide, or display) a graphic effect to at least one graphical object among the plurality of graphical objects based on the second user input or execute a specified application based on the first user input. According to an embodiment, the electronic device may execute at least one function of the specified application based on a third user input. Here, the third user input may be a gaze input or a gesture input different from the first user input and the second user input. According to an embodiment, the electronic device may apply a graphic effect to at least one graphical object and display at least one graphical object (or an icon (e.g., the icon 410 of FIG. 4) including graphical objects) to which the changed graphic effect is applied, in the 3D virtual space. According to an embodiment, the electronic device may identify the gaze 1601 and, if receiving a first user input of gazing at the first graphical object 411, the second graphical object 413, or the third graphical object 415 during a specified time (e.g., N sec), the electronic device may apply the graphic effect to the at least one graphical object. According to an embodiment, the electronic device may apply different graphic effects to at least one graphical object for each of the different input types included in the second user input. For example, when the second user input is a gaze input, the electronic device may designate and set the times of gazing at the different input types, gaze directions, or eye movement types to differ from each other.

The electronic device according to an embodiment may perform the operation of changing the arrangement order of the first graphical object 411, the second graphical object 413, and the third graphical object 415 into an order different from the specified order and applying the graphic effect related to the change in arrangement order based on the gaze direction. The electronic device according to an embodiment may change at least one of the size, position, shape, color, or transparency of at least a portion of at least one of the first graphical object 411, the second graphical object 413, or the third graphical object 415 where the second user input is received, based on gaze information (e.g., gaze information and/or eye shape information) when performing the operation of applying the graphic effect. The second graphical object 413 according to an embodiment may include one or more objects (e.g., graphical objects). Each of the one or more objects may correspond to one of one or more sub functions provided by the specified application. According to an embodiment, in response to a first user input for selecting any one of one or more objects, the electronic device may perform a function corresponding to the selected object.

Figure 16A:
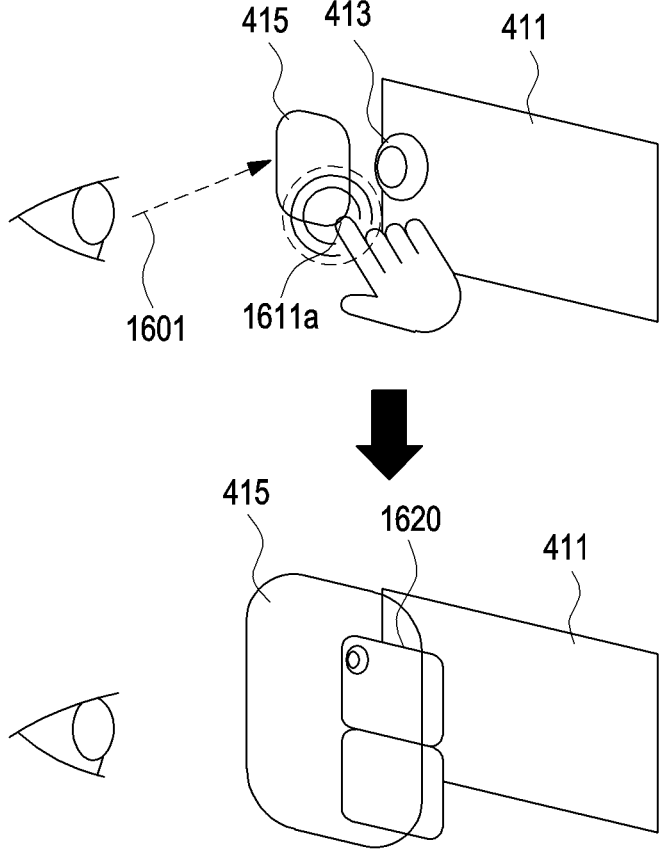
FIGS. 16A, 16B, and 16C are views illustrating an example of an operation method in an electronic device according to an embodiment of the disclosure.
Figure 16B:
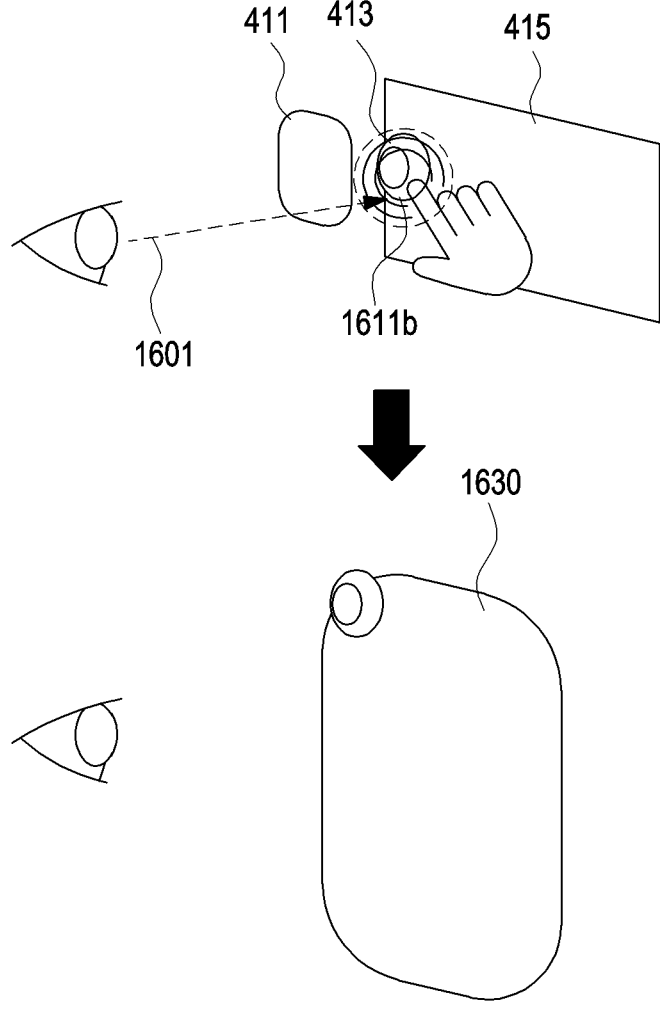
Figure 16C:
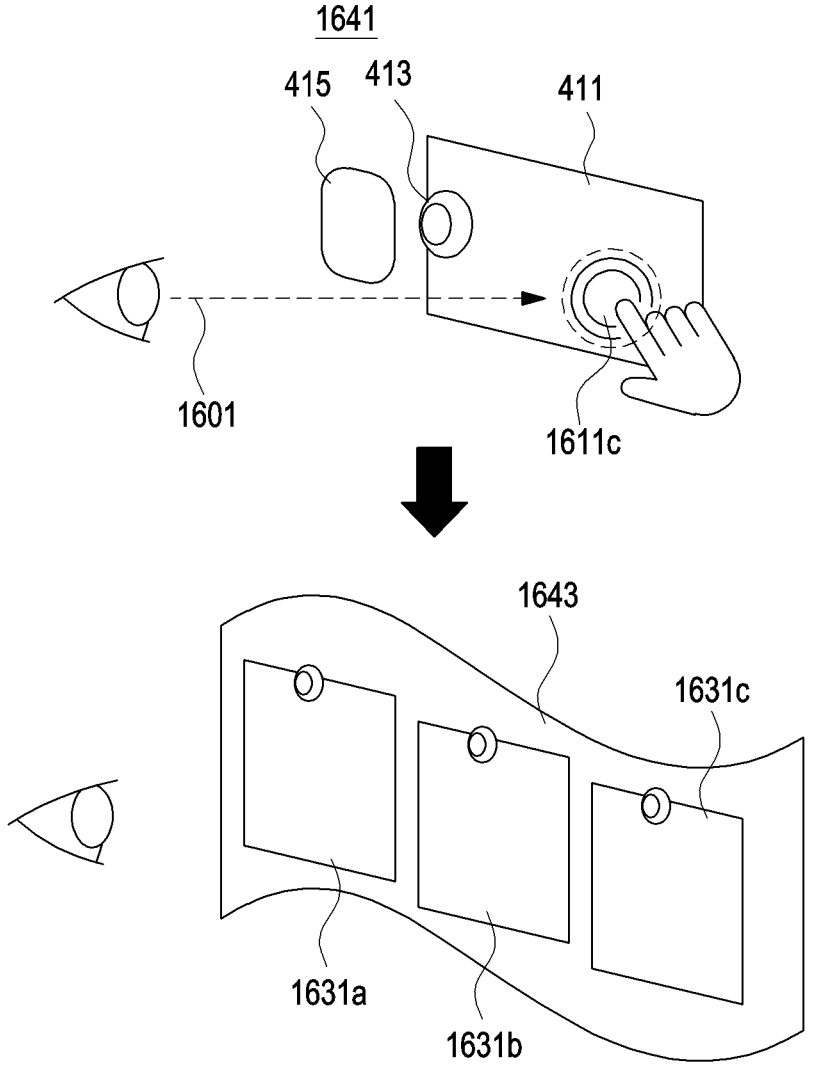

FIGS. 16A to 16C are views illustrating an operation method in an electronic device according to an embodiment of the disclosure.

Referring to FIG. 16A, according to an embodiment, the electronic device may identify that the gaze 1601 is at the first graphical object 411 and, upon receiving a user input 1611a (e.g., third user input) for selecting the third graphical object 415, display at least one widget 1620 (e.g., execution screen) corresponding to at least one function of the specified application in the 3D virtual space (e.g., XR environment or AR environment), instead of or together with the second graphical object 413, between the first graphical object 411 and the third graphical object 415. Here, the third graphical object 415 may be resized according to the size of the widget 1620 so that at least one widget 1620 is shown to the user.

Referring to FIG. 16B, according to an embodiment, the electronic device may identify that the gaze 1601 is at the second graphical object 413 and, if receiving a user input 1611b (e.g., first user input) for selecting the second graphical object 413, execute the specified application and display the execution screen 1630 of the specified application in the 3D virtual space (e.g., XR environment or AR environment). According to an embodiment, the electronic device may maintain the second graphical object 413 adjacent to or overlapping the execution screen 1630 of the specified application. when the specified application is executed, the electronic device may remove the first graphical object 411 and the third graphical object 415 and, display the second graphical object 413 by maintaining or changing the shape of the second graphical object 413. For example, the second graphical object 413 displayed together with the execution screen 1630 may be an object in a metaphor icon form (e.g., an icon form including the object obtained by changing the second graphical object 413 into a content object 501). According to an embodiment, when receiving a user input (e.g., gesture input or gaze input) for selecting the second graphical object 413 displayed together with the execution screen 1630, the electronic device may remove the execution screen 1630 and then display the icon including the plurality of graphical objects, execute at least one function or sub function of the specified application, display the object for at least one function or sub function of the specified application, or display a detailed screen related to a notification event displayed on the second graphical object 413. According to an embodiment, the electronic device may reflect the state change related to execution of the specified application on the second graphical object 413 displayed together with the execution screen 1630.

Referring to FIG. 16C, according to an embodiment, the electronic device may identify that the gaze 1601 is at the third graphical object 415 and, if receiving a user input 1611c (e.g., sixth user input) for selecting the third graphical object 415, selectively switch the virtual 3D space where the third graphical object 415 is displayed from either a first space generated using the camera or a second space pre-stored in the electronic device into the other. For example, upon receiving the sixth user input 1611c, the electronic device may switch the set space 1641 (e.g., AR environment) into another space 1643 (e.g., VR space (or environment)). Here, the sixth user input may differ from the first to fifth user inputs. According to an embodiment, the electronic device may display content 1631a, 1631b, and/or 1631c (e.g., execution screen) provided by the specified application in the changed space (e.g., a VR environment) 1641. The electronic device may display the second graphical object whose shape is maintained or changed along with the content 1631a, 1631b, and/or 1631c. In response to the second user input, the electronic device according to an embodiment may provide an interaction (e.g., a visual effect (or graphic effect) or layout change) to move at least some of the first graphical object 411, the second graphical object 413, or the third graphical object 415 along the gaze direction to at least partially change the arrangement order of the first graphical object 411, the second graphical object 413, or the third graphical object 415 which are arranged in the gaze direction.

Figure 17A:
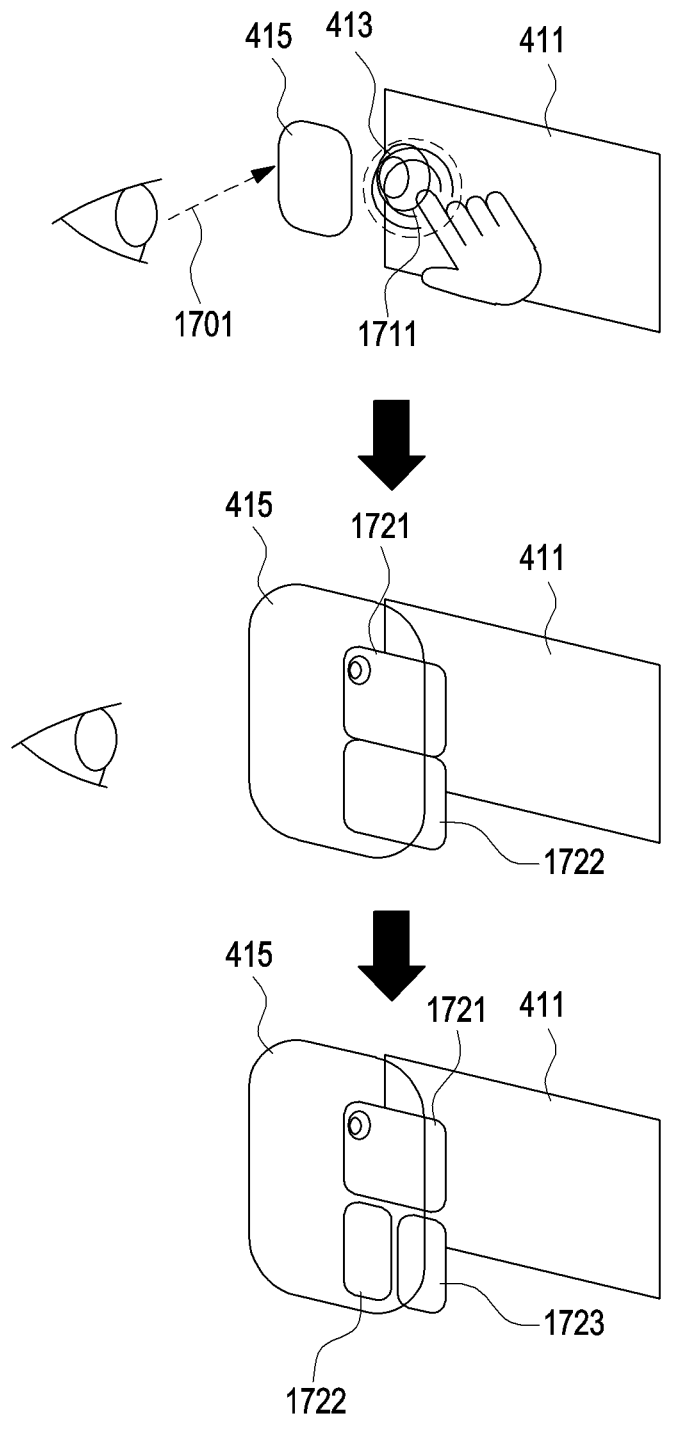
FIGS. 17A and 17B are views illustrating an example of an operation method in an electronic device according to an embodiment of the disclosure.
Figure 17B:
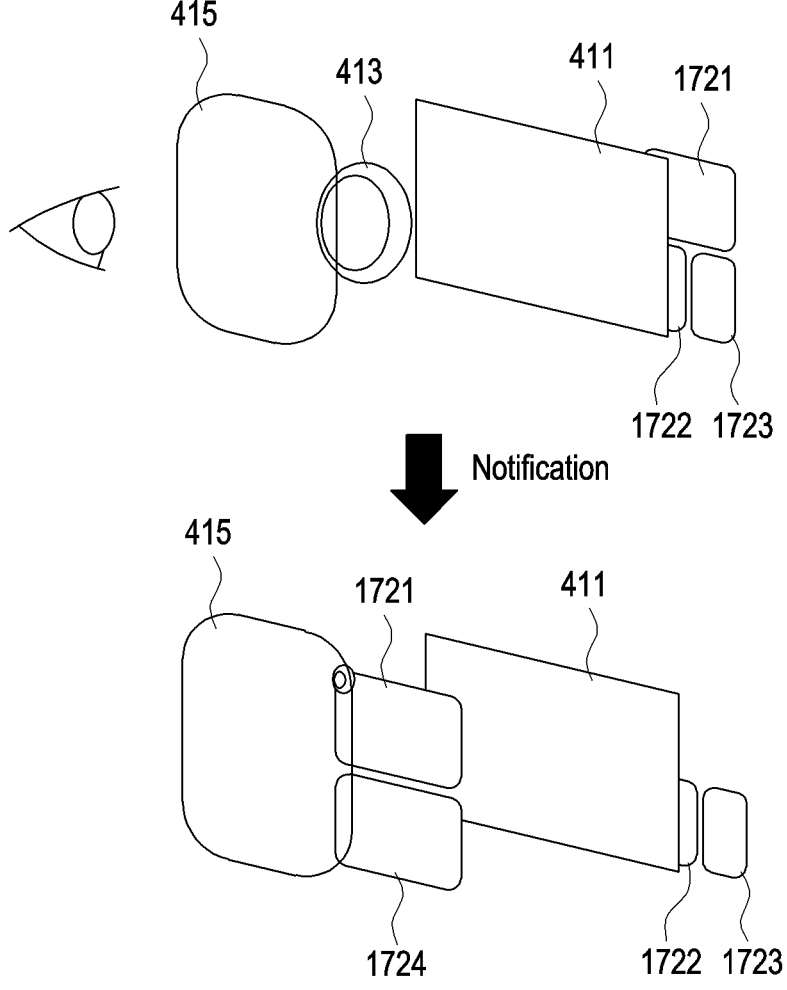

FIGS. 17A and 17B are views illustrating an example of an operation method in an electronic device according to an embodiment of the disclosure.

Referring to FIGS. 17A and 17B, according to an embodiment, the electronic device may identify that the user's gaze 1701 is at the third graphical object 415 and, if receiving a user input 1711 (e.g., third user input) for selecting the second graphical object 413, execute one or more widgets 1721, 1722, and/or 1723 (e.g., objects) corresponding to at least one function of a specified application and display the one or more widgets 1721, 1722, and/or 1723 in a 3D virtual space (e.g., an AR environment) instead of or overlapping the second graphical object 413 away at a predetermined distance between the first graphical object 411 and the third graphical object 415. According to an embodiment, the electronic device may apply (e.g., change, provide, or display) a graphic effect of changing the arrangement order (e.g., an interaction of being absorbed, visual effect (or graphic effect) or layout change) of at least one widget 1721, 1722, and/or 1723 corresponding to the second graphical object 413 which is next to the first graphical object 411 (e.g., not to be shown by the first graphical object 411) in order along the depth direction in response to the second user input (e.g., gaze input) to the second graphical object 413. According to an embodiment, upon receiving a third user input different from the second user input (e.g., gaze input) to the second graphical object 413, the electronic device may maintain the arrangement order of the second graphical object 413 without change and execute one or more widgets 1721, 1722, and/or 1723 and arrange them a specified distance away as next to the first graphical object 411 in order. Here, the one or more widgets 1721, 1722, and/or 1723 may be configured corresponding to one or more graphical objects (e.g., a picto form of one or more sub functions). According to an embodiment, if a specified event occurs (e.g., generation of a notification, a widget update, and/or the user's request), the electronic device may make a change so that at least some 1721 of one or more widgets 1721, 1722, and/or 1723 and a widget 1724 executed in relation thereto are disposed ahead of the first graphical object 411 in order in the depth direction (e.g., z direction) (e.g., provide such an interaction, visual effect (or graphic effect) or a layout change as if a corresponding widget 1721 among the plurality of widgets 1721, 1722, and/or 1723 and newly executed widget 1724 penetrate the third graphical object 415 to be shown to the user. For example, the electronic device may apply a graphic effect for adjusting the transparency of the background of the first graphical object 411 so that at least some of one or more widgets 1721, 1722, and/or 1723 disposed next to the first graphical object 411 in order are shown to the user.

Figure 18A:
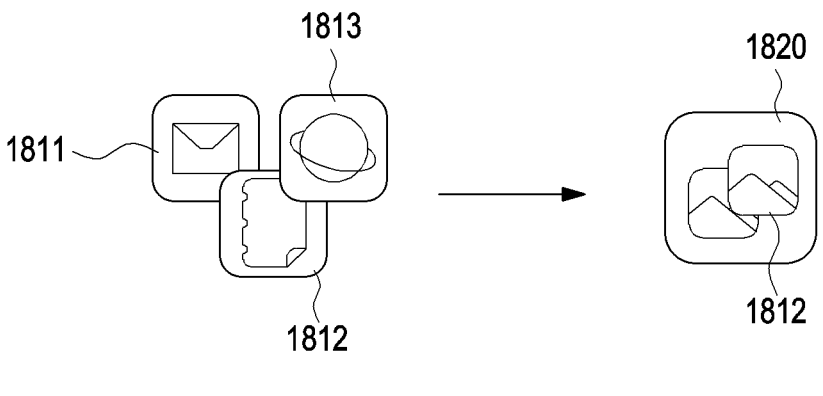
FIGS. 18A, 18B, and 18C are views illustrating an example of an operation method in an electronic device according to an embodiment of the disclosure.
Figure 18A:
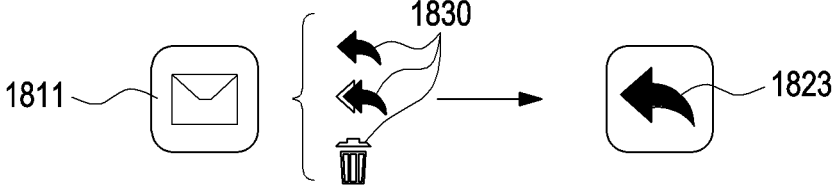
Figure 18B:
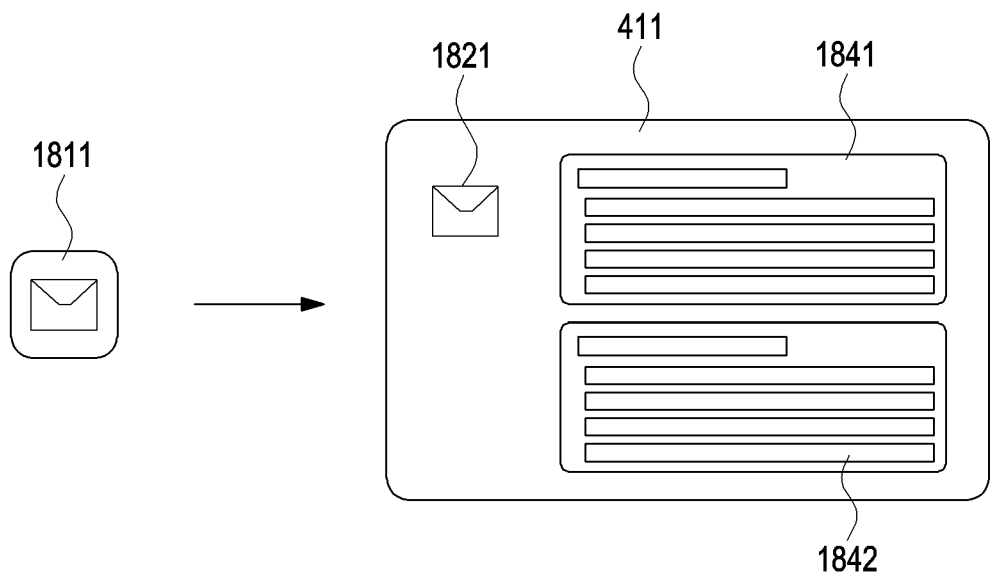
Figure 18C:
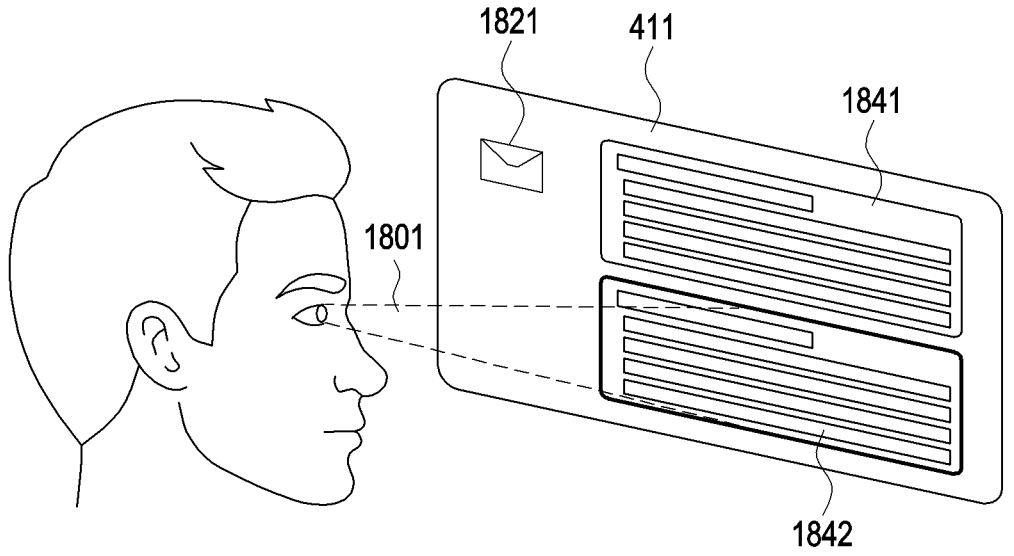

FIGS. 18A to 18C are views illustrating an example of an operation method in an electronic device according to an embodiment of the disclosure.

Referring to FIG. 18A, icons 1811, 1812, and 1813 respectively indicating applications having multi instance (e.g., Internet, note, and email) according to an embodiment may be provided as a multi-window icon 1820. The multi-window icon 1820 may be displayed in the 3D virtual space as one icon 1820 including the second graphical object 1821 including objects (e.g., the second graphical objects) 1821 respectively corresponding to icons 1811, 1812, and 1813. Upon receiving a first user input, the electronic device may individually display (e.g., individually display the icons 1811, 1812, and 1813) respectively representing the plurality of applications or the respective execution screens of the plurality of applications. For example, the electronic device may simultaneously display the respective execution screens of the plurality of applications in the 3D virtual space. For example, the electronic device may display the execution screen (e.g., recent execution screen, preferred execution screen, specified execution screen, or an execution screen where an event occurs) of at least one of the plurality of applications while removing the other execution screens. The function corresponding to at least some (e.g., icon 1811) of the icons 1811, 1812, and 1813 may include one or more sub functions 1830. Upon receiving a fourth user input (e.g., gesture input and/or gaze input) to at least some (e.g., icon 1811) of the icons 1811, 1812, and 1813, the electronic device may display the objects 1830 (e.g., widgets including objects) respectively corresponding to the sub functions adjacent to the second graphical object 1821 or replacing the second graphical object 1821 with objects (e.g., second graphical objects) respectively corresponding to the sub functions 1830. For example, the electronic device may display any one object 1823 according to a specified criterion (e.g., recently used sub function or sub function with high frequency of use) among the objects or switch the object 1823 into an object corresponding to another sub function according to a user and display the switched object. For example, the electronic device may display the objects respectively corresponding to the sub functions individually or with them overlapping each other.

Referring to FIG. 18B, according to an embodiment, if the size of the third graphical object 415 (e.g., virtual window) of the icon 1811 is enlarged, the electronic device may execute one or more widgets 1841 and 1842 related to the second graphical object 1821 of the icon 1811 and display the executed one or more widgets 1841 and 1842 along with the second graphical object 1821.

Referring to FIG. 18C, according to an embodiment, the electronic device may identify that the user's gaze 1801 is at the second widget 1842 and, if receiving a second user input (e.g., gaze input) for selecting the second widget 1842, execute a specified function provided by the second widget 1842.

Figure 19:
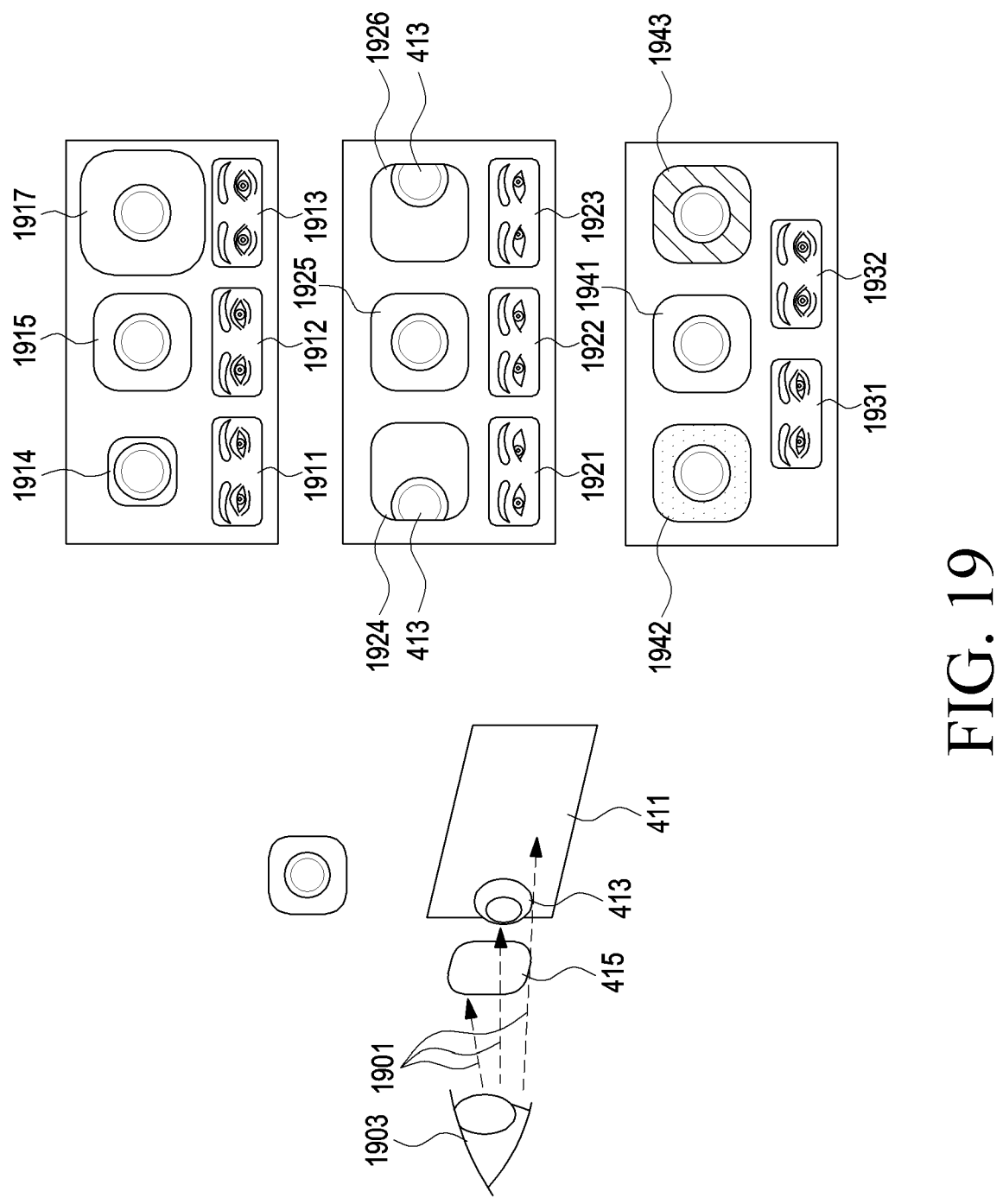
FIG. 19 is a view illustrating an example of an operation method in an electronic device according to an embodiment of the disclosure.

FIG. 19 is a view illustrating an example of an operation method in an electronic device according to an embodiment of the disclosure.

Referring to FIG. 19, the electronic device according to an embodiment may identify at least one of the eye movement or eyelid movement using image information obtained using a camera module for facial recognition (e.g., the camera module 180 of FIG. 1, the second camera module 212-1 and 212-2 of FIG. 2, the camera module 325 and 326 of FIG. 33C), and obtain (e.g., determine or identify) the user's gaze information based on at least one of the identified eye movement or eyelid movement. Here, the gaze information may include information related to at least one of gaze fixing, gaze moving, or gaze direction. The electronic device according to an embodiment may obtain shape information about the user's eye (e.g., size of the eye obtained based on eyelid movement) based on the obtained image information.

If identifying that the user's gaze 1901 is at the first graphical object 411, the second graphical object 413, or the third graphical object 415, the electronic device may change at least one of the first graphical object 411, the second graphical object 413, or the third graphical object 415 based on a specified change condition (e.g., eye shape information including information related to the eye size or gaze information). As an example, the electronic device may identify the user's gaze 1901 and identify that the first graphical object 411, the second graphical object 413, or the third graphical object 415 is selected when the user's gaze is at during a specified time, and apply (e.g., provide or display) a graphic effect to the selected first graphical object 411, the second graphical object 413, or the third graphical object 415.

According to an embodiment, if identifying the user's gaze and identifying the third graphical object 415 which the user's gaze is at (e.g., designated) during the specified time as the second user input, the electronic device may change the size of the third graphical object 415 based on the size of the user's eye 1903 or the position of the user's gaze 1901. As an example, the electronic device may identify the user's eye 1903, decrease (1914) the size of the third graphical object 415 to be smaller than a specified size 1915 in response to the identified first eye size 1911 being smaller than a specified eye size 1912, and increase (1917) the size of the first graphical object 411 to be larger than the specified size 1915 in response to the identified second eye size 1913 being larger than the specified size 1912. As another example, the electronic device may identify the moved position of the user's gaze and, when the identified moved position of the gaze is at a specified first position (e.g., on the upper or right side in the area of the third graphical object 415), increase the size of the third graphical object 415 to be larger than the specified size. When the identified moved position of the gaze is at a specified second position (e.g., on the lower or left side in the area of the third graphical object 415), the electronic device may decrease the size of the third graphical object 415 to be smaller than the specified size.

According to an embodiment, if identifying the second graphical object 413 which the user's gaze is at (e.g., designated) during the specified time as the second user input, the electronic device may change the position of the second graphical object 413 based on the fixing or moving of the user's gaze. The electronic device may identify the fixing of the user's gaze and move from position 1925 the second graphical object 413 (e.g., change the position of the second graphical object 413) in response to the movement of the gaze with respect to the fixed position 1922 of the user's gaze. As an example, the electronic device may move (1924) the second graphical object 413 in a first direction (e.g., to the left) (e.g., change the position of the second graphical object 413 to a position moved in the first direction) as the gaze is moved (1921) in the first direction (e.g., to the left). The electronic device may move (1926) the second graphi- cal object 413 in a second direction (e.g., to the right) (e.g., change the position of the second graphical object 413 to a position moved in the second direction) as the gaze is moved (1923) in the second direction (e.g., to the right). As another example, the electronic device may change the size or distance (e.g., moving away or closer) of the second graphi- cal object 413 corresponding to the size of the user's eye.

According to an embodiment, the electronic device may identify and designate the user's gaze and, if identifying that it is an object change operation, change the first graphical object 411 (e.g., change the brightness, saturation, or trans- parency of the first graphical object 411) based on at least one of the fixing of the user's gaze, moving of the gaze (e.g., eye direction), or eye size. For example, if the size of the user's eye decreases (1931), the electronic device may change (1942) at least one of the brightness, saturation, or transparency of the first graphical object 411 to be lower than a reference state 1941. If the size of the user's eye increases (1932), the electronic device may change (1943) at least one of the brightness, saturation, or transparency of the first graphical object 411 to be higher than the reference state 1941. As another example, if the user's gaze is fixed, the electronic device may display the first graphical object 411 in a currently designated shape and, if the user's gaze is moved in a first direction (e.g., to the left), increase at least one of the brightness, saturation, or transparency of the first graphical object 411 and, if the user's gaze is moved in the second direction (e.g., to the right), decrease at least one of the brightness, saturation, or transparency of the first graphi- cal object 411.

Figure 20:
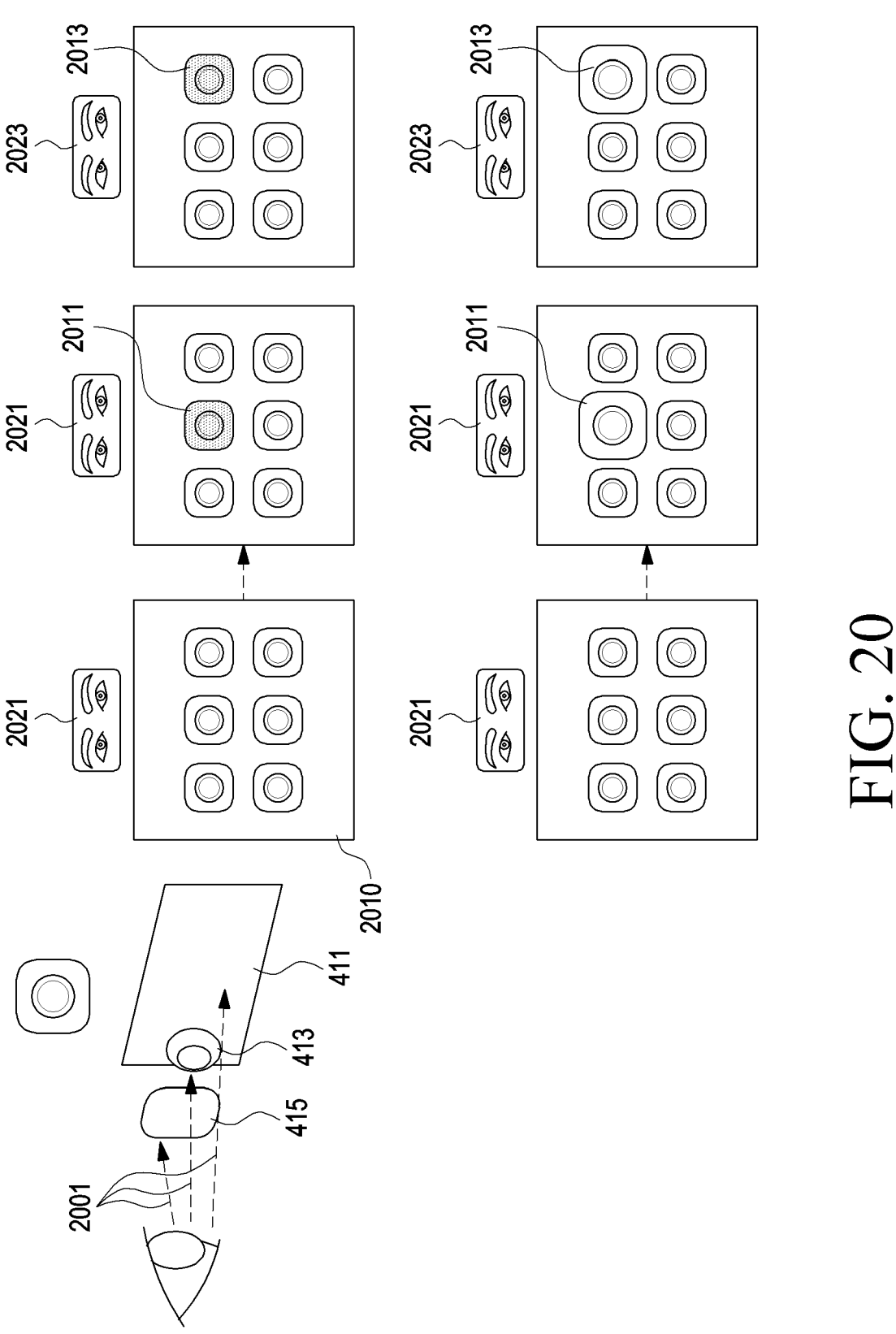
FIG. 20 is a view illustrating an example of an operation method in an electronic device according to an embodiment of the disclosure.

FIG. 20 is a view illustrating an example of an operation method in an electronic device according to an embodiment of the disclosure.

Referring to FIG. 20, the electronic device according to an embodiment may identify that the user's gaze 2001 is at a first icon 2011 (2021) during a specified time (N sec) as a first user input when a plurality of icons 2010 are provided and designate the user's gaze 2001 to the first icon 2011. As an example, if receiving a first user input in which the user's gaze 2001 is at the first icon 2011 among the plurality of icons 2010 during the specified time (N sec), the electronic device may change the color or size of the first icon 2011. As another example, if receiving a second user input in which the user's gaze 2001 is moved (2023) in a first direction (e.g., to the right) to be at a second icon 2013 among the plurality of icons 2010, the electronic device may change the color or size of the second icon 2013.

According to an embodiment, a wearable electronic device (e.g., the electronic device 101 of FIG. 1, the elec- tronic device 200 of FIG. 2, the electronic device 300 of FIGS. 3A, 3B and 3C) may comprise a display (e.g., the display module 160 of FIG. 1, the display 251 and 252 of FIG. 2, the display member 340 of FIG. 3A, and the display module 321 of FIG. 3C), a camera (e.g., the camera module 180 of FIG. 1, the first camera 211-1 and 211-2 of FIG. 2, the third camera 213, the camera module 313, 314, 315, and 316 of FIG. 3B), memory (e.g., the memory 130 of FIG. 1), and one or more processors (e.g., the processor 120 of FIG. 1) communicatively coupled to the display, the memory, and the camera. According to an embodiment, the memory may store one or more computer programs including computer- executable instructions that, when executed by the one or more processors, cause the wearable electronic device to display a user selectable icon an execution of an application in a 3D virtual space, wherein the user-selectable icon may include a first graphical object (e.g., the third graphical object 415 of FIGS. 4A and 4B) representing a virtual window and a second graphical object (e.g., the second graphical object 413 of FIGS. 4A and 4B) representing the application, and the second graphical object is selectable through the first graphical. According to an embodiment, the one or more computer programs may include computer- executable instructions that, when executed by the one or more processors, cause the wearable electronic device to, while the user-selectable icon is displayed in the 3D virtual space, detect a movement of a user's finger. According to an embodiment, the one or more computer programs may include computer-executable instructions that, when executed by the one or more processors, cause the wearable electronic device to, based on detecting the movement of the user's finger to select the second graphical object in a depth direction of the virtual window of the first graphical object, display the execution screen of the application.

According to an embodiment, the one or more computer programs may further include computer-executable instruc- tions that, when executed by the one or more processors, cause the wearable electronic device to display the second graphical object adjacent to the execution screen of the application.

According to an embodiment, the one or more computer programs may further include computer-executable instruc- tions that, when executed by the one or more processors, cause the wearable electronic device to, based on the detected movement of the user's finger, display a representation of the movement of the user's finger with respect to the user selectable icon.

According to an embodiment, the one or more computer programs may further include computer-executable instructions that, when executed by the one or more processors, cause the wearable electronic device to, when the execution screen of the application is displayed, not display the virtual window of the first graphical object while displaying the second graphical object.

According to an embodiment, the one or more computer programs may further include computer-executable instructions that, when executed by the one or more processors, cause the wearable electronic device to, based on a user input being received with respect to the second graphical object while the user-selectable icon is displayed in the 3D virtual space, change an arrangement order between the first graphical object and the second graphical object along the depth direction, wherein the user input is different from the first user input and is at least one of a gesture input or a gaze input.

According to an embodiment, the one or more computer programs may further include computer-executable instructions that, when executed by the one or more processors, cause the wearable electronic device to, based on receiving a second user input with respect to the first graphical object, change at least one of a size or transparency of the first graphical object, and, based on receiving the second user input with respect to the second graphical object while the user-selectable icon is displayed in the 3D virtual space, change at least one of a size, a position, a shape, or color of the second graphical object, wherein the second user input differs from the first user input and is at least one of a gesture input or a gaze input.

According to an embodiment, the one or more computer programs may further include computer-executable instructions that, when executed by the one or more processors, cause the wearable electronic device to, based on receiving a third user input with respect to the second graphical object, execute at least one function of the application, wherein the third user input is at least one of a gesture input or gaze input different from the first user input and the second user input.

According to an embodiment, the second graphical object may include objects respectively representing a plurality of applications.

According to an embodiment, the one or more computer programs may further include computer-executable instructions that, when executed by the one or more processors, cause the wearable electronic device to, based on receiving the first user input for the second graphical object, display respective execution screens for each of the plurality of applications, based on receiving a fourth user input with respect to the second graphical object, individually display the objects representing each of the plurality of applications, and, based on receiving a fifth user input with respect to the second graphical object, display objects representing each of a plurality of sub functions of the application.

According to an embodiment, the one or more computer programs may further include computer-executable instructions that, when executed by the one or more processors, cause the wearable electronic device to, based on receiving a gaze of the user gazing at a specified location in the 3D virtual space and the movement of the user's finger for a third graphical object (e.g., the first graphical object 411 of FIGS. 4A and 4B) representing background of the user-selectable icon, selectively switch the 3D virtual space from either a first space created using the camera or a second space stored in the wearable electronic device into the other.

According to an embodiment, the one or more computer programs may further include computer-executable instructions that, when executed by the one or more processors, cause the wearable electronic device to, based on the second user input, move the execution screen of the application behind the third graphical object based on the depth direction so that the execution screen of the application is not visible by the first graphical object, and, based on a specified event, move at least a portion of an execution screen in front of the third graphical object along the depth direction.

According to an embodiment, the wearable electronic device includes a facial recognition camera (e.g., the camera module 180 of FIG. 1, the first camera 211-1 and 211-2 of FIG. 2, the camera module 325 and 326 of FIG. 3C) may be disposed on a side of the wearable electronic device facing the first graphical object.

According to an embodiment, the one or more computer programs may further include computer-executable instructions that, when executed by the one or more processors, cause the wearable electronic device to determine at least one of an eye movement or an eyelid movement using image information obtained by a facial recognition camera of the wearable electronic device, obtain gaze information based on at least one of the eye movement or the eyelid movement, and determine the second user input at least partially based on the gaze information.

According to an embodiment, the display may emit light to the user's eyes to display a plurality of graphical objects in the 3D virtual space while the user wears the wearable electronic device.

According to an embodiment, a method performed by a wearable electronic device (e.g., the electronic device 101 of FIG. 1, the electronic device 200 of FIG. 2, the electronic device 300 of FIGS. 3A, 3B and 3C) may comprises displaying a user selectable icon for an execution of an application in a 3D virtual space, wherein the user-selectable icon may include a first graphical object (e.g., the third graphical object 415 of FIGS. 4A and 4B) representing a virtual window and a second graphical object (e.g., the second graphical object 413 of FIGS. 4A and 4B) representing the application, and the second graphical object is selectable through the first graphical object. According to an embodiment, the method may comprises, while the user-selectable icon is displayed in the 3D virtual space, detecting a movement of a user's finger. According to an embodiment, the method may comprises, based on detecting the movement of the user's finger to select the second graphical object in a depth direction of the virtual window of the first graphical object, displaying an execution screen of the application.

According to an embodiment, displaying the execution screen of the application may include displaying the second graphical object adjacent to the execution screen of the application, and displaying the execution screen of the application may include, when the execution screen of the application is displayed, not displaying the virtual window of the first graphical object while displaying the second graphical object.

According to an embodiment, the method may further comprise, based on the detected movement of the user's finger, displaying a representation of the movement of the user's finger for the user selectable icon.

According to an embodiment, a head mounted device (e.g., the electronic device 101 of FIG. 1, the electronic device 200 of FIG. 2, the electronic device 300 of FIGS. 3A, 3B and 3C) may comprise a display (e.g., the display module 160 of FIG. 1, the display 251 and 252 of FIG. 2, the display member 340 of FIG. 3A, and the display module 321 of FIG. 3C) disposed to substantially surround eyes of a user when mounted on a head of the user, memory (e.g., the memory 130 of FIG. 1) storing a group of graphical objects, wherein the group of graphical objects includes a first graphical object (e.g., the first graphical object 411 in FIGS. 4A and 4B) corresponding to a background area and a second graphical object (e.g., the second graphical object 413 in FIGS. 4A and 4B) corresponding to an icon representing a specified application and at least one processor (e.g., the processor 120 of FIG. 1) functionally connected to the memory. According to an embodiment, the at least one processor may be configured to display a three-dimensional (3D) graphical object generated based on at least in part on the group of the graphical objects as a three-dimensional (3D) icon (e.g., the object 410 in FIGS. 4A and 4B) for the specified application in a virtual three-dimensional space through the display, wherein the displaying operation includes displaying the first graphical object and the second graphical object layered with each other so that the 3D icon appears to overlap over at least a portion of the background area, while the 3D graphical object is displayed as the 3D icon, detect a user input of the 3D graphical object and in response to the user input, display at least a portion of the 3D graphical object while continuously moving such that a distance in the virtual three-dimensional space between at least a portion of the first graphical object and at least a portion of the second graphical object increases or decreases.

According to an embodiment, the at least one processor may be configured to, based on an outline object (e.g., the third graphical object 415 in FIGS. 4A and 4B) corresponding a specified shape, control the display to display only a partial region of the group of the graphical objects corresponding to an inside of the specified shape as the 3D graphical object while the outline object, the first graphical object, and the second graphical object are aligned state.

According to an embodiment, the first graphical object may correspond to a first layer.

According to an embodiment, the second graphical object may correspond to a second layer different from the first layer.

According to an embodiment, the at least one processor may be configured as part of the operation of displaying the at least a portion of the 3D graphical object while continuously moving, change depth by moving along a direction toward the user any one of the first layer corresponding to the first graphical object and the second layer corresponding to the second graphical object.

According to an embodiment, a width of an area corresponding to the inside of the specified shape may be set smaller than a width of a third layer corresponding to the outline object.

According to an embodiment, the memory may be configured to further store the outline object as part of the group of the graphical objects.

According to an embodiment, one or more non-transitory computer-readable storage media storing one or more computer program including computer-executable instructions that, when executed by one or more processors (e.g., the processor 120 of FIG. 1) of a wearable electronic device (e.g., the electronic device 101 of FIG. 1, the electronic device 200 of FIG. 2, the electronic device 300 of FIGS. 3A, 3B and 3C), cause the wearable electronic device to perform operations. The operations may comprise displaying a user selectable icon for an execution of an application in a 3D virtual space, wherein the user-selectable icon may include a first graphical object (e.g., the third graphical object 415 of FIGS. 4A and 4B) representing a virtual window and a second graphical object (e.g., the second graphical object 413 of FIGS. 4A and 4B) representing the application, and the second graphical object is selectable through the first graphical, while the user-selectable icon is displayed in the 3D virtual space, detecting a movement of a user's finger, and based on the movement of the user's finger to select the second graphical object in a depth direction of the virtual window of the first graphical object and displaying an execution screen of the application.

According to an embodiment, the second graphical object may be displayed a specified distance away from the first graphical object in the depth direction in which a camera module (e.g., the camera module 180 of FIG. 1, the first camera 211-1 and 211-2 of FIG. 2, the third camera 213, the camera module 313, 314, 315, and 316 of FIG. 3B) of the electronic device faces the first graphical object.

According to an embodiment, a wearable electronic device 101 may comprise a display module (e.g., the display module 160 of FIG. 1, the display 251 and 252 of FIG. 2, the display member 340 of FIG. 3A, the display module 321 of FIG. 3C), a camera module (e.g., the camera module 180 of FIG. 1, the first camera 211-1 and 211-2 of FIG. 2, the third camera 213, the camera module 313, 314, 315, and 316 of FIG. 3B), memory (e.g., the memory 130 of FIG. 1) storing instructions, and a processor (e.g., the processor 120 of FIG. 1).

According to an embodiment, the instructions may be configured to, when executed by the at least one processor, enable the wearable electronic device to control the display module to display a plurality of graphical objects corresponding to a specified application in a 3D virtual space through the display module, the plurality of graphical objects including a first graphical object representing a background where content provided by the specified application is to be displayed and a second graphical object representing the specified application, the first graphical object and the second graphical object being disposed a specified distance away from each other in a depth direction in which the camera module faces the first graphical object, execute at least one function of the specified application based on at least a portion of a first user input to at least one graphical object of the first graphical object or the second graphical object, receive a second user input different from the first user input to the at least one graphical object of the first graphical object or the second graphical object, and apply a graphic effect to the at least one graphical object based on at least a portion of the second user input.

An icon (e.g., the icon 410 of FIGS. 4A and 4B) for executing an application, which is set as a minimum unit representing an application in the disclosure may be changed in shape, size, or color by applying a visual effect (e.g., a graphic effect) to at least one graphical object among a plurality of graphical objects according to a user interaction. As the electronic device according to an embodiment enhances the system structure of the icon including a plurality of graphical objects, the electronic device may utilize the icon in various devices and apply it in the 3D environment as well as the 2D environment. The electronic device according to an embodiment configures a plurality of graphical objects of an icon in a form changeable according to the state of the application in a 3D environment virtual space, visually providing the state change of the application to the user. Other various effects may be provided directly or indirectly in the disclosure.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

Embodiments of the disclosure may be based on a metaverse service. The metaverse service provides content that may enhance user immersion based on augmented reality environment, virtual reality environment, mixed environment, and/or extended reality. The metaverse service may be provided by a glasses-type electronic device, a smart lens, or a smartphone supporting augmented reality. The metaverse service may be provided by a head-mounted device (HMD), a video see-through (VST) device, a smart phone, or a smart mirror supporting virtual reality. The metaverse service may provide social interaction content, such as games, concerts, parties, and meetings based on avatars or contents related to economic activities, such as creation of content by users, sales of created content, and shopping. The ownership of content created by the user may be verified by a blockchain-based NFT, and/or economic activities may be performed based on real currency and/or cryptocurrency. The metaverse service may also provide virtual content corresponding to the real world, such as a digital twin, a mirror world, or life logging.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, a combination of software and hardware, or firmware, and may interchangeably be used with other terms, for example, "logic," "logic block," "unit," "device," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
a display;
memory;
a camera; and
one or more processors communicatively connected to the display, the memory, and the camera,
wherein the memory stores one or more computer programs including computer-executable instructions that, when executed by the one or more processors individually or collectively, cause the wearable electronic device to:
    display a user-selectable icon for an execution of an application in a three-dimensional (3D) virtual space, wherein the user-selectable icon includes a first graphical object representing a virtual window and a second graphical object representing the application, and the second graphical object is selectable through the first graphical object,
    while the user-selectable icon is displayed in the 3D virtual space, detect a movement of a user's finger, and
    based on detecting the movement of the user's finger to select the second graphical object in a depth direction of the virtual window of the first graphical object, display an execution screen of the application.

2. The wearable electronic device of claim 1, wherein the one or more computer programs further include computer-executable instructions that, when executed by the one or more processors individually or collectively, cause the wearable electronic device to:
    display the second graphical object adjacent to the execution screen of the application.

3. The wearable electronic device of claim 1, wherein the one or more computer programs further include computer-executable instructions that, when executed by the one or more processors individually or collectively, cause the wearable electronic device to:
    based on the detected movement of the user's finger, display a representation of the movement of the user's finger with respect to the user-selectable icon.

4. The wearable electronic device of claim 1, wherein the one or more computer programs further include computer-executable instructions that, when executed by the one or more processors individually or collectively, cause the wearable electronic device to:
    when the execution screen of the application is displayed, not display the virtual window of the first graphical object while displaying the second graphical object.

5. The wearable electronic device of claim 1,
wherein the movement of the user's finger to select the second graphical object is a first user input,
wherein the one or more computer programs further include computer-executable instructions that, when executed by the one or more processors individually or collectively, cause the wearable electronic device to:
    based on a user input being received with respect to the second graphical object while the user-selectable icon is displayed in the 3D virtual space, change an arrangement order between the first graphical object and the second graphical object along the depth direction, and
wherein the user input is different from the first user input and is at least one of a gesture input or a gaze input.

6. The wearable electronic device of claim 1,
wherein the movement of the user's finger to select the second graphical object is a first user input,
wherein the one or more computer programs further include computer-executable instructions that, when executed by the one or more processors individually or collectively, cause the wearable electronic device to:
    based on receiving a second user input with respect to the first graphical object, change at least one of a size or a transparency of the first graphical object, and
    based on receiving the second user input with respect to the second graphical object while the user-selectable icon is displayed in the 3D virtual space, change at least one of a size, a position, a shape, or a color of the second graphical object, and
wherein the second user input is different from the first user input and is at least one of a gesture input or a gaze input.

7. The wearable electronic device of claim 6,
wherein the one or more computer programs further include computer-executable instructions that, when executed by the one or more processors individually or collectively, cause the wearable electronic device to:
    based on receiving a third user input with respect to the second graphical object, execute at least one function of the application, and
wherein the third user input is at least one of a gesture input or a gaze input different from the first user input and the second user input.

8. The wearable electronic device of claim 6, wherein the one or more computer programs further include computer-executable instructions that, when executed by the one or more processors individually or collectively, cause the wearable electronic device to:
    based on receiving a gaze of the user gazing at a specified location in the 3D virtual space and the movement of the user's finger for a third graphical object representing a background of the user-selectable icon, selectively switch the 3D virtual space from one of a first space created using the camera or a second space stored in the wearable electronic device to the other.

9. The wearable electronic device of claim 8, wherein the one or more computer programs further include computer-executable instructions that, when executed by the one or more processors individually or collectively, cause the wearable electronic device to:
    based on the second user input, move the execution screen of the application behind the third graphical object based on the depth direction so that the execution screen of the application is not visible by the first graphical object, and
    based on a specified event, move at least a portion of the execution screen in front of the third graphical object along the depth direction.

10. The wearable electronic device of claim 6, further comprising:
    a facial recognition camera disposed on a side of the wearable electronic device facing the first graphical object,
    wherein the one or more computer programs further include computer-executable instructions that, when executed by the one or more processors individually or collectively, cause the wearable electronic device to:
        determine at least one of eye movement or eyelid movement using image information obtained by the facial recognition camera,
        obtain gaze information based on at least one of the eye movement or the eyelid movement, and determine the second user input at least partially based on the gaze information, and wherein the display emits light to both eyes of the user to display a plurality of graphical objects on the 3D virtual space while the user is wearing the wearable electronic device.

11. The wearable electronic device of claim 1, wherein the movement of the user's finger to select the second graphical object is a first user input, wherein the second graphical object includes objects representing each of a plurality of applications, and wherein the one or more computer programs further include computer-executable instructions that, when executed by the one or more processors individually or collectively, cause the wearable electronic device to:

based on receiving the first user input for the second graphical object, display execution screens for each of the plurality of applications, based on receiving a fourth user input with respect to the second graphical object, individually display the objects representing each of the plurality of applications, and based on receiving a fifth user input with respect to the second graphical object, display objects representing each of a plurality of sub-functions of the application.

12. A method performed by a wearable electronic device, the method comprising:

displaying a user-selectable icon for an execution of an application in a three-dimensional (3D) virtual space, wherein the user-selectable icon includes a first graphical object representing a virtual window and a second graphical object representing the application, and the second graphical object is selectable through the first graphical object;

while the user-selectable icon is displayed in the 3D virtual space, detecting a movement of a user's finger; and based on detecting the movement of the user's finger to select the second graphical object in a depth direction of the virtual window of the first graphical object, displaying an execution screen of the application.

13. The method of claim 12, further comprising:

based on receiving a second user input with respect to a third graphical object, changing at least one of a size or a transparency of the third graphical object; and based on receiving the second user input with respect to the second graphical object while the user-selectable icon is displayed in the 3D virtual space, changing at least one of a size, a position, a shape, or a color of the second graphical object, wherein the movement of the user's finger to select the second graphical object is a first user input, and wherein the second user input is different from the first user input and is at least one of a gesture input or a gaze input.

14. One or more non-transitory computer-readable storage media storing one or more computer programs including computer-executable instructions that, when executed by one or more processors of a wearable electronic device individually or collectively, cause the wearable electronic device to perform operations, the operations comprising:

displaying a user-selectable icon for an execution of an application in a three-dimensional (3D) virtual space, wherein the user-selectable icon includes a first graphical object representing a virtual window and a second graphical object representing the application, and the second graphical object is selectable through the first graphical object;

while the user-selectable icon is displayed in the 3D virtual space, detecting a movement of a user's finger; and based on detecting the movement of the user's finger to select the second graphical object in a depth direction of the virtual window of the first graphical object, displaying an execution screen of the application.

15. The one or more non-transitory computer-readable storage media of claim 14, wherein the operations further comprise:

displaying the second graphical object adjacent to the execution screen of the application.

16. The one or more non-transitory computer-readable storage media of claim 14, wherein the operations further comprise:

when the execution screen of the application is displayed, not displaying the virtual window of the first graphical object while displaying the second graphical object.

17. The one or more non-transitory computer-readable storage media of claim 14, wherein the operations further comprise:

based on the detected movement of the user's finger, displaying a representation of the movement of the user's finger with respect to the user-selectable icon.

18. The one or more non-transitory computer-readable storage media of claim 14, wherein the operations further comprise:

based on receiving a second user input with respect to a third graphical object, changing at least one of a size or a transparency of the third graphical object; and based on receiving the second user input with respect to the second graphical object while the user-selectable icon is displayed in the 3D virtual space, changing at least one of a size, a position, a shape, or a color of the second graphical object, wherein the movement of the user's finger to select the second graphical object is a first user input, and wherein the second user input is different from the first user input and is at least one of a gesture input or a gaze input.

* * * * *